US011299397B2

(12) United States Patent (10) Patent No.: US 11,299,397 B2
Lanning et al. (45) Date of Patent: Apr. 12, 2022

(54) 3D SELF-ASSEMBLED MULTI-MODAL CARBON-BASED PARTICLES INTEGRATED INTO A CONTINUOUS ELECTRODE FILM LAYER

(71) Applicant: Lyten, Inc., Sunnyvale, CA (US)

(72) Inventors: Bruce Lanning, Littleton, CO (US); Michael W. Stowell, Sunnyvale, CA (US); Jerzy Gazda, Austin, TX (US); Jeffrey Bell, Santa Clara, CA (US)

(73) Assignee: LytEn, Inc., San Jose, CA (US)

( * ) Notice: Subject to any disclaimer, the term of this patent is extended or adjusted under 35 U.S.C. 154(b) by 223 days.

(21) Appl. No.: 16/785,076

(22) Filed: Feb. 7, 2020

(65) Prior Publication Data

US 2021/0036312 A1 Feb. 4, 2021

Related U.S. Application Data

(60) Provisional application No. 62/942,103, filed on Nov. 30, 2019, provisional application No. 62/929,690, (Continued)

(51) Int. Cl.
*C01B 32/184* (2017.01)
*H01M 4/1393* (2010.01)
(Continued)

(52) U.S. Cl.
CPC ............. *C01B 32/184* (2017.08); *B01J 19/12* (2013.01); *H01M 4/133* (2013.01);
(Continued)

(58) Field of Classification Search
None
See application file for complete search history.

(56) References Cited

U.S. PATENT DOCUMENTS 5,143,709 A 9/1992 Labes
5,324,553 A 6/1994 Ovshinsky et al.
(Continued)

FOREIGN PATENT DOCUMENTS

CA 2032137 C 11/1990
CN 100541870 9/2009
(Continued)

OTHER PUBLICATIONS

Zhou, I. et al., "Recent developments on and prospects for electrode materials with hierarchical structures for lithium-ion batteries", Advanced Energy Materials; 8(6); p. 1701415; Feb. 2018.
(Continued)

*Primary Examiner* — Daniel S Gatewood
(74) *Attorney, Agent, or Firm* — Paradice & Li LLP

(57) ABSTRACT

Presently disclosed is a multi-layered carbon-based scaffolded structure having a conductive substrate. A first film is deposited on the conductive substrate and includes: a first concentration of three-dimensional (3D) carbon-based particles comprising: a plurality of conductive 3D aggregates formed of graphene sheets that are sintered together to define a 3D hierarchical open porous structure with mesoscale structuring in combination with micron-scale fractal structuring that is also configured to provide conduction between contact points of the graphene sheets. A porous arrangement is formed in the 3D hierarchical open porous structure and contains a liquid electrolyte configured to provide ion transport through a plurality of interconnected porous channels. The first film is configured to provide a first conductivity. A second film is deposited on the first film and comprising a second concentration of 3D carbon-based particles. The second film configured to provide a second conductivity lower than the first conductivity.

16 Claims, 36 Drawing Sheets

Related U.S. Application Data filed on Nov. 1, 2019, provisional application No. 62/926,225, filed on Oct. 25, 2019, provisional application No. 62/899,077, filed on Sep. 11, 2019, provisional application No. 62/880,326, filed on Jul. 30, 2019, provisional application No. 62/880,336, filed on Jul. 30, 2019.

(51) Int. Cl.

| | | |
|---|---|---|
| *H01M 10/0525* | (2010.01) | |
| *B01J 19/12* | (2006.01) | |
| *H01M 4/133* | (2010.01) | |
| *H01M 4/36* | (2006.01) | |
| *H01M 4/583* | (2010.01) | |
| *H01M 4/62* | (2006.01) | |
| *H01M 10/0562* | (2010.01) | |
| *H01M 50/46* | (2021.01) | |
| *B82Y 30/00* | (2011.01) | |

(52) U.S. Cl.
CPC ......... *H01M 4/1393* (2013.01); *H01M 4/366* (2013.01); *H01M 4/583* (2013.01); *H01M 4/622* (2013.01); *H01M 10/0525* (2013.01); *H01M 10/0562* (2013.01); *B01J 2219/0886* (2013.01); *B01J 2219/0894* (2013.01); *B82Y 30/00* (2013.01); *C01B 2204/04* (2013.01); *C01B 2204/22* (2013.01); *C01P 2004/24* (2013.01); *C01P 2004/45* (2013.01); *C01P 2004/53* (2013.01); *C01P 2006/16* (2013.01); *C01P 2006/40* (2013.01); *H01M 50/46* (2021.01)

(56) References Cited

U.S. PATENT DOCUMENTS

| | | | |
|---|---|---|---|
| 5,436,093 | A | 7/1995 | Huang et al. |
| 6,031,711 | A | 2/2000 | Tennent et al. |
| 6,099,960 | A | 8/2000 | Tennent et al. |
| 6,156,114 | A | 12/2000 | Bell et al. |
| 6,757,154 | B2 | 6/2004 | Reynolds, III et al. |
| 6,830,595 | B2 | 12/2004 | Reynolds, III |
| 7,071,258 | B1 | 7/2006 | Jang et al. |
| 7,206,189 | B2 | 4/2007 | Reynolds, III |
| 7,465,519 | B2 | 12/2008 | Tang et al. |
| 7,623,340 | B1 | 11/2009 | Song et al. |
| 7,745,047 | B2 | 6/2010 | Zhamu et al. |
| 7,824,651 | B2 | 11/2010 | Zhamu et al. |
| 7,842,421 | B2 | 11/2010 | Mikhaylik |
| 7,875,219 | B2 | 1/2011 | Zhamu et al. |
| 8,114,375 | B2 | 2/2012 | Jang et al. |
| 8,119,288 | B2 | 2/2012 | Zhamu et al. |
| 8,132,746 | B2 | 3/2012 | Zhamu et al. |
| 8,241,793 | B2 | 8/2012 | Zhamu et al. |
| 8,415,054 | B2 | 4/2013 | Skotheim et al. |
| 8,497,225 | B2 | 7/2013 | Zhamu et al. |
| 8,524,067 | B2 | 9/2013 | Zhamu et al. |
| 8,617,748 | B2 | 12/2013 | Mikhaylik et al. |
| 8,624,222 | B2 | 1/2014 | Liu et al. |
| 8,748,043 | B2 | 1/2014 | Mikhaylik |
| 8,936,870 | B2 | 1/2015 | Affinito et al. |
| 8,940,145 | B1 | 1/2015 | Chen et al. |
| 9,005,809 | B2 | 4/2015 | Wilkening et al. |
| 9,034,421 | B2 | 5/2015 | Mikhaylik et al. |
| 9,040,201 | B2 | 5/2015 | Affinito et al. |
| 9,099,744 | B2 | 8/2015 | Janssen et al. |
| 9,190,667 | B2 | 11/2015 | Zhamu et al. |
| 9,190,694 | B2 | 11/2015 | Lopez et al. |
| 9,246,185 | B2 | 1/2016 | Kretschmar et al. |
| 9,419,274 | B2 | 8/2016 | Wilkening et al. |
| 9,437,344 | B2 | 9/2016 | Zhamu et al. |
| 9,577,243 | B2 | 2/2017 | Schmidt et al. |
| 9,666,899 | B2 | 5/2017 | He et al. |
| 10,020,494 | B2 | 7/2018 | Wang et al. |
| 10,083,801 | B2 | 9/2018 | Zhamu et al. |
| 10,734,653 | B2 | 8/2020 | Lanning et al. |
| 2005/0123467 | A1 | 6/2005 | Harutyunyan |
| 2009/0022649 | A1 | 1/2009 | Zhamu et al. |
| 2009/0028777 | A1 | 1/2009 | Zhamu et al. |
| 2009/0117467 | A1 | 5/2009 | Zhamu et al. |
| 2012/0058397 | A1 | 3/2012 | Zhamu et al. |
| 2012/0088154 | A1 | 4/2012 | Liu et al. |
| 2013/0065034 | A1 | 3/2013 | Muramatsu |
| 2014/0170483 | A1 | 6/2014 | Zhang et al. |
| 2014/0255785 | A1 | 9/2014 | Do |
| 2014/0313636 | A1 | 10/2014 | Tour et al. |
| 2015/0044565 | A1 | 2/2015 | Wang et al. |
| 2015/0210558 | A1 | 7/2015 | Dickinson et al. |
| 2015/0291431 | A1 | 10/2015 | Tang et al. |
| 2016/0027934 | A1 | 1/2016 | Noyes |
| 2016/0043384 | A1 | 2/2016 | Zhamu et al. |
| 2016/0207291 | A1 | 7/2016 | Dimitrakopoulos et al. |
| 2017/0062821 | A1 | 3/2017 | Tour et al. |
| 2017/0174520 | A1 | 6/2017 | Walters et al. |
| 2018/0327611 | A1 | 11/2018 | Scheffer |
| 2020/0235392 | A1 | 7/2020 | Jang |

FOREIGN PATENT DOCUMENTS

| | | |
|---|---|---|
| CN | 102674321 B | 2/2015 |
| JP | 2010095390 A | 4/2010 |
| KR | 101785064 B1 | 10/2017 |
| WO | 2012/039533 A1 | 3/2012 |
| WO | 2014/048390 A1 | 4/2014 |
| WO | 2017/127674 A1 | 7/2017 |
| WO | 2018122368 A1 | 7/2018 |

OTHER PUBLICATIONS

Rodrigues, M. et al., "A materials perspective on Li-ion batteries at extreme temperatures", Nature Energy; 2(8); pp. 1-4; Jul. 24, 2017.
Zhang, H. et al., "Three-dimensional bicontinuous ultrafast-charge and -discharge bulk battery electrodes", Nature Nanotechnology; 6(5); pp. 277-281; May 2011.
Agostini, M. et al., "A high-power and fast charging Li-ion battery with outstanding cycle-life", Scientific Reports; 7(1); pp. 1-7; Apr. 24, 2017.
K.S. Novoselov et al."Electric Field Effect in Atomically Thin Carbon Films" Science; 306(5696), pp. 666-669; Oct. 22, 2004.
T. Takamura et al."A key technology to improve the cyclic performances of carbonaceous materials for lithium secondary battery anodes" Science Direst Journal of Power Sources vol. 68, Issue 1, Sep. 1997, pp. 114-119.
U. Rothlisberger et al. "Ab Initio Molecular Dynamics Investigation of Singlet C2H2Li2: Determination of the Ground State Structure and Observation of LiH Intermediates" J. American Chemical Society 1995, 117, 42-48.
C. Menachem et al. "Characterization of Lithiated Natural Graphite Before and After Mild Oxidation" Science Direct Journal of Power Sources vol. 76, Issue 2, Dec. 1, 1998, pp. 180-185.
C. Menachem et al. "Characterization of modified NG7 graphite as an improved anode for lithius-ion batteries" Science Direct Journal of Power Sources vol. 68, Issue 2, Oct. 1997, pp. 277-282.
Y. Ein-Eli et al. "Chemical Oxidation: A Route to Enhanced Capacity in Li-Ion Graphite Anodes" Journal of The Electrochemical Society 1997 vol. 144, issue 9, pp. 2968-2973.
P. Maguire et al. "Continuous In-flight Synthesis for On-Demand Delivery of Ligand-Free Colloidal Gold Nanoparticles", Nano Letters; 17(3); pp. 1336-1343; Mar. 8, 2017.
S. Dabrowska et al. "Current Trends in the Development of Microwave Reactors for the Synthesis of Nanomaterials in Laboratories and Industries: A Review" Crystals; 8(10); Oct. 2018; p. 379.
M. Zheng et al."Activated graphene with tailored pore structure parameters for long cycle-life lithium-sulfur batteries" Nano Res. 2017, 10(12): 4305-4317.
J.S. Xue et al."Dramatic Effect of Oxidation on Lithium Insertion in Carbons Made from Epoxy Resins" Journal of The Electrochemical Society 1995 vol. 142, issue 11, 3668-3677.

(56) References Cited

OTHER PUBLICATIONS

F. Disma et al."Effect of Mechanical Grinding on the Lithium Intercalation Process in Graphites and Soft Carbons" Journal of The Electrochemical Society 1996 vol. 143, issue 12, 3959-3972.

Y. Wu et al."Effects of catalytic oxidation on the electrochemical performance of common natural graphite as an anode material for lithium ion batteries" Science Direct Electrochemistry Communications vol. 2, Issue 4, Apr. 1, 2000, pp. 272-275.

K.H. An et al."Electrochemical Properties of High-Power Supercapacitors Using Single-Walled Carbon Nanotube Electrodes" Advanced Functional Materials/vol. 11, Issue 5. Oct. 2, 2001.

Y. Qiu et al."Explosive thermal reduction of graphene oxide-based materials: mechanism and safety implications" NIH Public Access Author Manuscript School of Engineering, Brown University, 182 Hope St., Providence, RI, USA, 02912. Carbon NY. Jun. 2014; 72: 215-223. doi:10.1016/j.carbon.2014.02.005.

R. Yazami et al."High reversible capacity carbon-lithium negative electrode in polymer electrolyte" Science Direct Journal of Power Sources vol. 54, Issue 2, Apr. 1995 pp. 411-415.

T. Zheng et al."High-Capacity Carbons Prepared from Phenolic Resin for Anodes of Lithium-Ion Batteries" Journal of The Electrochemical Society 1995 vol. 142, issue 11, L211-L214.

Z. Lu et al."Improving Li anode performance by a porous 3D carbon paper host with plasma assisted sponge carbon coating" Energy Storage Materials 11 (2018) 47-56.

S. Zhang "Liquid electrolyte lithium/sulfur battery: Fundamental chemistry, problems, and solutions" Science Direct. Journal of Power Sources vol. 231, Jun. 1, 2013, pp. 153-162.

R. Korthauer (Ed.) "Lithium-Ion Batteries: Basics and Applications" Publisher, Springer-Verlag Berlin Heidelberg Copyright Aug. 7, 2018.

H. Buqa et al. "Modified carbons for improved anodes in lithium ion cells" Science Direct Journal of Power Sources vol. 97-98, Jul. 2001, pp. 122-125.

E. Lee et al. "Li Absorption and Intercalation in Single Layer Graphene and Few Layer Graphene by First Principles" NANO Letters; 12(9), pp. 4624-4628; Sep. 12, 2012.

Y. Shi et al. "Material and Structural Design of Novel Binder Systems for High-Energy, High-Power Lithium-Ion Batteries" Published as part of the Accounts of Chemical Research special issue "Energy Storage: Complexities AmongMaterials and Interfaces at Multiple Length Scales". DOI: 10.1021/acs.accounts.7b00402 Acc. Chem. Res. 2017, 50, 2642-2652.

K. Ji et al. "Lithium intercalation into bilayer graphene" Nature Communications; 19(1); pp. 1-10; Jan. 17, 2019.

K. Ji et al. "Lithium intercalation into bilayer graphene" Nature Communications (2019) 10:275 | https://doi.org/10.1038/s41467-018-07942-z | www.nature.com/naturecommunications.

K. Jurewicz et al. "Supercapacitors from nanotubes/polypyrrole composites" Science Direct Chemical Physics Letters vol. 347, Issues 1-3, Oct. 2001, pp. 36-40.

J.E. Huang et al. "Well-dispersed single-walled carbon nanotube/ polyaniline composite films" Science Dierct Carbon vol. 41, Issue 14, 2003, pp. 2731-2736.

A. Mistry et al. ""Shuttle" in Polysulfide Shuttle: Friend or Foe?" Journal of Physical Chemistry C; 122(42); pp. 23845-23851; Oct. 5, 2018.

I. Son et al., "Graphene balls for lithium rechargeable batteries with fast charging and high volumetric energy densities", Nature Communications; 8(1); pp. 1-11; Nov. 16, 2017.

H. Wang et al., "Graphene-Wrapped sulfur particles as a rechargeable lithium-sulfur battery cathode material with high capacity and cycling stability", Nano Letters; 11(7); pp. 2644-2647; Jul. 13, 2011.

Ji et al.; "A highly ordered nanostructured carbon-sulphur cathode for lithium-sulphur batteries", Nature Materials, vol. 8, May 2009, pp. 500-506.

Schuster et al., Spherical Ordered Mesoporous Carbon Nanoparticles with High Porosity for Lithium-Sulfur Batteries, Angew. Chem. Int. Ed., 51, Mar. 2012, pp. 3591-3595.

Shaibani, M., et al., "Expansion-tolerant architectures for stable cycling of ultrahigh-loading sulfur cathodes in lithium-sulfur batteries", Science Advances; 6(eaay2757); 11 pages; Jan. 3, 2020.

Wang, J., et al., Sulfur-mesoporous carbon composites in conjunction with a novel ionic liquid electrolyte for lithium rechargeable batteries, Carbon, vol. 46, Issue 2, Feb. 2008, pp. 229-235.

Yang, Y., et al., New Nanostructured Li2S/Silicon Rechargeable Battery with High Specific Energy, Nano Letters, 10(4), Feb. 2010, pp. 1486-1491.

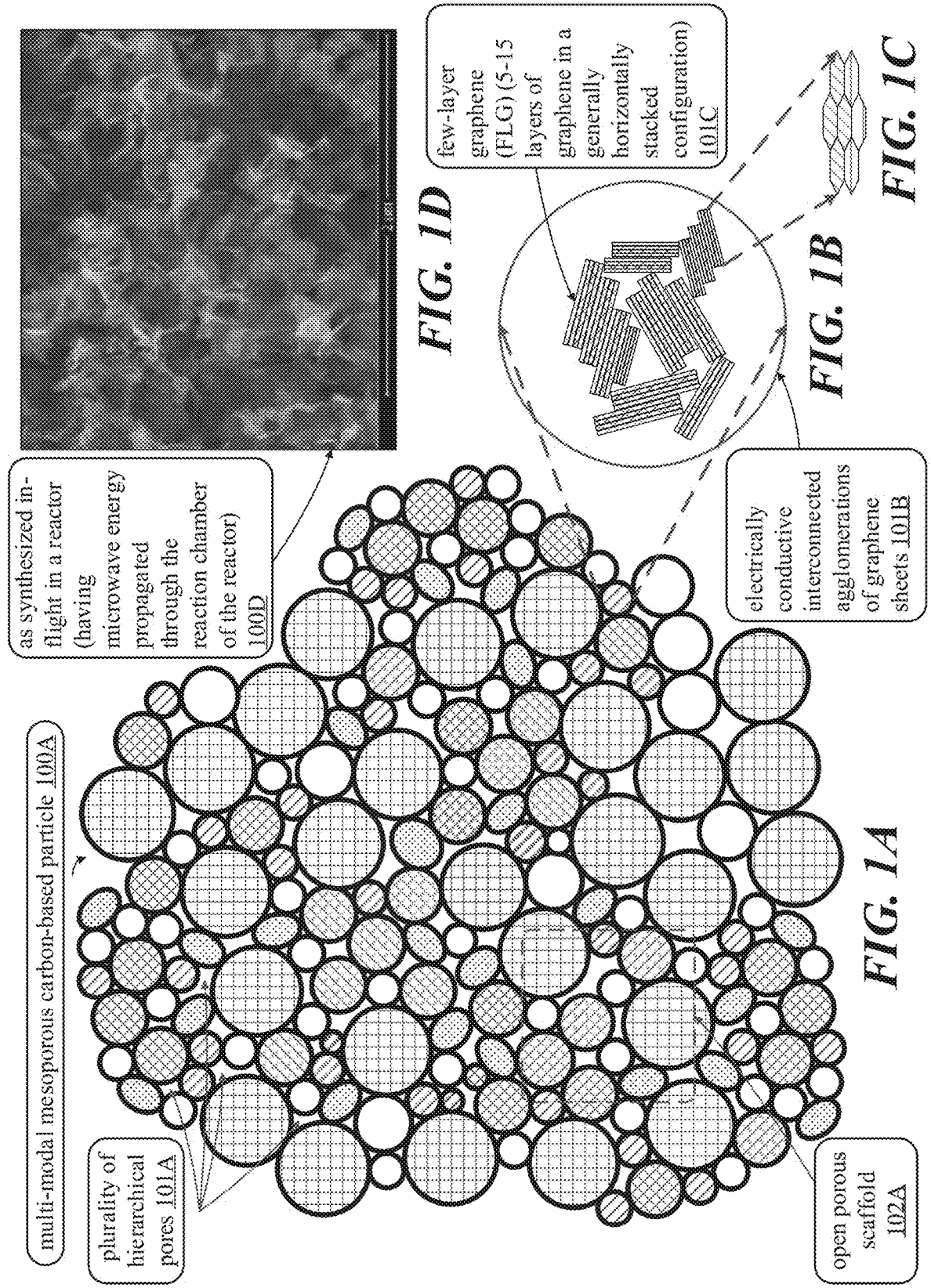

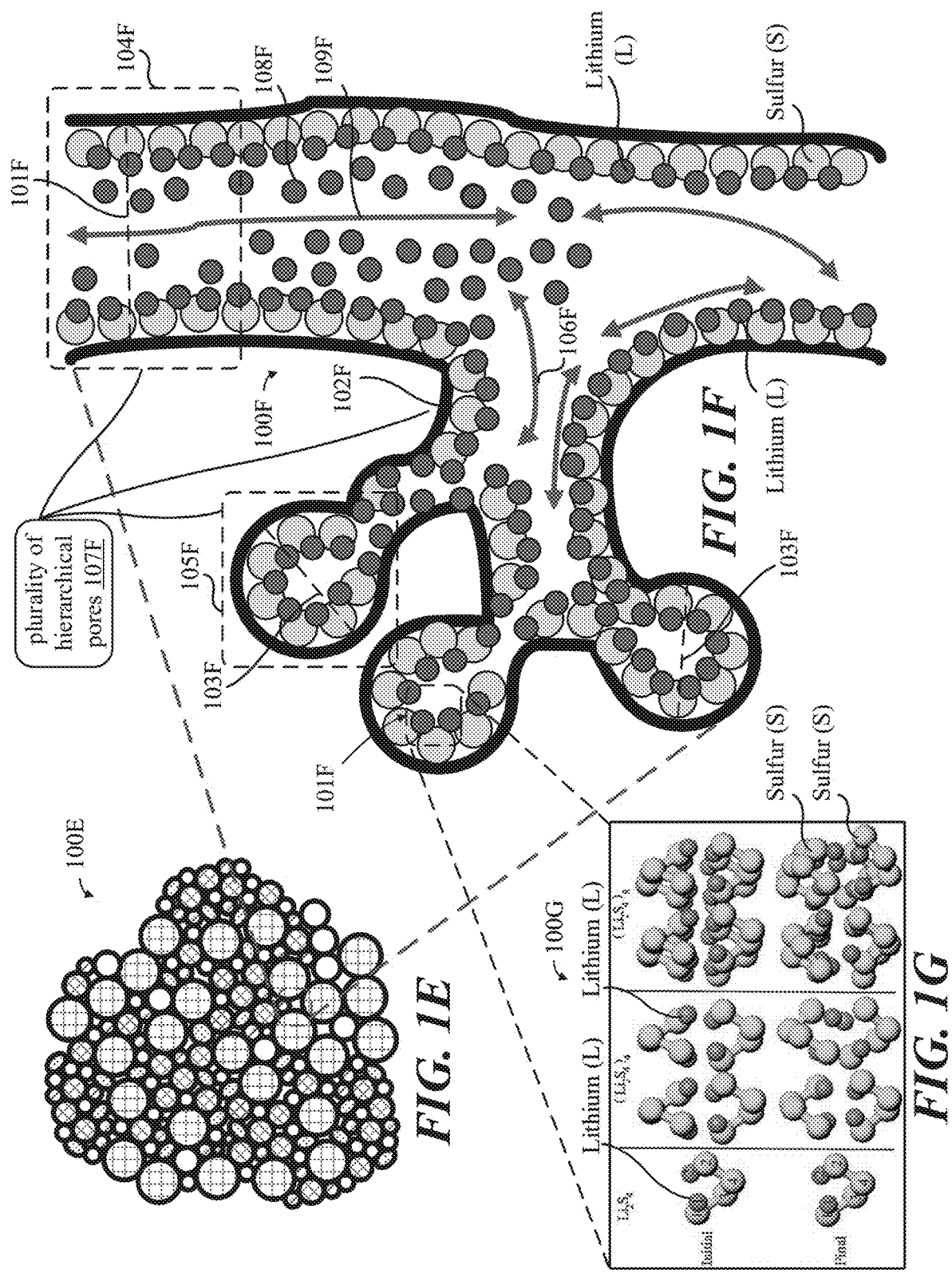

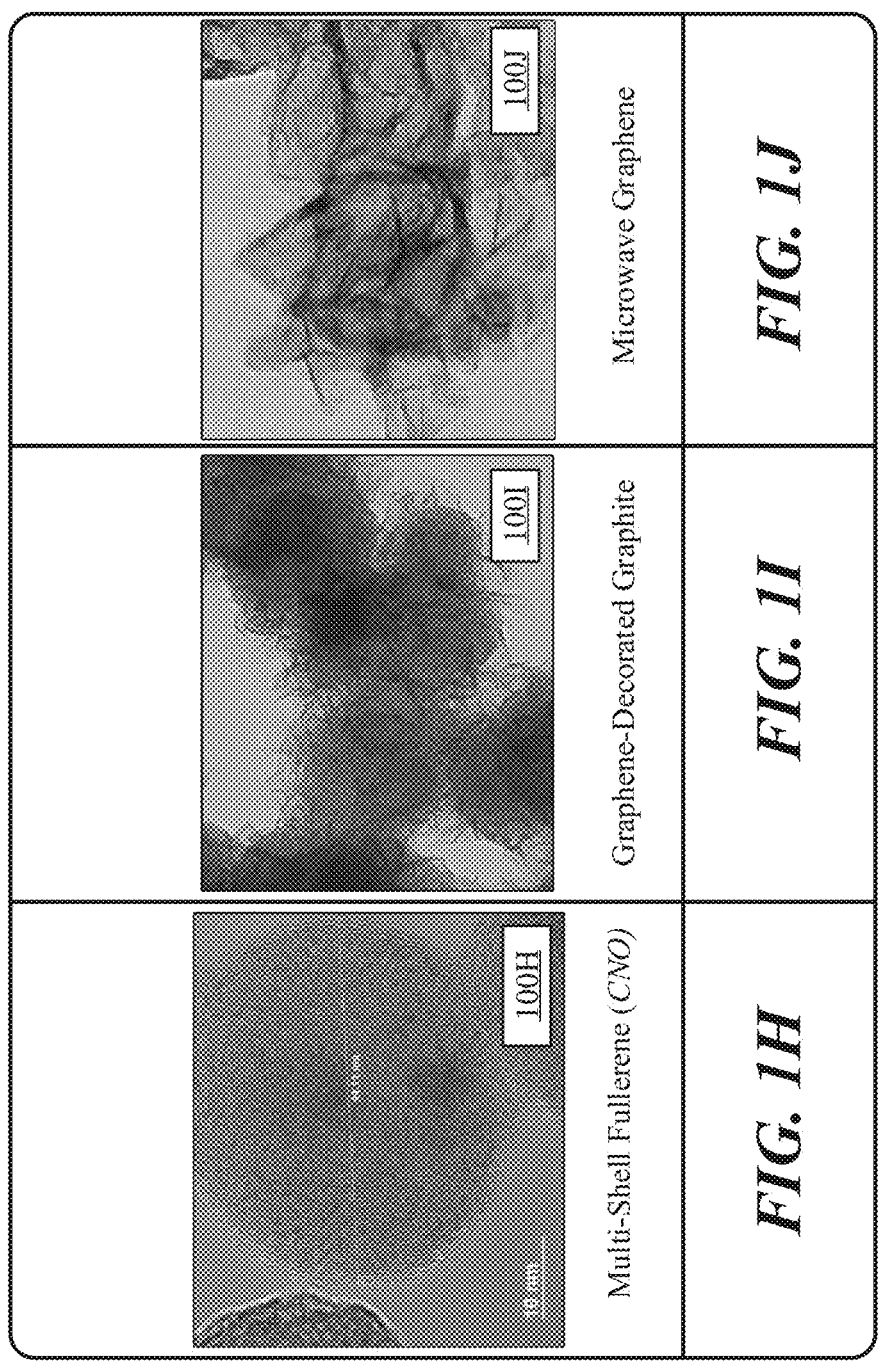
FIG. 1J Microwave Graphene
FIG. 1I Graphene-Decorated Graphite
FIG. 1H Multi-Shell Fullerene (CNO)

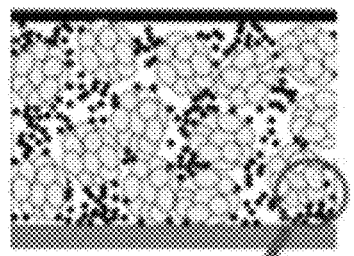
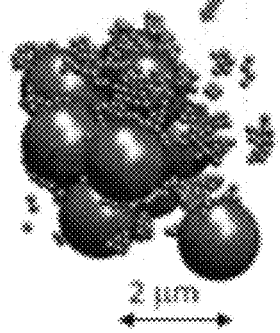
FIG. 2A
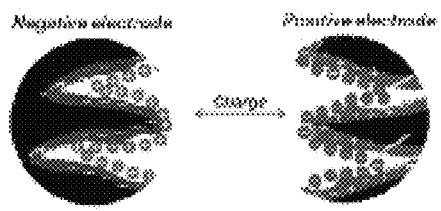
FIG. 2B
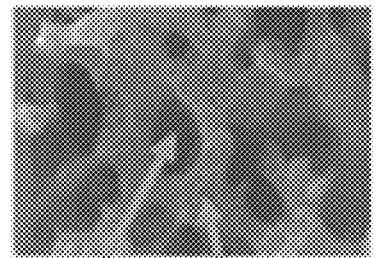
FIG. 3A
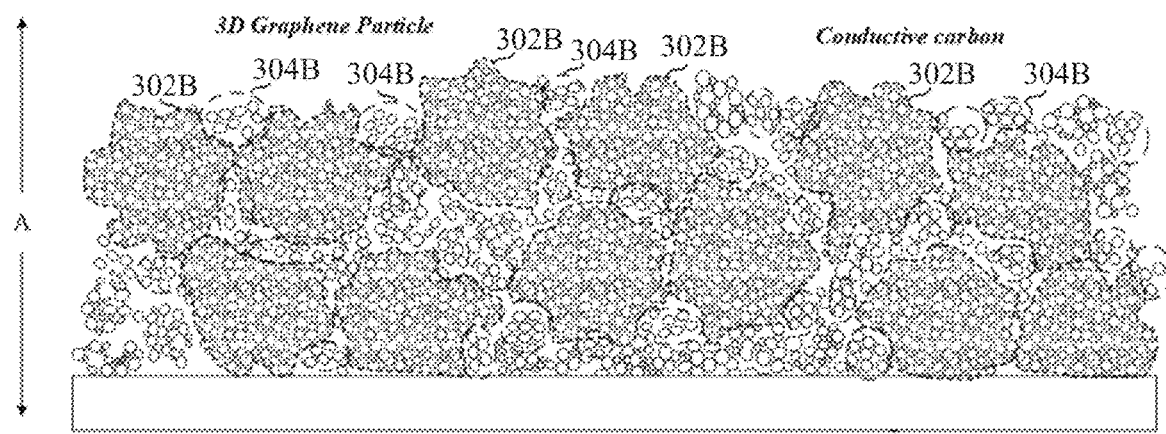
FIG. 3B

⌐ 1200

> 3D Graphene scaffolded particles (20-40 microns in diameter):
>
> - Tunable hierarchical pores, (size, and distribution) (1-2 nm micro to >40 nm meso pores)
> - Nanoscale, open 3D channels building blocks within a micron scale, macro-particle
> - Tunable Surface chemistry (pristine to doped graphene)
> - Tuned Mechanical Integrity/strength of connecting ligaments
> - Low cost, high volume carbon production (both capital and operating)

FIG. 12

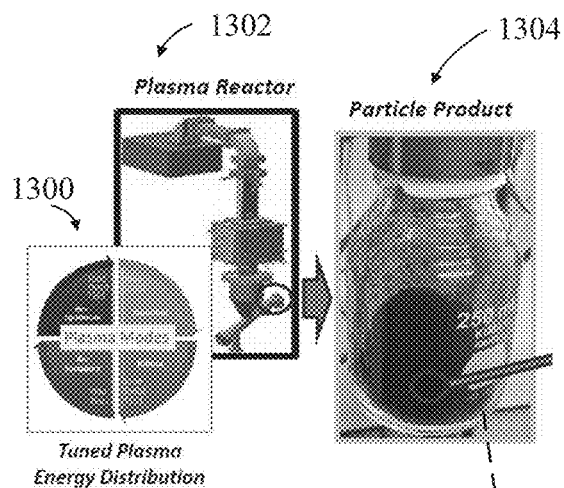

FIG. 13

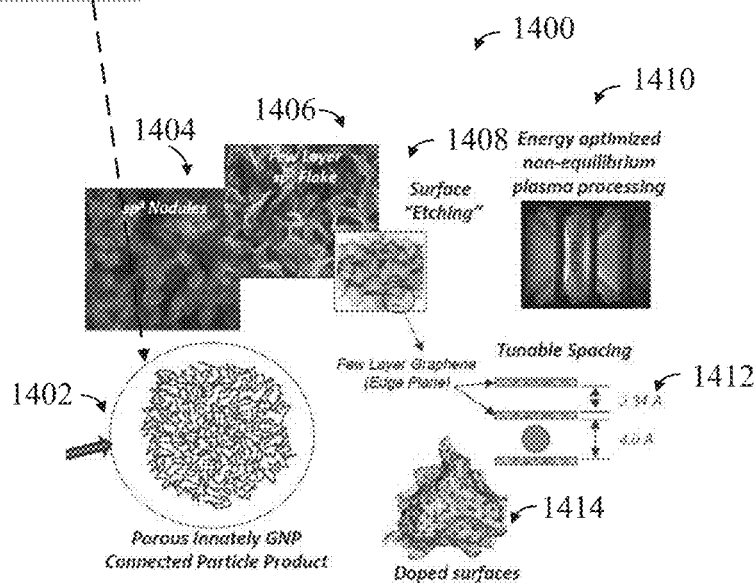

```
Integrated 3D scaffolded films

Particle-like properties in addition to:

• Sacrificial as well as supporting film substrate
• Tunable velocity to substrate
• (impact energy from implantation to adsorption)
• Tunable thickness and porosity
• Additive type manufacturing capability
```

```
Reactor to Film:

• Roll to Roll Processed
• Covalently bonded carbon rich electrode interfacing
• Cathode and Anodes deposition without heavy use of inactive binders
```

*FIG. 18*

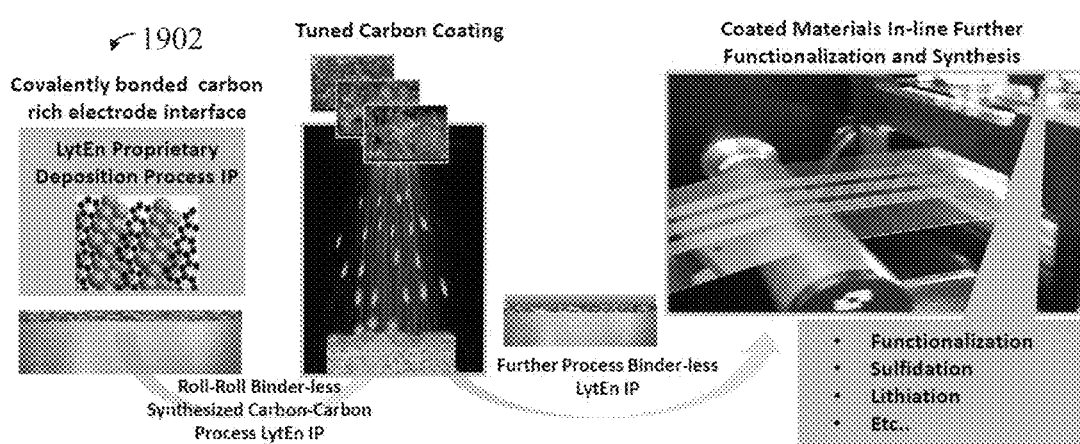

*FIG. 19*

| Li-ion Limitations | New 3D Graphene Enabling Features |
|---|---|
| • Energy Density (250 Wh/kg) ⟹ | 400 to 650 Wh/kg (theoretical 850 Wh/kg) |
| – Oxide cathode (250 mAh/g) | Sulfur Cathode (650 mAh/g) |
| – Graphite anode (400 mAh/g) | Graphene/Li Anode (900 – 2000 mAh/g) |
| • C rate (discharge/charge) ⟹ | 2 C |
| • Cycle Lifetime (stability/safety) ⟹ | 3000 @ full DOD |
| – 10 year EV battery life | >>10 year EV battery Life |
| • Liquid Electrolyte (stability/complexity) ⟹ | Compatible Electrolyte |
| • Thermal Runaway ⟹ | Stable Chemistry |
| • Li plating/dendrites ⟹ | "Entrapped" Lithium |
| • Cost ($200-$250/KWH) ⟹ | At volume, $100/KWH |

*FIG. 20*

TEM-EDX images revealing uniform distribution of sulfur in a microporous carbon

Industry Challenges:

- Dendrite growth
- Control of first charge lithium loss (balance of pre-lithium loading)
- Continuous growth of SEI on fresh lithium surfaces

*FIG. 28*

Approach: Pre-lithiated Carbon Host (e.g., Anode) Structure

- Tuning of graphene inter-layer spacing and pore distribution (size and volume) within plasma reactor
- Formulation of Carbon Host
- Lithium intercalation into Graphene (2-3x specific capacity over SOA)
- Creation of artificial solid state SEI during lithium infiltration process

*FIG. 29A*

Lithium metal is desirable for inclusion in the anode, but dendrite formation (unstable SEI formation) and infinite relative dimensional change limit it's potential application Key challenge: stabilizing lithium metal/liquid electrolyte interface

Mitigating Approaches (alternatives to the ideal, pure lithium solution):

- Replace lithium metal with intercalating carbon (graphite); lithium sourced from an oxide cathode – SOA lithium ion battery,
- Replace lithium metal with alloy or alternative active material (silicon, tin, aluminum, other),
- Pre-lithiate intercalating graphite to accommodate first charge lithium loss and/or as active source
  - Chemical
  - Electrochemical
  - Direct contact to lithium metal (i.e., FMC, foil, other)

% Lithiation

- Increase coulombic efficiency, decrease first charge loss, manage expansion effect, and engineer SEI in conventional graphite electrodes
- Dual purpose in Lithium ion capacitors
- Too much "free" lithium can lead to high surface area lithium formation
- Enables alternative non-lithium cathodes such as sulfur, oxygen, vanadium oxide, etc.

*FIG. 29D*

Proposed solution/benefits (*thermal/liquid infusion*):

General:
- More efficient fabrication (lithium utilization and potential increase in active to inactive (binder reduction)),
- Improved uniformity, and
- Controlled Reaction (activity)

Specific (performance feature as a function of %lithium loading):

- At low loading (less than capacity), compensates for first charge losses/more effective SEI formation
- At saturation/matched loading, lithium rich regions, 'galvanically' coupled to carbon, oxidize when in contact with electrolyte and insert (intercalates) between graphene layers;
- At excess loading, metallic lithium is infiltrated into engineered "host" carbon; "host" serves to accommodate/stabilize expansion of lithium and suppress dendrite formation as a result of increased lithium surface area (enables specific capacities commensurate with pure lithium: >2,000 mah/g)
- Lithium ion processes/methodology directly transferable to lithium ion hybrid capacitors

*FIG. 29E*

Challenges:

- Management of (lithium) reactivity (surface tension, wettability) at interface
- Management of capillary infiltration kinetics
- Engineer electrical gradient through electrode thickness (highest at current collector to more ionic conducting at electrolyte interface)
- Engineering of surface chemistry (facilitate stabile SEI formation in contact with electrolyte and minimize reactivity with air)

*FIG. 29F*

> 2D Plating (first charge) process – *akin to brightening agents in electroplating*    ← 2900G
>
> In electroplating:
>
> - Additives increase polarization, decrease current density; i.e., redirect current density to low as opposed to high areas (protrusions)
> - High nucleation rate, moderate charge transfer rate
>
> In plating/striping (battery charge/discharge):
>
> - Carbon film serves as flexible support for SEI formation as well as,
> - Redirecting current density to low as opposed to high areas

*FIG. 29G*

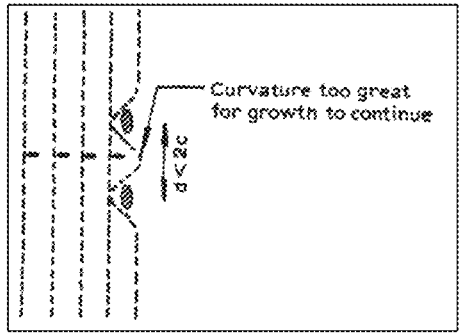

*FIG. 29H*

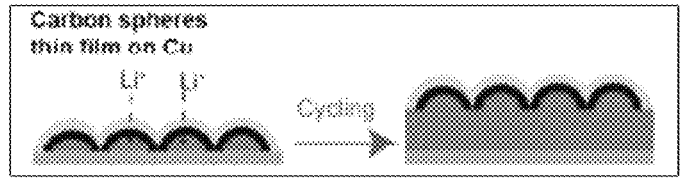

*FIG. 29I*

> 3D Electrodes With Increased Electroactive Surface Area
>
> - 3D electrodes with increased electroactive surface area (i.e., 3D "host" structures) can also reduce local effective current density;    ← 2900J
>
> - formation of insulating (wettable polar surface) layer on electrolyte-facing surface of electrode with electrical conductivity graded higher to active carbon core and back plane current collector

*FIG. 29J*

Galvanic coupling:
- Direct electrical contact between carbon and Li metal in the presence of electrolyte
- Potential difference between Li metal (-3.04 V vs SHE) and carbon electrode leads to flow of electrons (galvanic couple), formation of lithium ions (oxidation) and deposition on carbon

Classic cementation precipitation in copper production
- Heterogeneous process in which ions are reduced to zero valence at a solid metal surface (i.e., Cu ions on Fe particle surface)
- Iron oxidizes and Copper reduced (copper higher on galvanic series similar to Lithium versus carbon)

*FIG. 29K*

Infiltrate Li into carbon host followed by 'cementation' into carbon in presence of electrolyte

*FIG. 29L*

Management of Reactive Metals (Welding):
- Classic MIG, TIG and Submerged Arc Welding (SAW) utilize inert shielding gas to join reactive metals (i.e., Ti and Al) through a liquid metal process (i.e., welding)
- Example of using inert shielding gas to form liquid pool of reactive metal without oxidation
  - *delta* $G_f$ of oxides ($TiO_2$, $Al_2O_3$) on par with that of $Li_2O$
- Hence, through proper use of inert shielding gas around reactive metals, oxygen and moisture can effectively be managed in the presence of reactive liquid metals
- Liquid lithium can be infiltrated through proper shielding gas configuration and operation

Management of Reactive Metals from a Welding Perspective

- Any one or more of the mentioned techniques and/or processes may be functionally integrated with and/or used to produce mesoporous carbon-based particle 100A to enhance Li ion battery performance.

- Such ancillary processes and/or techniques include:
  - management of reactive metals (via welding);
  - classic metal inert gas (MIG),
  - gas tungsten arc welding (GTAW) also referred to as tungsten inert gas (TIG) and submerged arc welding (SAW) to utilize inert shielding gas to join reactive metals (such as Ti and Al) through a liquid metal process (such as by welding).

- Examples include using inert shielding gas to form liquid pools of reactive metal without oxidation, where standard free energy changes of formation, Delta ($\Delta$) $G^0f$ of oxides ($TiO_2$, $Al_2O_3$) is on par with that of $Li_2O$.

- Through controlled use of inert shielding gas around reactive metals, oxygen and moisture may effectively be managed in the presence of reactive liquid metals.

- In such environments and conditions, liquid Li can be infiltrated into the carbon-based structures of mesoporous carbon-based particle 100 through controlled shielding gas configuration and operation.

*FIG. 29N*

Reactor Tuning: — 3100

- Increase FL graphene spacing, reduce Van der Waal force
- Controlled Doping: Promotes carbon vacancy formation, decreases Li adsorption energy and increases Li capacity Li Intercalation: AB stack shifts to AA with intercalation (increased spacing)

- In graphite, AA shifts back to AB with de-intercalation
- In FL graphene, AA stacking remains with de-intercalation (maintains increased spacing)

*FIG. 31*

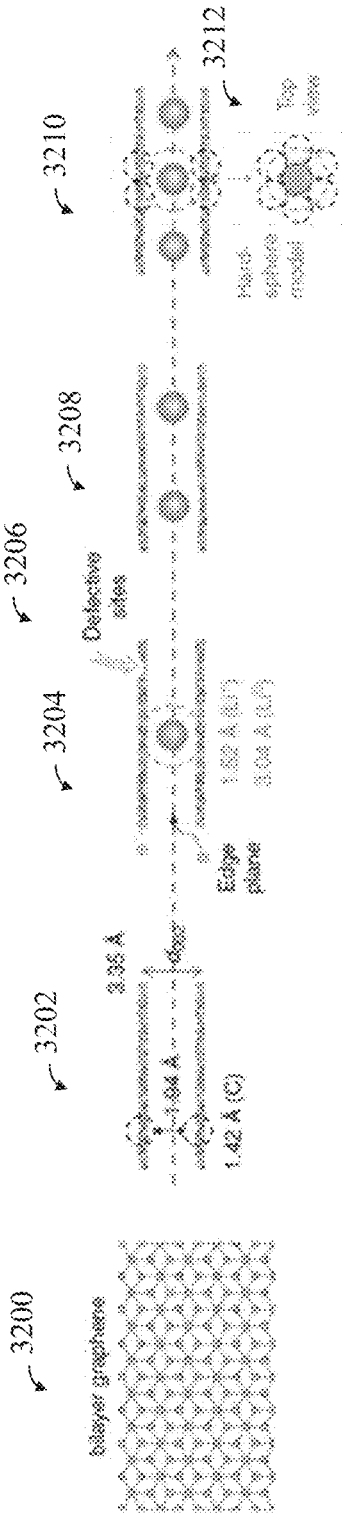

*FIG. 32*

3D SELF-ASSEMBLED MULTI-MODAL CARBON-BASED PARTICLES INTEGRATED INTO A CONTINUOUS ELECTRODE FILM LAYER

RELATED APPLICATIONS

This application claims priority to U.S. Provisional Patent Application No. 62/926,225, filed on Oct. 25, 2019 and entitled "3D Hierarchical Mesoporous Carbon-Based Particles Integrated into a Continuous Electrode Film Layer"; to U.S. Provisional Patent Application No. 62/942,103, filed on Nov. 30, 2019 and entitled "3D Hierarchical Mesoporous Carbon-Based Particles Integrated into a Continuous Electrode Film Layer"; all of which are hereby incorporated by reference in their respective entireties for all purposes.

TECHNICAL FIELD

This disclosure relates generally to a multi-modal three-dimensional (3D) self-assembled binder-less carbon-based particle (including a controlled $sp^2$ and $sp^3$ fraction) created from electrically conductive 3D aggregates of graphene sheets sintered together to form an open porous scaffold with a hierarchical pore structure; and, more specifically, where the hierarchical pore structure facilitates rapid ion transport that can correspondingly increase and/or enhance electrical conductivity through the graphene sheets (and contact points there-between) of carbon-based particle and scaffolds derived therefrom.

DESCRIPTION OF RELATED ART

Advances in the fields of electronics and telecommunications have enabled consumers to user devices in many new applications. Portable electronic devices and peripherals have already become commonplace, many of which rely on battery-supplied power, and continue to increase in popularity. Filling the electric power consumption demands, batteries—especially rechargeable (also referred to as "secondary") batteries, have emerged as a universal solution, allowing for seemingly indefinite portability and convenient continued device usage.

Nevertheless, challenges related to secondary battery performance regarding lifespan and cyclability have attracted ongoing innovation in lithium-ion (Li-ion) batteries, which use an intercalated Li compound as a formative material at the positive electrode and graphite at the negative electrode. Li-ion batteries, as opposed to other battery types, have been sought for usage in portable electronic devices due to their high energy density, limited to no memory effect (describing how traditional nickel-cadmium and nickel-metal hydride rechargeable batteries lose their ability to store electrical charge over multiple charge-discharge cycles involving partial discharge), and relatively low self-discharge. Thus, Li-ion batteries offer many of the benefits found in primary (non-rechargeable) lithium batteries, including high charge density that results in longer useful lifespans, without the concerns of rapid discharge resulting in overheating, rupture or explosion that may be encountered in Li batteries due to the highly reactive (and potentially explosive and/or combustible) nature of Li metal.

To assist ongoing developments in Li ion battery specific capacity, cycle-ability, and power delivery, amorphous carbon has also been considered (in conjunction with Li) as a formative material for Li ion battery electrodes. Nevertheless, such electrodes continue to suffer from a relatively a low electrical conductivity (high charge transfer resistance), which, in turn, results in a high polarization or internal power loss. Conventional amorphous carbon-based anode materials also may tend to give rise to a high irreversible capacity, among creating other potential issues.

Moreover, current Li-intercalated carbon-based electrode compositions or compounds typically include graphene, conductive carbon particles, and binder. In conventional techniques, carbon-based particles are all typically deposited, such as being dropped into, existing slurry cast electrodes including current collectors made from metal foil such as copper. Slurry typically is prepared to contain an organic binder or binder material referred to as NMP (N-methyl-2-pyrrolidone).

Studies have shown that fabricating battery electrodes by casting a mixture of active materials, a nonconductive polymer binder, and a conductive additive onto a metal foil current collector can result in electric or ionic bottlenecks, and poor electrical contacts due to randomly distributed conductive phases of carbon-based particles when held together using binders. Such problems are made worse in circumstances where high-capacity electrode materials are employed, where the high stress generated during electro-chemical reactions associated with normal battery usage disrupts mechanical integrity of such binder systems, ultimately resulting in decreased cycle life of batteries.

As a result, a need exists for a carbon-based electrode material that addresses the aforementioned challenges of Li ion batteries regarding usage of binders to impart structural integrity to secondary battery electrodes, and to have other highly desirable features.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter described in this disclosure can be implemented as a multi-layered carbon-based scaffolded structure comprising an electrically conductive substrate. A first contiguous film is deposited on the electrically conductive substrate and includes a first concentration of three-dimensional (3D) self-assembled binder-less multi-modal mesoporous carbon-based particles having a plurality of electrically conductive 3D aggregates formed of graphene sheets and sintered together to define a 3D hierarchical open porous structure, which includes mesoscale structuring in combination with micron-scale fractal structuring and is configured to provide electrical conduction between contact points of the graphene sheets. A porous arrangement is formed in the 3D hierarchical open porous structure and contains a liquid electrolyte configured to provide ion transport through a plurality of interconnected porous channels in the 3D hierarchical open porous structure. A respective porous channel of the plurality of porous channels includes: a first portion configured to provide tunable ion conduits; a second portion configured to facilitate rapid ion transport; and a third portion configured to at least partially or temporarily confine active material. The first contiguous film is configured to provide a first electrical conductivity. A second contiguous film deposited on the first contiguous film and includes a second concentration of 3D self-assembled binder-less multi-modal mesoporous carbon-based particles. The second contiguous film is configured to provide a second electrical conductivity lower than the first electrical conductivity.

In some implementations, the first electrical conductivity is in a range between approximately 500 S/m and approximately 20,000 S/m; in some other aspects, the second electrical conductivity is in a range between 0 S/m and approximately 500 S/m. One or more interim layers can be deposited on the first contiguous film having an electrical conductivity that decreases along a direction substantially orthogonal from the electrically conductive substrate. A solid-electrolyte interface (SEI) layer can be disposed in the 3D hierarchical open porous structure.

In some aspects, the 3D hierarchical open porous structure is configured to be infiltrated by Li ion solution. The plurality of channels can be configured to maintain uniformity between plating and stripping operations occurring within one or more of the 3D self-assembled binder-less multi-modal mesoporous carbon-based particles.

Another innovative aspect of the subject matter described in this disclosure can be implemented in an electrochemical cell including: an anode containing an anode active material, a cathode containing a cathode active material, a porous separator disposed between the anode and the cathode, a liquid electrolyte in contact with the anode active material and the cathode active material. At least one of the anode or the cathode can include: an electrically conductive substrate. A first contiguous film is deposited on the electrically conductive substrate and can include a first concentration of 3D self-assembled binder-less multi-modal mesoporous carbon-based particles in contact with each other to define a first electrical conductivity for the first contiguous film. Each of the 3D self-assembled binder-less multi-modal mesoporous carbon-based particles includes: a plurality of electrically conductive three-dimensional (3D) aggregates formed of graphene sheets randomly sintered together to form a 3D hierarchical open porous structure including mesoscale structuring in combination with micron-scale fractal structuring and are configured to provide electrical conduction between contact points of the graphene sheets. A porous arrangement formed in the 3D hierarchical open porous structure and contains the liquid electrolyte configured to provide ion transport through a plurality of interconnected porous channels. A second contiguous film can be deposited on the first contiguous film and can include a second concentration of 3D self-assembled binder-less multi-modal mesoporous carbon-based particles in contact with each other configured to provide a second electrical conductivity for the second contiguous film that is lower than the first electrical conductivity.

In some implementations, the anode active material or the cathode active material resides in pores of the anode and the cathode. The anode active material or the cathode active material has a specific surface area between approximately 80 $m^2$/g and 2,675 $m^2$/g. The anode active material or the cathode active material further comprises any one or more of pre-lithiated graphene sheets, pristine graphene, graphene oxide, reduced graphene oxide, graphene fluoride, graphene chloride, graphene bromide, graphene iodide, hydrogenated graphene, nitrogenated graphene, boron-doped graphene, nitrogen doped graphene, chemically functionalized graphene, physically or chemically activated or etched versions thereof, conductive polymer coated or grafted versions thereof, and/or combinations thereof.

In some aspects, the 3D hierarchical open porous structure comprises an active Li intercalating structure with a specific capacity of between approximately 744-1,116 mAh/g. The chemically functionalized graphene includes surface functionalization further comprising imparting (such as to the 3D hierarchical open porous structure) a functional group including any one or more of quinone, hydroquinone, quaternized aromatic amines, mercaptan, disulfide, sulfonate ($—SO_3$), transition metal oxide, transition metal sulfide, or a combination thereof.

In some implementations, the current collector is at least partially foam-based or foam-derived and is selected from the group consisting of: metal foam, metal web, metal screen, perforated metal, sheet-based 3D structure, metal fiber mat, metal nanowire mat, conductive polymer nanofiber mat, conductive polymer foam, conductive polymer-coated fiber foam, carbon foam, graphite foam, carbon aerogel, carbon xerogel, graphene foam, graphene oxide foam, reduced graphene oxide foam, carbon fiber foam, graphite fiber foam, exfoliated graphite foam, and combinations thereof.

In some aspects, the anode active material or the cathode active material further comprises one or more of nanoparticles, nanodiscs, nanoplatelets, nano-coating, or nanosheets of an inorganic material. The nanoparticles, nanodiscs, nanoplatelets, nano-coating, or nanosheets of an inorganic material can be selected from: (1) bismuth selenide or bismuth telluride, (2) transition metal dichalcogenide or trichalcogenide, (3) sulfide, selenide, or telluride of a transition metal, (4) boron nitride, or (5) a combination thereof, wherein the nanoparticles, nanodiscs, nanoplatelets, nano-coating, or nano sheets have a thickness less than 100 nm. The nanoplatelets can have a thickness less than approximately 10 nanometers, and have a length, width, or diameter less than approximately 5 microns.

Another innovative aspect of the subject matter described in this disclosure can be implemented as a method for manufacturing a graded battery electrode, the method including: growing one or more mesoporous carbon-based particles at a first concentration level to form a first contiguous film layer on a sacrificial substrate, the first contiguous film layer configured to provide a first electrical conductivity between approximately 500 S/m and 20,000 S/m, each of the mesoporous carbon-based particles having: a plurality of electrically conductive 3D aggregates formed of graphene sheets and sintered together to form an open porous scaffold configured to facilitate electrical conduction between contact points of the graphene sheets; and, a porous arrangement formed in the open porous scaffold and containing a liquid electrolyte configured to provide Li ion transport through a plurality of interconnected porous channels in the open porous scaffold; and, growing the mesoporous carbon-based particles at a second concentration level on the first contiguous film layer to form a second contiguous film layer on the first contiguous film layer, the second contiguous film layer configured to provide a second electrical conductivity between approximately 0 S/m and 500 S/m.

In some implementations, the interconnected porous channels further include: (1) a dimension of less than approximately 50 nanometers configured to provide tunable ion conduits; (2) a dimension of 20-50 nanometers configured to provide fast ion transport; and (3), a dimension of less than approximately 4 nanometers configured to provide active material confinement. The first or second contiguous film layer can have an average thickness in a range between approximately 10 µm and approximately 200 µm.

In some aspects, the method can include growing mesoporous carbon-based particles by on a roll-to-roll processing apparatus; and, processing the mesoporous carbon-based particles on the roll-to-roll processing apparatus independent of a binder. Growing the mesoporous carbon-based particles can be performed incrementally. Any one or more of chemical functionalization, sulfidation, or lithiation can be performed of or on the mesoporous carbon-based particles. One or more nano-scaled graphene platelets can be grown on the open porous scaffold.

Another innovative aspect of the subject matter described in this disclosure can be implemented as a process for producing a three-dimensional (3D) self-assembled multi-modal mesoporous electrode for an electrochemical cell. The process can include: depositing mesoporous carbon-based particles to form a first contiguous film layer on a substrate, the first contiguous film layer configured to provide a first electrical conductivity, each of the mesoporous carbon-based particles having: a plurality of electrically conductive 3D aggregates formed of graphene sheets and randomly sintered together to form an open porous scaffold configured to provide electrical conduction between contact points of the electrically conductive 3D aggregates of graphene sheets; and, a porous arrangement formed in the open porous scaffold and containing a liquid electrolyte dispersed therein configured to provide lithium (Li) ion transport through a plurality of interconnected pores in the open porous scaffold that define one or more channels, the first contiguous film layer having an average thickness no greater than approximately 10-200 μm, combining a binder material with the electrically conductive 3D aggregates formed of graphene sheets to retain the electrically conductive 3D aggregates of graphene sheets in a desired position and to impart structure to the open porous scaffold; and, depositing the mesoporous carbon-based particles on the first contiguous film layer to form a second contiguous film layer on the first contiguous film layer, the second contiguous film layer configured to provide a second electrical conductivity lower than the first electrical conductivity, the second contiguous film layer being positioned closer to the liquid electrolyte and away from the substrate.

In some implementations, the process can include: infiltrating Li ion solution into the open porous scaffold to at least partially react with exposed carbon on surfaces of the open porous scaffold exposed to the Li ion solution to facilitate Li ion dissociation and electric current supply, the exposed carbon on the open porous scaffold configures to provide a surface area greater than approximately 100 $m^2/gm$.

In some aspects, the binder material can include a thermosetting resin or a polymerizable monomer configured to form a solid resin or polymer with assistance of heat, radiation, an initiator, a catalyst, or a combination thereof, and can initially be any one or more of a polymer, coal tar pitch, petroleum pitch, mesa-phase pitch, or organic precursor material and is later thermally converted into a carbon material.

The details of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

So that the manner in which the above recited features of the present invention can be understood in detail, a more particular description of the invention, briefly summarized above, may be had by reference to the appended drawings. It is to be noted, however, that the appended drawings illustrate examples of this disclosure and are therefore not to be considered limiting of its scope.

FIGS. 1A-1J show illustrative schematic representations, at various magnification levels, and/or micrographs of a 3D self-assembled binder-less 3D mesoporous carbon-based particle having tunable electrical pathways and ionic conduits throughout the thickness thereof, according to some implementations.

FIGS. 2A-2B show illustrative diagrams representative of conventional 'composite' Li-ion battery electrodes which consist of a slurry cast mixture of active materials, according to some implementations.

FIG. 3A shows a micrograph of an example enlarged section of the 3D self-assembled binder-less mesoporous carbon-based particle shown in FIGS. 1A-1J, according to some implementations.

FIG. 3B shows an illustrative schematic representation of a multi-layered carbon-based scaffolded structure, each layer comprising various concentrations of the 3D mesoporous carbon-based particles shown in FIGS. 1A-1J, deposited on an electrically conductive substrate, according to some implementations.

FIG. 12 shows a listing of properties associated with the 3D mesoporous carbon-based particles shown in FIGS. 1A-1J, according to some implementations.

FIG. 13 shows various charts, equipment, and particle products of carbon and/or 3D graphene, according to some implementations.

FIG. 14 shows various depictions of porous innately graphene nano-platelets (GNP) connected particle products and/or FLG and related equipment, according to some implementations.

FIG. 17 shows a listing of properties and/or features associated with integrated 3D scaffolded films formed at least in part by the 3D mesoporous carbon-based particles shown in FIGS. 1A-1J, according to some implementations.

FIG. 18 shows a listing of properties and/or features associated with reactor-to-film processed carbons, according to some implementations.

FIG. 19 shows a general progression of proprietary carbon deposition associated with the 3D mesoporous carbon-based particles shown in FIGS. 1A-1J, carbon-based materials being deposited on a substrate by roll-to-roll (R2R) processing, according to some implementations.

FIG. 20 shows a listing of features of the 3D mesoporous carbon-based particles shown in FIGS. 1A-1J that enable significant battery performance advantages over currently available Li-ion batteries, according to some implementations.

FIG. 28 shows a listing of various battery-related industry challenges, according to some implementations.

FIG. 29A-29N show various proprietary approaches concerning a pre-lithiated carbon host structure and/or active Li ion intercalating structures for the 3D self-assembled binder-less mesoporous carbon-based particle shown in FIGS. 1A-1J, according to some implementations.

FIG. 31 shows a listing of reactor tuning parameters and/or properties, according to some implementations.

FIG. 32 shows various properties associated with bilayer graphene, according to some implementations.

Figure 4A:
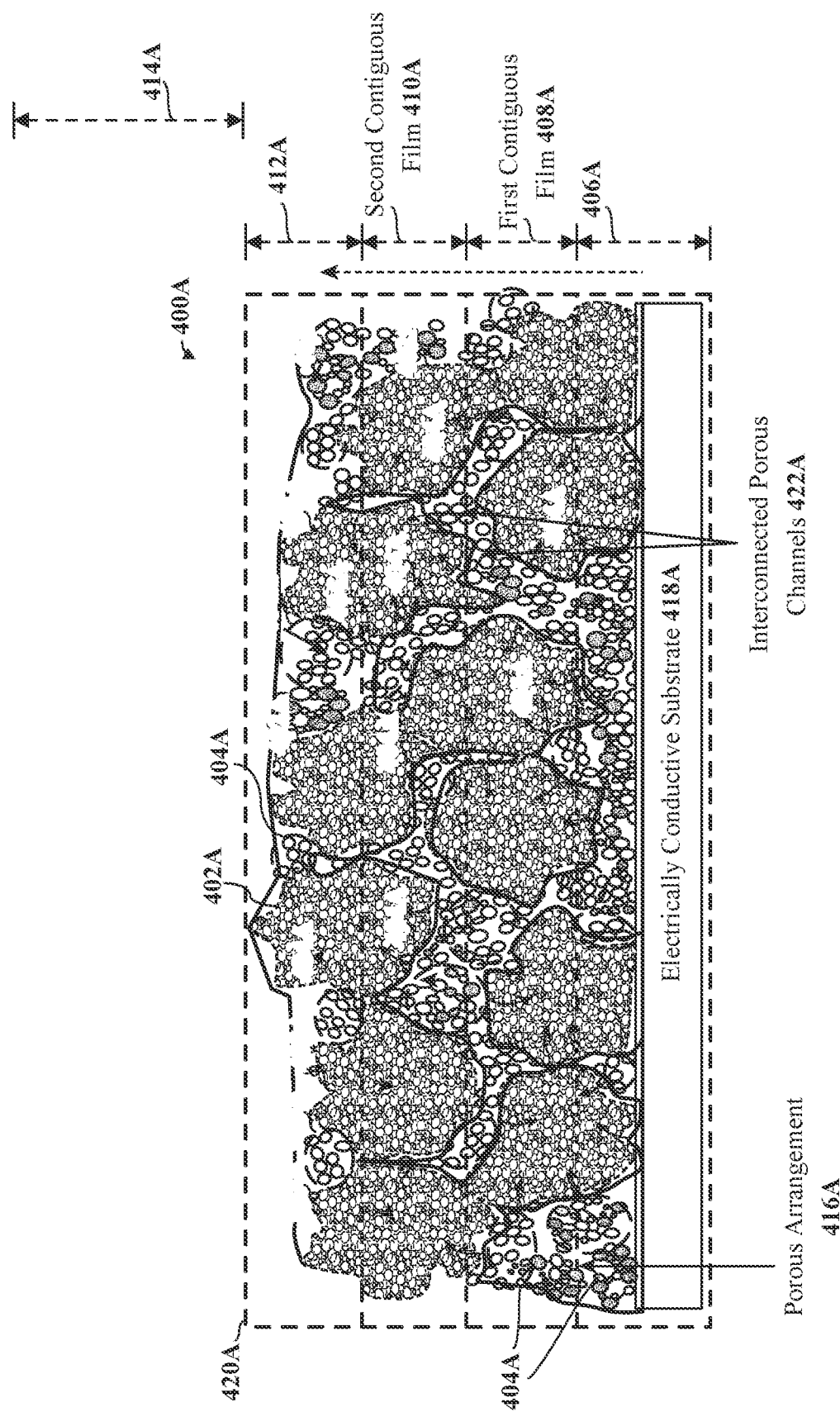
FIG. 4A shows an illustrative schematic representation of a multi-layered carbon-based scaffolded structure, each layer comprising various concentrations of the 3D mesoporous carbon-based particles shown in FIGS. 1A-1J, deposited on an electrically conductive substrate, the multi-layered carbon-based scaffolded structure having lithium metal infused into nanoscale gaps therein, according to some implementations.

To facilitate understanding, identical reference numerals have been used, where possible, to designate identical elements that are common to the figures. It is contemplated that elements disclosed may be beneficially utilized on other elements without specific recitation. The drawings referred to here should not be understood as being drawn to scale unless specifically noted. Also, the drawings are often simplified, and details or components omitted for clarity of presentation and explanation. The drawings and discussion serve to explain principles discussed below, where like designations denote like elements.

DETAILED DESCRIPTION

Various aspects of the novel systems, apparatuses, and methods are described more fully herein with reference to the accompanying drawings. The teachings disclosed can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art.

Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus can be implemented, or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. Any aspect disclosed herein can be embodied by one or more elements of a claim.

Although some examples and aspects are described herein, many variations and permutations of these examples fall within the scope of the disclosure. Although some benefits and advantages of the preferred aspects are mentioned, the scope of the disclosure is not intended to be limited to benefits, uses, or objectives. Rather, aspects of the disclosure are intended to be broadly applicable to a 3D self-assembled multi-modal mesoporous carbon-based particle composed of electrically conductive three-dimensional (3D) aggregates of graphene sheets, some of which are illustrated in the figures and in the following description of the preferred aspects. The detailed description and drawings are merely illustrative of the disclosure rather than limiting, the scope of the disclosure being defined by the appended claims and equivalents thereof.

Definitions

Li-Ion Batteries

A Li-ion battery is a type of secondary (rechargeable) battery. Li-ion battery technology has become very important in recent years as these batteries show great promise as power sources that can lead to an electric vehicle (EV) revolution (referring to widespread implementation of EVs across numerous applications). The development of new materials (for Li-ion batteries) is the focus of research in the field of materials science, as Li-ion batteries can be considered to be the most impressive success story of modern electrochemistry. Li-ion batteries power most modern portable devices and seem to have overcome psychological barriers of the consuming public against the use of such high energy density devices on a larger scale for more demanding applications, such as EV.

Regarding operation, in Li-ion batteries, Li ions (Li+) migrate from the negative electrode through an electrolyte to the positive electrode during discharge and return when charging. Li-ion batteries traditionally use an intercalated Li compound as a formative material at the positive electrode and graphite at the negative electrode. The batteries have a high energy density, no "memory-effect" (describing the situation in which nickel-cadmium batteries gradually lose their maximum energy capacity if they are repeatedly recharged after being only partially discharged) and low self-discharge. However, unlike conventional battery chemistries, Li ion batteries can (due to the highly reactive nature of elemental and ionic Li) present a safety hazard. Under certain conditions, since Li ion batteries can contain a flammable electrolyte, if they are punctured, hit, otherwise damaged or even incorrectly (excessively) charged, Li batteries can deteriorate unexpectedly, including through explosions and fires. Nevertheless, the high energy density of Li ion batteries permits for longer usable lifespans of several hours between charging cycles, and longer cycle life, referring to the electric current delivery or output performance of a given Li-ion battery over multiple repeat charge-discharge (partial or total charge depletion) cycles.

Li metal, due to its high theoretical specific capacity of 3,860 mAh/g, low density (0.59 g cm-3) and low negative electrochemical potential (−3.040 V compared to a standard hydrogen electrode), appears as an ideal material for the negative electrode of secondary Li-ion batteries. However, unavoidable and uncontrollable dendrite growth, referring the growth of a branching tree-like structure within the battery itself, caused by Li precipitates can cause serious safety concerns related to short-circuits, and limited Coulombic efficiency, referring to the charge efficiency by which electrons are transferred in batteries, during deposition and stripping operations inherent in Li-ion batteries. Such challenges have previously impeded Li ion battery applications.

However, concerns related to safety of earlier-developed Li secondary batteries led to the creation and refinement of newer generation Li-ion secondary batteries. Such Li-ion batteries typically feature carbonaceous materials used as an anode, such carbonaceous anode materials including: (1) graphite; (2) amorphous carbon; and, (3) graphitized carbon. The first type of the three carbonaceous materials presented above includes naturally occurring graphite and synthetic graphite, such as artificial graphite, such as Highly Oriented Pyrolytic Graphite, HOPG). Either form of graphite can be intercalated with Li. The resulting Graphite Intercalation Compound (GIC) may be expressed as $Li_xC_6$, where X is typically less than 1. To limit (minimize) the loss in energy density due to the replacement of Li metal with the GIC, X in $Li_xC_6$ must be maximized and the irreversible capacity loss ($Q_{ir}$), in the first charge of the battery must be minimized.

The maximum amount of Li that can be reversibly intercalated into the interstices between graphene planes of a perfect graphite crystal is generally believed to occur in a graphite intercalation compound represented by $Li_xC_6$ (x=1), corresponding to a theoretical 372 mAh/g. However, such a limited specific capacity (of the discussed theoretical 372 mAh/g) cannot satisfy the demanding requirements of the higher energy-density power needs of modern electronics and EVs.

Carbon-based anodes, such as (1) graphite intercalated with Li as discussed above, can demonstrate extended cycle lifespans due to the presence of a surface-electrolyte interface layer (SEI), which results from the reaction between Li and surrounding electrolyte (or between Li and the anode surface/edge atoms or functional groups) during the initial several charge-discharge cycles. Li ions consumed in this reaction (referring to the formation of the SEI) may be derived from some of the Li ions originally intended for the charge transfer purpose (referring to the dissociation of elemental Li when intercalated with carbon in a carbon-based structure, such as the anode, during Li ion movement in electrolyte across a porous separator to the cathode as related to electron release and flow to power a load during Li ion battery discharge cycles. As the SEI is formed, the Li ions become part of the inert SEI layer and become "irreversible", in that they can no longer be an active element (or ion) used for charge transfer. As a result, it is desirable to minimize the amount of Li used for the formation of an effective SEI layer. In addition to SEI formation, $Q_{ir}$, has been attributed to graphite exfoliation caused by electrolyte/solvent co-intercalation and other side reactions.

Referring anode carbonaceous material introduced earlier, (2) amorphous carbon, contains no (or very little) micro- or nano-crystallites. Amorphous carbon includes both so-called "soft carbon" and "hard carbon". Soft carbon refers to a carbon material that can be graphitized at a temperature of about 2,500° C. or higher. In contrast, hard carbon refers to a carbon material that cannot be graphitized at a temperature higher than 2,500° C.

However, in practice and industry, the so-called "amorphous carbons" commonly used as anode active materials may not be purely amorphous, but rather contain some minute amount of micro- or nano-crystallites, each crystallite being defined as a small number of graphene sheets (oriented as basal planes) that are stacked and bonded together by weak van der Waals forces. The number of graphene sheets can vary between one and several hundreds, giving rise to a c-directional dimension (thickness $L_e$) of typically 0.34 nm to 100 nm. The length or width ($L_a$) of these crystallites is typically between tens of nanometers to microns.

Among this class of carbon materials, soft and hard carbons can be produced by low-temperature pyrolysis (550-1,000° C.) and exhibit a reversible specific capacity of 400-800 mAh/g in the 0-2.5 V range. A so-called "houseof-cards" carbonaceous material has been produced with enhanced specific capacities approaching 700 mAh/g.

Research groups have obtained enhanced specific capacities of up to 700 mAh/g by milling graphite, coke, or carbon fibers and have elucidated the origin of the additional specific capacity with the assumption that in disordered carbon containing some dispersed graphene sheets (referred to as "house-of-cards" materials), Li ions are adsorbed on two sides of a single graphene sheet. It has been also proposed that Li readily bonds to a proton-passivated carbon, resulting in a series of edge-oriented Li—C—H bonds. This provides an additional source of Li+ in some disordered carbons. Other research suggested the formation of Li metal monolayers on the outer graphene sheets of graphite nanocrystallites. The discussed amorphous carbons were prepared by pyrolyzing epoxy resins and may be more correctly referred to as polymeric carbons. Polymeric carbon-based anode materials have also been studied.

Chemistry, performance, cost and safety characteristics may vary across Li ion battery variants. Handheld electronics may use Li polymer batteries (with a polymer gel as electrolyte) with Li cobalt oxide ($LiCoO_2$) as cathode material, which offers high energy density but may present safety risks, especially when damaged. Li iron phosphate ($LiFePO_4$), Li ion manganese oxide battery ($LiMn_2O_4$, $Li_2MnO_3$, or LMO), and Li nickel manganese cobalt oxide ($LiNiMnCoO_2$ or NMC) may offer lower energy density but provide longer useful lives and less likelihood of fire or explosion. Such batteries are widely used for electric tools, medical equipment, and other roles. NMC in particular is often considered for automotive applications.

Electrical Conductance of Carbon-Based Materials

Advances in high conductance carbon materials such as carbon nanotubes (CNT), graphene, amorphous carbon, and/or crystalline graphite in electronics allows for the printing of these materials onto many types of surfaces without necessarily using printed circuit boards, and/or without the use of materials or compounds that have been identified as being toxic to humans. Usage of high conductance carbon as a feedstock material and/or other material during any one or more of the additive manufacturing processes described above may facilitate the fabrication of batteries (including Li ion batteries) with micro-lattice structures suitable for enhanced functionality, electric power storage and delivery, and optimal efficiency. Moreover, although many of the devices described may serve as power sources (batteries, capacitors), those of skill in the art will appreciate that such 3D printing technologies may be reconfigured using high conductance carbon materials such as carbon nanotubes (CNT), graphene, amorphous carbon, or crystalline graphite can to form other electronic devices.

Printing technologies using high conductance carbon materials such as carbon nanotubes (CNT), graphene, amorphous carbon, or crystalline graphite may be implemented and/or otherwise incorporated in the fabrication of the following devices: antennas (tuned antennas), sensors (biosensors), energy harvesters (photocells), and other electronic devices.

Graphene

Graphene is an allotrope of carbon in the form of a single layer of atoms in a two-dimensional hexagonal lattice in which one atom forms each vertex. It is the basic structural element of other allotropes, including graphite, charcoal, carbon nanotubes and fullerenes. It can also be considered as an indefinitely large aromatic molecule, the ultimate case of the family of flat polycyclic aromatic hydrocarbons.

Graphene has a special set of properties which set it apart from other elements. In proportion to its thickness, it is about 100 times stronger than the strongest steel. Yet its density is dramatically lower than any other steel, with a surfacic (surface-related) mass of 0.763 mg per square meter. It conducts heat and electricity very efficiently and is nearly transparent. Graphene also shows a large and nonlinear diamagnetism, even greater than graphite and can be levitated by Nd—Fe—B magnets. Researchers have identified the bipolar transistor effect, ballistic transport of charges and large quantum oscillations in the material. Its end-use application areas are widespread, finding unique implementations in advanced materials and composites, as well as being used as a formative material to construct ornate scaffolds usable in Li ion battery electrodes to enhance ion transport and electric current conduction to yield specific capacity and power delivery figures not otherwise attainable by conventional battery technologies.

Chemical Functionalization of Graphene

Functionalization, as generally understood and as referred to herein, implies the process of adding new functions, features, capabilities, or properties to a material or substance by altering the surface chemistry of the material. Functionalization is a fundamental technique used throughout chemistry, materials science, biological engineering, textile engineering, and nanotechnology and may be performed by attaching molecules or nanoparticles to the surface of a material, with a chemical bond or through adsorption, the adhesion of atoms, ions or molecules from a gas, liquid or dissolved solid to a surface to create a film of the adsorbate on the surface of the adsorbent without forming a covalent or ionic bond thereto.

Functionalization and dispersion of graphene sheets may be of critical importance to their respective end-use applications. Chemical functionalization of graphene enables the material to be processed by solvent-assisted techniques, such as layer-by-layer assembly, spin-coating, and filtration and also prevents the agglomeration of single layer graphene (SLG) during reduction and maintains the inherent properties of graphene.

Currently, the functionalization of graphene may be performed by covalent and noncovalent modification techniques. In both instances, surface modification of graphene oxide followed by reduction has been carried out to obtain functionalized graphene. It has been found that both the covalent and noncovalent modification techniques are very effective in the preparation of processable graphene.

However, electrical conductivity of functionalized graphene has been observed to decrease significantly compared to pure graphene. Moreover, the surface area of the functionalized graphene prepared by covalent and non-covalent techniques decreases significantly due to the destructive chemical oxidation of flake graphite followed by sonication, functionalization and chemical reduction. To overcome these problems, studies have been reported on the preparation of functionalized graphene directly from graphite (one-step process). In all these cases, surface modification of graphene can prevent agglomeration and facilitates the formation of stable dispersions. Surface modified graphene can be used for the fabrication of polymer nanocomposites, Li ion battery electrodes, super-capacitor devices, drug delivery system, solar cells, memory devices, transistor device, biosensor, etc.

Graphite

Graphite, as commonly understood and as referred to herein, implies a crystalline form of elemental carbon with atoms arranged in a hexagonal structure. Graphite occurs naturally in this form and is the most stable form of carbon under standard (atmospheric) conditions. Otherwise, under high pressures and temperatures, graphite converts to diamond. Graphite is used in pencils and lubricants. Its high conductivity makes it useful in electronic products such as electrodes, batteries, and solar panels.

Roll-to-Roll (R2R) Processing

R2R processing refers to the process of creating electronic devices on a roll of flexible plastic or metal foil. R2R processing may also refer to any process of applying coatings, printing, or performing other processes starting with a roll of a flexible material and re-reeling after the process to create an output roll. These processes, and others such as sheeting, may be grouped together under the general term "converting". When the rolls of material have been coated, laminated or printed they can be subsequently cut and/or slit to their finished size on a slitter rewinder.

R2R processing of large-area electronic devices may reduce manufacturing cost. Other applications could arise which take advantage of the flexible nature of the substrates, such as electronics embedded into clothing, 3D-printed Li ion batteries, large-area flexible displays, and roll-up portable displays.

Oxidation-Reduction (Redox) Reactions

Redox are a type of chemical reaction in which the oxidation states of atoms are changed. Redox reactions are characterized by the transfer of electrons between chemical species, most often with one species (the reducing agent) undergoing oxidation (losing electrons) while another species (the oxidizing agent) undergoes reduction (gains electrons). The chemical species from which the electron is stripped is said to have been oxidized, while the chemical species to which the electron is added is said to have been reduced.

Intercalation

As commonly understood and as referred to herein, in chemistry, intercalation is the reversible inclusion or insertion of a molecule (or ion) into materials with layered structures. Examples are found in graphite, graphene, and transition metal dichalcogenides.

Li Intercalation into Bi- or Multi-Layer Graphene

Electrical storage capacity of graphene and the Li-storage process in graphite currently present challenges requiring further development in the field of Li ion batteries. Efforts have therefore been undertaken to further develop three-dimensional bi-layer graphene foam with few defects and a predominant Bernal stacking configuration, a type of bilayer graphene where half of the atoms lie directly over the center of a hexagon in the lower graphene sheet, and half of the atoms lie over an atom, and to investigate its Li-storage capacity, process, kinetics, and resistances. Li atoms may be stored only in the graphene interlayer. Further, various physiochemical characterizations of the staged Li bilayer graphene products further reveal the regular Li-intercalation phenomena and illustrate this Li storage pattern of two-dimensions.

Electrochemical Capacitors (ECs)

Electrochemical capacitors (ECs), also referred to as "ultracapacitors" and/or "supercapacitors", are considered for uses in hybrid or full EVs. ECs can supplement (or in certain uses replace) traditional batteries, including high-performance Li ion batteries, used in an EVs to provide short bursts of power (forward propulsion) often needed for rapid acceleration. Traditional batteries may still be used provide uniform power for cruising at normal highway speeds, but supercapacitors (with their ability to release energy much more quickly than batteries) may activate and supplement battery-provided power at times when the car needs to accelerate, such as for merging, passing, emergency maneuvers, and hill climbing.

ECs must also store sufficient energy to provide an acceptable driving range, such as from 220-325 miles or more. And, to be cost- and weight-effective compared to additional battery capacity, ECs must combine adequate specific energy and specific power with long cycle life, and meet cost targets as well. Specifically, ECs for application in EVs must store about 400 Wh of energy, be able to deliver about 40 kW of power for about 10 seconds, and provide high cycle-life (>100,000 cycles).

The high volumetric capacitance density of an EC (10 to 100 times greater than conventional capacitors) derives from using porous electrodes, which may incorporate, feature, and/or be constructed from scaffolded graphene-based materials, to create a large effective "plate area" and from storing energy in the diffuse double layer. This double layer, created naturally at a solid-electrolyte interface when voltage is imposed, has a thickness of only about 1-2 nm, therefore forming an extremely small effective "plate separation." In some ECs, stored energy is further augmented by pseudo-capacitance effects, occurring again at the solid-electrolyte interface due to electrochemical phenomena such as the redox charge transfer. The double layer capacitor is based on a high surface area electrode material, such as activated carbon, immersed in an electrolyte. A polarized double layer is formed at electrode-electrolyte interfaces providing high capacitance.

Overview

Introduction

Advances in modern carbon-based materials (graphene) have enhanced applications using such materials, such as in secondary batteries. Electrochemical Li intercalation or de-intercalation properties of carbon and carbon-based materials depend significantly on their respective morphology, crystallinity, orientation of crystallites, and defects as well. Further, the electric storage capacity of a Li-ion battery can be enhanced by the selection and integration of desirable nano-structured carbon materials such as carbon in certain allotropes such as graphite and graphene, or nano-sized graphite, nanofibers, isolated single walled carbon nanotubes, nano-balls, and nano-sized amorphous carbon, having small carbon nanostructures in which no dimension is greater than about 2 µm.

For example, known methods for fabricating carbon and Li-ion electrodes for rechargeable Li cells include steps for forming a carbon electrode composed of graphitic carbon particles adhered by an ethylene propylene diene monomer binder used to achieve a carbon electrode capable of subsequent intercalation by Li-ions. The carbon electrode is reacted with Li-ions to incorporate Li-ions into graphitic carbon particles of the electrode. An electrical current is repeatedly applied to the carbon electrode to initially cause a surface reaction between the Li-ions and to the carbon and subsequently cause intercalation of the Li-ions into crystalline layers of the graphitic carbon particles. With repeated application of the electrical current, intercalation is achieved to near a theoretical maximum.

Other exfoliated graphite-based hybrid material compositions relate to: (a) micron- or nanometer-scaled particles or coating which are capable of absorbing and desorbing alkali or alkaline metal ions (particularly, Li ions); and, (b) exfoliated graphite flakes that are substantially interconnected to form a porous, conductive graphite network comprising pores. The particles or coating resides in a pore of the network or is attached to a flake of the network. The exfoliated graphite amount is in the range of 5% to 90% by weight and the number of particles or amount of coating is in the range of 95% to 10% by weight.

Also, high capacity silicon-based anode active materials have been shown to be effective in combination with high capacity Li rich cathode active materials. Supplemental Li is shown to improve the cycling performance and reduce irreversible capacity loss for some silicon based active materials. Silicon based active materials can be formed in composites with electrically conductive coatings, such as pyrolytic carbon coatings or metal coatings, and composites can also be formed with other electrically conductive carbon components, such as carbon nano fibers and carbon nanoparticles.

And, known rechargeable batteries of an alkali metal having an organic electrolyte experiences little capacity loss upon intercalation of the carbonaceous electrode with the alkali metal. The carbonaceous electrode may include a multi-phase composition including both highly graphitized and less graphitized phases or may include a single phase, highly graphitized composition subjected to intercalation of Li at above about 50° C. Incorporation of an electrically conductive filamentary material such as carbon black intimately interspersed with the carbonaceous composition minimizes capacity loss upon repeated cycling.

Otherwise, a known Li based negative electrode material is characterized by comprising 1 $m^2$/g or more of carbonaceous negative electrode active material specific surface area, a styrene-butadiene rubber binder, and a fiber diameter formed to 1,000 nanometers of carbon fiber. Such negative electrode materials are used for Li batteries, which have desirable characteristics, such as a low electrode resistance, high strength of the electrode, an electrolytic solution having excellent permeability, high energy density and a high rate charge/discharge. The negative electrode material contains 0.05 to 20 mass % of carbon fibers and a styrene at 0.1 to 6.0% by mass. Butadiene rubber forms the binder and may further contain 0.3 to 3% by mass thickener, such as carboxymethyl methylcellulose.

Still further, existing technologies relate to a battery that has an anode active material that has been: (1) pre-lithiated; and, (2) pre-pulverized. This anode may be prepared with a method that comprises: (a) providing an anode active material; (b) intercalating or absorbing a desired amount of Li into the anode active material to produce a pre-lithiated anode active material; (c) comminuting, referring to the reduction of solid materials from one average particle size to a smaller average particle size, by crushing, grinding, cutting, vibrating, or other processes, the pre-lithiated anode active material into fine particles with an average size less than 10 μm (preferably <1 μm and most preferably <200 nm); and, (d) combining multiple fine particles of the pre-lithiated anode active material with a conductive additive and/or a binder material to form the anode. The pre-lithiated particles are protected by a Li ion-conducting matrix or coating material. The matrix material is reinforced with nano graphene platelets.

Graphitic nanofibers have also been disclosed and include tubular fullerenes (commonly called "buckytubes"), nano tubes and fibrils, which are functionalized by chemical substitution, are used as electrodes in electrochemical capacitors. The graphitic nanofiber-based electrode increases the performance of the electrochemical capacitors. Preferred nanofibers have a surface area greater than about 200 $m^2$/gm and are substantially free of micropores.

And, known high surface area carbon nanofibers have an outer surface on which a porous high surface area layer is formed. Methods of making the high surface area carbon nanofiber include pyrolyzing a polymeric coating substance provided on the outer surface of the carbon nanofiber at a temperature below the temperature at which the polymeric coating substance melts. The polymeric coating substance used as the high surface area around the carbon nanofiber may include phenolics such as formaldehyde, polyacrylonitrile, styrene, divinyl benzene, cellulosic polymers and cyclotrimerized diethynyl benzene. The high surface area polymer which covers the carbon nanofiber may be functionalized with one or more functional groups.

3D Self-Assembled Binder-Less Mesoporous Carbon-Based Particle

As presented above, conventional Li-intercalated carbon-based compositions or compounds may include traditional battery electrode materials such as:
(1) graphene or multi-layer 3D graphene particles;
(2) electrically conductive carbon particles; and,
(3) binder, such as that provided as a fluid (for example, liquid) form and/or in particulate form.

In conventional techniques, particles are all typically deposited, such as being dropped into, existing slurry cast electrodes including current collectors made from metal foil such as copper. Slurry typically is prepared to contain an organic binder or binder material referred to as NMP, an organic compound consisting of a 5-membered lactam, used in the petrochemical and plastics industries as a solvent, exploiting its nonvolatility and ability to dissolve diverse materials. The ratio of active materials to conductive carbon or carbon-based particles is usually at 5 parts of conductive carbon to a predominant balance of active material with a nominal quantity of binder or binding material (such as NMP) included as well. The relative amounts of binder and conductive phases of carbon may be dictated by creating an electrically conductive path or paths between larger particles of those mentioned.

Regarding difficulties related to binder implementation and usage in secondary batteries, studies have shown that developing high-performance battery systems requires the optimization of every battery component, from electrodes and electrolyte to binder systems. However, the conventional strategy to fabricate battery electrodes by casting a mixture of active materials, a nonconductive polymer binder, and a conductive additive onto a metal foil current collector usually leads to electronic or ionic bottlenecks and poor contacts due to the randomly distributed conductive phases. When high-capacity electrode materials are employed, the high stress generated during electrochemical reactions disrupts the mechanical integrity of traditional binder systems, resulting in decreased cycle life of batteries. Thus, it is critical to design novel binder systems, or scaffolded carbon-based electrode structures that demonstrate structural integrity absent of usage of a binder, that can provide robust, low-resistance, and continuous internal pathways to connect all regions of the electrode.

In contrast to that traditionally done and further in view of addressing the various shortcomings of binder performance related to decreased cycle life of batteries as described above, presently disclosed inventive compositions of matter and methods or processes for the production thereof eliminate:
(1) any and all forms of a binder phase; and,
(2) potentially certain regions, features and/or aspects of a conductive phase defined by larger carbon-based particles, such as those including graphite, and/or forms of graphene extracted or otherwise created from the exfoliation of graphite.

This is done by fabricating a particle where interconnected 3D agglomerations of multiple layers of graphene sheets sinter (randomly, or with controlled directionality) or otherwise adjoin together to serve as a type of intrinsic, self-supporting, "binder" or joining material that serves as a binder replacement, effectively allowing for the elimination of a separate traditional binder material. Such a format also permits for the elimination of a current collector, which is typically a required component of many batteries. Elimination of the binder phase and/or the current collector, as so disclosed by the present examples, provide for beneficial and desirable features, such as:
 (1) having low per-unit production cost allowing for mass-producibility
 (2) high reversible specific capacity
 (3) low irreversible capacity
 (4) small particle sizes (permitting for high throughput/rate capacity)
 (5) compatibility with commonly used electrolytes for convenient integration and usage in commercial electrochemical cell (battery) applications, and
 (6) long charge-discharge cycle life for consumer benefit (across any number of demanding end-use applications, including automobiles, airplanes, and spacecraft).

Notably, techniques disclosed herein yield unexpected favorable results by, instead of relying upon traditional processes to create graphene sheets such as from the exfoliation of graphite, synthesizing a multi-modal mesoporous carbon-based particle in an atmospheric plasma-based vapor flow stream either in-flight (to nucleate from an initially formed carbon-based homogenous nucleation) or deposited directly onto a supporting or sacrificial substrate. Therefore, techniques permit for the growth of ornate carbon-based structures independent (absent) of a traditionally required seed particle (upon which nucleation occurs).

In conventional techniques, the production of functional graphene relies upon usage of graphite as a starting material. Graphite, being a conductive material, has been used as an electrode in batteries and other electrochemical devices. In addition to its function as an inert electrode, electrochemical methods have been employed to form graphite intercalation compounds (GICs) and, more recently, to exfoliate graphite into few-layered graphene ("exfoliation", as generally understood and as referred to herein, implies—in an intercalation chemistry related context—the complete separation of layers of material, and typically requires aggressive conditions involving highly polar solvents and aggressive reagents). Electrochemical methods are attractive as they eliminate the use of chemical oxidants as the driving force for intercalation or exfoliation, and an electromotive force is controllable for tunable GICs. More importantly, the extensive capabilities of electrochemical functionalization and modification enable the facile synthesis of functional graphene and its value-added nanohybrids.

Unlike exfoliation, or the thermal exfoliation of graphite to produce graphene, the presently disclosed methods relate to one or more carbon-inclusive gaseous species, such as those including methane ($CH_4$), being flowed into a reaction chamber of a microwave-based or thermal reactor. Upon receipt of energy (such as electromagnetic radiation and/or thermal energy), incoming gaseous species spontaneously crack to form allotropes with other cracked carbons (from additional gaseous species supplied into the reactor) to create an initial carbon-based site (such as a formed particle), which either has (or otherwise facilitates):
 a. additional particles that grow or nucleate off of defects from that initial formed particle; or,
 b. sinter additional carbon-based particles, where there is sufficient local energy at the collision spot for the colliding particles to sinter together (to be described in further detail below).

System Structure

3D Self-Assembled Binder-Less Multi-Modal Mesoporous Carbon-Based Particle—in Detail FIG. 1A shows a three-dimensional (3D) self-assembled binder-less multi-modal mesoporous carbon-based particle 100A having controllable electrical and ionic conducting gradients distributed throughout, within which various aspects of the subject matter disclosed herein may be implemented. A mesoporous material, as generally understood and as referred to herein, implies a material containing pores with diameters between 2 and 50 nm, according to IUPAC nomenclature For the purposes of comparison, IUPAC defines microporous material as a material having pores smaller than 2 nm in diameter and macroporous material as a material having pores larger than 50 nm in diameter.

Mesoporous materials may include various types of silica and alumina that have similarly sized mesopores. Mesoporous oxides of niobium, tantalum, titanium, zirconium, cerium and tin have been researched and reported. Of all the variants of mesoporous materials, mesoporous carbon has achieved particular prominence, having direct applications in energy storage devices. Mesoporous carbon is defined as having porosity within the mesopore range, and this significantly increases the specific surface area. Another common mesoporous material is "activated carbon", referring to a form of carbon processed to have small, low-volume pores that increase the surface area. Activated carbon, in a mesoporous context, is typically composed of a carbon framework with both mesoporosity and microporosity (depending on the conditions under which it was synthesized). According to IUPAC, a mesoporous material can be disordered or ordered in a mesostructure. In crystalline inorganic materials, mesoporous structure noticeably limits the number of lattice units, and this significantly changes the solid-state chemistry. For example, the battery performance of mesoporous electroactive materials is significantly different from that of their bulk structure.

Mesoporous carbon-based particle 100A is nucleated and grown in an atmospheric plasma-based vapor flow stream of reagent gaseous species, which may include methane ($CH_4$), to form an initial carbon-containing and/or carbon-based particle. That initial particle may be expanded upon either:
 (1) "in-flight", describing the systematic coalescence (referring to nucleation and/or growth from an initial carbon-based homogenous nucleation independent of a seed particle) of additional carbon-based material derived from incoming carbon-containing gas mid-air within a microwave-plasma reaction chamber (as shown by micrograph 100D in FIG. 1D); or,
 (2) grown (and/or deposited) directly onto a supporting or sacrificial substrate, such as a current collector, within a thermal reactor.

In chemistry-related context, "coalescence" implies a process in which two phase domains of the same composition come together and form a larger phase domain. Alternatively put, the process by which two or more separate masses of miscible substances seem to "pull" each other together should they make the slightest contact. Mesoporous carbon-based particle 100A, may be alternatively referred to as just "particle", and/or by any other similar term. The term "mesoporous", as both generally understood and as used herein, may be defined as a material containing pores with diameters between 2 and 50 nm, according to International Union of Pure and Applied Chemistry ("IUPAC") nomenclature.

Referring to synthesis and/or growth of mesoporous carbon-based particle 100A within a reaction chamber in and/or otherwise associated with a microwave-based reactor, such as a reactor disclosed by Stowell, et al., "Microwave Chemical Processing Reactor", U.S. Pat. No. 9,767,992, (Sep. 19, 2017), incorporated by reference herein in its entirety, or thermal reactor, referring generally to a chemical reactor defined by an enclosed volume in which a temperature-dependent chemical reactor occurs.

Mesoporous carbon-based particle 100A (also mesoporous carbon-based particle 100E as shown in FIG. 1E) is synthesized with a three-dimensional (3D) hierarchical structure comprising short range, local nano-structuring in combination with long range approximate fractal feature structuring, which in this context refers to the formation of successive layers involving the 90-degree rotation of each successive layer relative to the one beneath it, and so on and so forth, allowing for the creation of vertical (or substantially vertical) layers and/or intermediate ("inter") layers.

The plurality of hierarchical (and/or contiguous) pores 107F (as shown in FIG. 1F) at least in part further define open porous scaffold 102A with one or more Li ion diffusion pathways 109F (as shown in FIG. 1F) having:

(1) microporous frameworks defined by a dimension 101F of >50 nm that provide tunable Li ion conduits;

(2) mesoporous channels defined by a dimension 101F of about 20 nm to about 50 nm (generally defined under IUPAC nomenclature and referred to as "mesopores" or "mesoporous") that act as Li ion-highways for rapid Li ion transport therein; and (3) microporous textures defined by a dimension 103F of <4 nm for charge accommodation and/or active material confinement.

Li ion diffusion pathways 109F and/or hierarchical porous network 100F more generally may act as or otherwise provide active Li intercalating structures, which may provide a source for specific capacity of an anode or cathode Li ion battery electrode at between about 744 mAh/g to about 1,116 mAh/g. Li may infiltrate open porous scaffold to at least partially chemically react with exposed carbon therein. Mesoporous carbon-based particle 100A may be synthesized at least in part by a vapor flow stream of gaseous reagents including any one or more of a saturated or unsaturated hydrocarbon, such as methane ($CH_4$), flowed onto a substrate in a reactor, such as a microwave-based reactor and/or a thermal reactor.

One or more physical, electrical, chemical and/or material properties of the mesoporous carbon-based particle 100A may be defined during its synthesis. Also, dopants (referring to traces of impurity element that is introduced into a chemical material to alter its original electrical or optical properties, such as Si, SiO, $SiO_2$, Ti, TiO, Sn, Zn, and/or the like) may be dynamically incorporated during synthesis of mesoporous carbon-based particle 100A to at least in part affect material properties including: electrical conductivity, wettability, and/or ion conduction or transport through hierarchical porous network 100F. Microporous textures having dimension 103F and/or hierarchical porous network 100F more generally may be synthesized, prepared or otherwise created to also (or otherwise) include smaller pores for chemical micro-confinement, the smaller pores being defined as ranging from 1 to 3 nm. Also, each graphene sheet (as shown in FIG. 1C) may range from 50 to 200 nm in diameter ($L_a$).

Figure 4B:
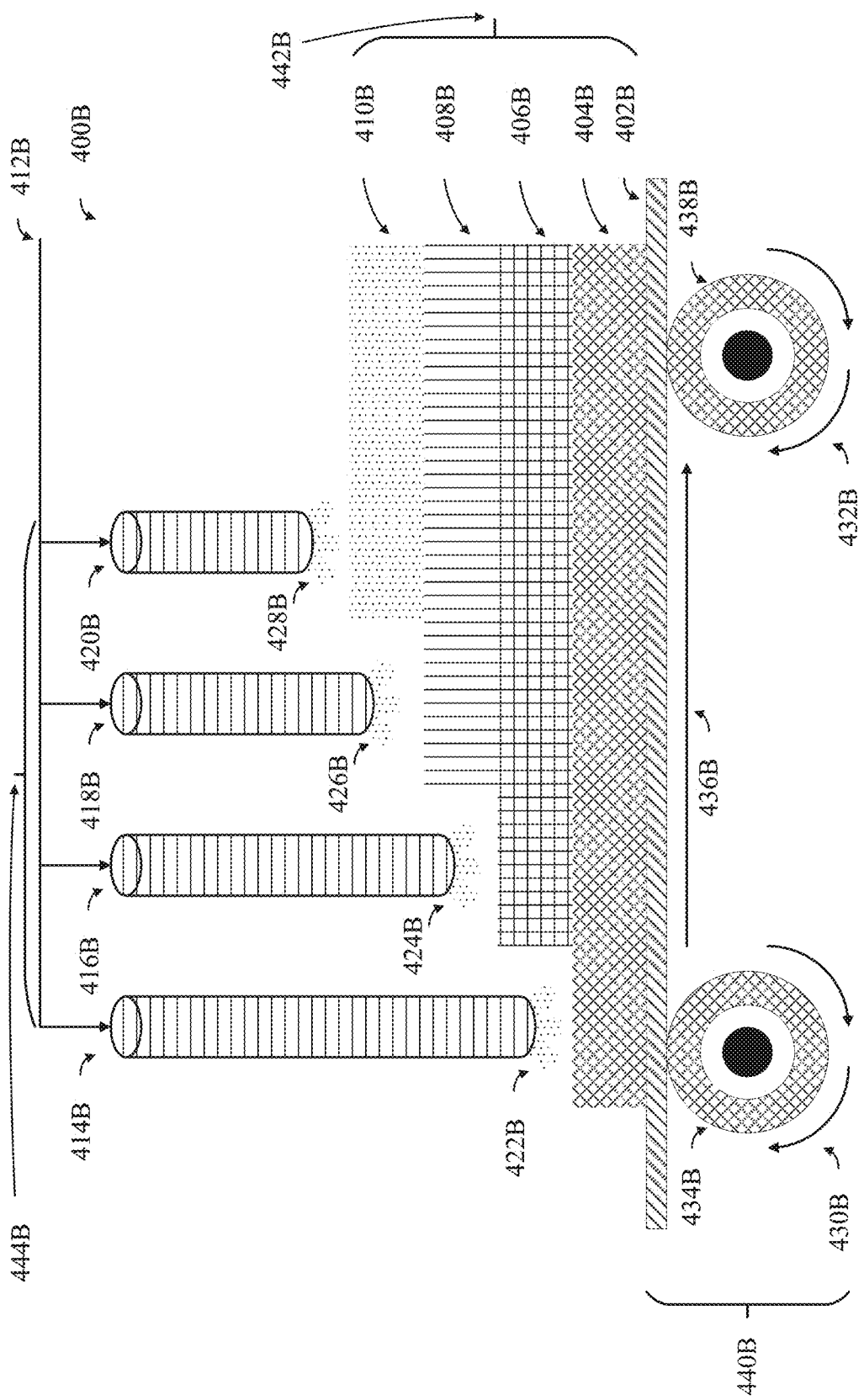
FIG. 4B shows an illustrative schematic representation of a series of plasma spray torches oriented in a substantially continuous sequence above a roll-to-roll (R2R) processing apparatus, where the plasma spray torches are configured to grow the 3D mesoporous carbon-based particles in an incremental layer-by-layer manner, according to some implementations.

Hierarchical porous network 100F, may be a further magnified and/or detailed variant of open porous scaffold 102A, may provide one or more active Li intercalating structures, to be further described in structure and/or functionality in connection with FIGS. 6-19C, which show various topic diagrams, flowcharts, schematics, photographs and/or micrographs related to lithium, lithium ion, sulfide, and/or lithium, sulfur and/or other element derived chemical substances and/or compounds infiltrated and/or infused into the multi-layered carbon-based scaffolded structure shown in FIG. 4B. Open porous scaffold 102A may be created independent of a binder, such as a traditional, nonconductive polymer binder typically used in conjunction with and a conductive additive onto a metal foil current collector in battery end-use applications. Traditional configurations involving usage of a binder can lead to electronic/current conduction-related or ionic constrictions and poor contacts due to randomly distributed conductive phases. Moreover, when high-capacity electrode materials are employed, relatively high physical stress generated during electrochemical reactions can disrupt mechanical integrity of traditional binder systems, therefore, in turn, reducing cycle life of batteries.

A vapor flow stream used to synthesize mesoporous carbon-based particle 100A may be at least flowed in part into a vicinity of a plasma, such as that generated and/or flowed into a reactor and/or chemical reaction vessel. Such a plasma reactor may be configured to propagate microwave energy toward the vapor flow stream to at least in part assist with synthesis of mesoporous carbon-based particle 100A, may involve carbon-particle based and/or derived nucleation and growth from constituent carbon-based gaseous species, such as methane ($CH_4$), where such nucleation and growth may substantially occur from an initially formed carbon-based homogenous nucleation independent of a seed particle within a reactor. More particularly, such a reactor accommodates control of gas-solid reactions under non-equilibrium conditions, where the gas-solid reactions may be controlled at least in part by any one or more of:

(1) ionization potentials and/or thermal energy associated with constituent carbon-based gaseous species introduced to the reactor for synthesis of the mesoporous carbon-based particle; and/or (2) kinetic momentum associated with the gas-solid reactions.

The vapor flow stream may be flowed into a reactor and/or reaction chamber for the synthesis of mesoporous carbon-based particle 100A at substantially atmospheric pressure. And, change in wettability of mesoporous carbon-based particle 100A (and/or any constituent members such as open porous scaffold 102A) at least in part may involve adjustment of polarity of a carbon matrix associated with mesoporous carbon-based particle 100A.

Those skilled in the art will appreciate that the representations provided in FIGS. 1A-1D, 1E and 1F, are provided as examples. Sample representations are shown of mesoporous carbon-based particle 100A, including:

(1) when synthesized in a microwave-based reactor in micrograph 100D in FIG. 1D;

(2) when synthesized in the form of multi-shell fullerene (CNO) shown in micrograph 100H in FIG. 1H;

(3) when used to decorate graphite to form graphene-decorated graphite shown in micrograph 100I in FIG. 1I; and, (4) when synthesized in-flight in a microwave reactor as shown by micrograph 100J in FIG. 1J.

Mesoporous Carbon-Based Particle—Procedures for Synthesis

Microwave Reactor

As introduced above, a vapor flow stream including carbon-containing constituent species, such as methane ($CH_4$) may be flowed into one of two general reactor types:
(1) a thermal reactor; or,
(2) a microwave-based (and/or "microwave") reactor. Suitable types of microwave reactors are disclosed by Stowell, et al., "Microwave Chemical Processing Reactor", U.S. Pat. No. 9,767,992 (Sep. 19, 2017), incorporated herein by reference in its entirety.

An example microwave processing reactor used to synthesize mesoporous carbon-based particle 100A may include microwave-generating energy source and a field-enhancing waveguide. The field-enhancing waveguide has a field-enhancing zone between a first cross-sectional area and a second cross-sectional area of the waveguide, and also has a plasma zone and a reaction zone. The second cross-sectional area is smaller than the first cross-sectional area, is farther away from the microwave energy source than the first cross-sectional area and extends along a reaction length of the field-enhancing waveguide. The supply gas inlet is upstream of the reaction zone. In the reaction zone, a majority of the supply gas flow is parallel to the direction of the microwave energy propagation. The supply gas is used to generate a plasma in the plasma zone to convert a process input material into separated components in the reaction zone at a pressure of at least 0.1 atmosphere, with a preference for 1 atmosphere where the surprising favorable physical properties of mesoporous carbon-based particle 100A, as discussed above, were discovered.

Propagation of microwave energy toward the carbon-containing or carbon-based vapor flow stream at least in part assists with synthesis of mesoporous carbon-based particle 100A and facilitates carbon-particle nucleation and growth within a reactor.

The term "in-flight" implies a novel method of chemical synthesis based on contacting particulate material derived from inflowing carbon-containing gaseous species, such as those containing methane ($CH_4$), to "crack" such gaseous species. "Cracking", as generally understood and as referred to herein, implies the technical process of methane pyrolysis to yield elemental carbon (such as high-quality carbon black) and hydrogen gas, "without the problematic contamination by carbon monoxide, and . . . with virtually no carbon dioxide emissions." A basic endothermic reaction that may occur within a microwave reactor is shown as equation (1) below:

$$CH_4 + 74.85 \text{ kJ/mol} \rightarrow C + 2H_2 \quad (1)$$

Carbon derived from the above-described "cracking" process and/or a similar or a dissimilar process may fuse together while being dispersed in a gaseous phase, referred to as "in-flight", to create carbon-based particles, structures, (substantially) 2D graphene sheets, 3D agglomerations, and/or pathways defined therein, including:
(1) a plurality of interconnected 3D agglomerations 101B of multiple layers of graphene sheets 101C (also, each sheet of graphene is schematically depicted in FIG. 1C) that are sintered together to form an open porous scaffold 102A that facilitates electrical conduction along and across contact points of the graphene sheets 101C (which, as shown in FIG. 1B, may include and/or refer to 5 to 15 layers of graphene are oriented in a stacked configuration to have a vertical height referred to as a stack height ($L_c$)); and, (2) a plurality of hierarchical pores 107F (as shown in FIG. 1F, and including pores 104F, 105F, and/or pathways 106F and/or 109F, any one or more which may be of a different dimension than the others) interspersed with the plurality of interconnected 3D agglomerations 101B of multiple layers of graphene sheets 101C, that may comprise one or more of single layer graphene (SLG), few layer graphene (FLG) defined as ranging from 5 to 15 layers of graphene, or many layer graphene (MLG), throughout the multi-modal mesoporous carbon-based particle 100A and/or 100E to define a hierarchical porous network 100F that facilitates rapid Li ion (Li+) 108F diffusion therein by orienting and/or manipulating, such as by shortening, Li ion diffusion pathways 106F and/or 109F.

As introduced earlier, interconnected 3D agglomerations of multiple layers of graphene sheets 101B sinter (or otherwise adjoin) together to serve as a type of intrinsic, self-supporting, "binder" or joining material allowing for the elimination of a separate traditional binder material. Sintering, or "frittage", as commonly understood and as referred to herein, implies the process of compacting and forming a solid mass of material by heat or pressure without melting it to the point of liquefaction. Sintering happens naturally in mineral deposits or as a manufacturing process used with metals, ceramics, plastics, and other materials. The atoms in the materials diffuse across the boundaries of the particles, fusing the particles together and creating one solid piece. Since sintering temperature does not have to reach the melting point of the material, sintering is often chosen as the shaping process for materials with extremely high melting points such as tungsten (W) and molybdenum (Mo). The study of sintering in metallurgy powder-related processes is known as powder metallurgy. An example of sintering can be observed when ice cubes in a glass of water adhere to each other, which is driven by the temperature difference between the water and the ice. Examples of pressure-driven sintering are the compacting of snowfall to a glacier, or the forming of a hard snowball by pressing loose snow together.

Few layer graphene (FLG), defined herein as ranging from 5 to 15 layers or sheets of graphene, are sintered, substantially as so-described above, at an angle that is not flat relative to other FLG sheets to nucleate and/or grow at an angle and therefore "self-assemble" over time. Moreover, process conditions may be tuned to achieve synthesis, nucleation, and/or growth of 3D multi-modal mesoporous carbon-based particles on a component and/or a wall surface within a reaction chamber, or entirely in-flight (upon contact with other carbon-based materials).

Electrical conductivity of deposited carbon and/or carbon-based materials may be tuned by adding metal additions into the carbon phase in the first part of the deposition phase or to vary the ratios of the various particles discussed. Other parameters and/or additions may be adjusted, as a part of an energetic deposition process, such that the degree of energy of deposited carbon and/or carbon-based particles will either: (1) bind together; or, (2) not bind together.

By nucleating and/or growing the multi-modal mesoporous carbon-based particle in an atmospheric plasma-based vapor flow stream either in-flight or directly onto a supporting or sacrificial substrate, a number of the steps and components found in both traditional batteries and traditional battery-making processes may be eliminated. Also, a considerable amount of tailoring and tunability can be enabled or otherwise added into the discussed carbons and/or carbon-based materials.

For instance, a traditional battery may use a starting stock of active materials, graphite, etc., which may be obtained as off-the-shelf materials to be mixed into a slurry. In contrast, the 3D self-assembled binder-less multi-modal mesoporous carbon-based particle 100A disclosed herein may enable, as a part of the carbon or carbon-based material synthesis and/or deposition process, tailoring and/or tuning the properties of materials, in real-time, as they are being synthesized in-flight and/or deposited onto a substrate. This capability presents a surprising, unexpected and substantial favorable departure from that currently available regarding creation of carbon-based scaffolded electrode materials in the secondary battery field.

Reactor and/or reactor design of that disclosed by Stowell, et al., "Microwave Chemical Processing Reactor", U.S. Pat. No. 9,767,992 (Sep. 19, 2017) may be adjusted, configured and/or tailored to control wanted or unwanted nucleation sites on internal surfaces of reaction chambers exposed to carbon-based gaseous feedstock species (such as methane ($CH_4$)). In-flight particles qualities may be influenced by their solubility in the gaseous species in which they are flowed in such that once a certain energy level is achieved, it is not inconceivable for carbon to "crack off" (as so described by "cracking") and form its own solid in a microwave reactor.

Adjusting for Unwanted Carbon Accumulation on Reaction Chamber Walls

Moreover, tuning of disclosed reactors and related systems may be performed to both proactively and reactively address issues associated with carbon-based microwave reactor clogging. For instance, open surfaces, feed holes, hoses, piping and/or the like may accumulate unwanted carbon-based particulate matter as a by-product of synthetic procedures performed to create mesoporous carbon-based particle 100A. A central issue observed in a microwave reactor may include this tendency to experience clogging in and/or along orifices, the reason being related to walls and other surfaces exposed to in-flowing gaseous carbon-containing species having carbon solubility as well. Therefore, is it possible to unwantedly grow on the walls of a reaction chamber and/or on the exit tube. Over time, those growths will extend out and ultimately impinge flow and can shut down chemical reactions occurring within the reactor and/or reaction chamber. Such a phenomena may be akin to tube (exhaust) wall build-up of burnt oil in a high-performance or racing internal combustion engine, where, instead of burning (combusting) fossil-fuel based gasoline, methane is used to result in the unwanted deposit of carbon on reaction chamber wells since metal inside the reaction chamber itself has a carbon solubility level.

Although methane is primarily used to create mesoporous carbon-based particle 100A, in theory any carbon-containing and/or hydrocarbon gas, like $C_2$ or acetylene or any one or more of: $C_2H_2$, $CH_4$, butane, natural gas, biogas (derived from decomposition of biological matter) will function to provide a carbon-containing source.

The described uncontrolled and unwanted carbon growth within exposed surfaces of a microwave reactor may be compared to that occurring within an internal combustion engine exhaust manifold (rather than within a cylinder bore) of the engine, especially where the plume of plasma (and/or hot, excited gas about to enter into the plasma phase) is at the onset of the manifold, and burnt gas and carbon-based fragments are traveling down and plugging-up flow through the manifold, cross-pipes, and catalytic converter, and exit-pipes. Process conditions may therefore be proactively tuned to adjust and therefore accommodate for potential carbon-build-up as so-described in the microwave reactor, which (as disclosed and referred to) relies on the presence of a plasma for hydrocarbon gas cracking. To maintain this plasma, a certain set of conditions must be maintained, otherwise back-pressure accumulation can potentially destroy the plasma prior to its creation and subsequent ignition, etc.

Thermal Reactor

In the alternative (or in certain cases, in addition or combination with) synthesis of mesoporous carbon-based particle 100A in a microwave-based and/or microwave reactor as substantially described above, specifically structured and/or scaffolded carbons and/or carbon-based structures can be created by "cracking" hydrocarbons purely by heat application in a reactor featuring application of thermal radiation (heat), referred to herein as a "thermal reactor". Example configurations may include exposure of incoming carbon-based gaseous species (such as any one or more of the aforementioned hydrocarbons) to a heating element (similar to a wire in a lightbulb).

The heating element heats up the inside of a reaction chamber where incoming carbon-containing gas is ionized. The carbon-containing gas is not burnt, due to the absence of sufficient oxygen to sustain combustion, but is rather ionized from contact with incoming thermal radiation (heat) and/or other forms of thermal energy to cause nucleation of constituent members of mesoporous carbon-based particle 100A, and ultimately synthesize, via nucleation, mesoporous carbon-based particle 100A in its entirety. In thermal reactors, some, or most, of the observed nucleation of carbon-based particles can occur on walls or on the heating element itself. Nevertheless, particles can still nucleate which are small enough to be cracked by the speed of flowing gas, such particles are captured to assist in the creation of mesoporous carbon-based particle 100A.

Cracked carbons can be used to create CNO as shown, for example, by 100H in FIG. 1H, and/or fullerenes, and smaller fractions of carbons with fullerene internal crystallography.

In comparing synthesis of mesoporous carbon-based particle 100A via the two discussed pieces of equipment, microwave and thermal reactors, the following distinctions have been observed:

(1) microwave reactors can provide tuning capabilities suitable to provide a broader range of allotropes of carbon; whereas, (2) thermal reactors tend to allow for the fine-tuning of process parameters, such as heat flow, temperature, and/or the like, to achieve the needs of specific end-use application targets of mesoporous carbon-based particle 100A.

For instance, thermal reactors are currently being used to build Li S electrochemical cell electrodes, such as anodes and cathodes. Typical treatment process temperatures range in the thousands of Kelvin, with optimal, surprising, and otherwise unexpected favorable performance properties, such as referring to mesoporous carbon-based particle 100A and/or carbon-based aggregates associated therewith, when compressed, have an electrical conductivity greater than 500 S/m, or greater than 5000 S/m, or from 500 S/m to 20,000 S/m. Optimal performance has been observed at between 2,000-4,000 K.

Mesoporous Carbon-Based Particle—Physical Properties & Implementation in Li Ion and Li S Batteries Any one or more of the carbon-based structures, intermediaries, or features associated with mesoporous carbon-based particle 100A may be incorporated at least in part into a secondary battery electrode, such as that of a lithium ion battery, as substantially set forth by Lanning, et al., "Lithium Ion Battery and Battery Materials", U.S. Pat. Pub. No. 2019/0173125, (published on Jun. 6, 2019), incorporated by reference herein in its entirety.

Particulate carbon contained in and/or otherwise associated with mesoporous carbon-based particle 100A may be implemented in a Li ion battery cathode as a structural and/or electrically conductive material and have at least a substantially a mesoporous structure as shown by hierarchical porous network 100F with a wide distribution of pore sizes (also referred to as a multi-modal pore size distribution). For example, mesoporous particulate carbon can contain multi-modal distribution of pores in addition or in the alternative to plurality of hierarchical pores 107F (as shown in FIG. 1F) that at least in part further define open porous scaffold 102A with one or more Li ion diffusion pathways 109F. Such pores may have sizes from 0.1 nm to 10 nm, from 10 nm to 100 nm, from 100 nm to 1 micron, and/or larger than 1 micron. Pore structures can contain pores with a bi-modal distribution of sizes, including smaller pores (with sizes from 1 nm to 4 nm) and larger pores (with sizes from 30 to 50 nm). Such a bimodal distribution of pore sizes in mesoporous carbon-based particle 100A can be beneficial in sulfur-containing cathodes in lithium ion batteries, as the smaller pores (1 to 4 nm in size) can confine the sulfur (and in some cases control of saturation and crystallinity of sulfur and/or of generated sulfur compounds) in the cathode, and the larger pores (30 to 50 nm in size, or pores greater than twice the size of solvated lithium ions) can enable and/or facilitate rapid diffusion (or, mass transfer) of solvated Li ions in the cathode.

As introduced earlier, the lithium-sulfur battery (Li—S battery) is a type of rechargeable battery, notable for its high specific energy. A lithium/sulfur (Li/S) battery (such as that represented by sulfur (S) infiltrated into hierarchical pores 107F of mesoporous particle 100E (such as where S infiltrates open porous scaffold 102A to deposit on internal surfaces of mesoporous carbon-based particle 100A, 100E and/or within pores 107F), as shown in FIGS. 1F and 1E respectively, and by schematic 100G shown in FIG. 1G, showing intermediate steps associated with the reduction of sulfur to the sulfide ion ($S^{2-}$)). Incorporation of S into Li ion batteries may result in a 3-5 fold higher theoretical energy density than state-of-art Li ion batteries without S, and research has been ongoing for more than three decades. However, the commercialization of Li/S battery still, in some respects, cannot be fully realized due to many problematic issues, including short cycle life, low cycling efficiency, poor safety and a high self-discharge rate. All these issues are related to the dissolution of lithium polysulfide (PS), the series of sulfur reduction intermediates, in liquid electrolyte and to resulting parasitic reactions with the lithium anode and electrolyte components. On the other hand, the dissolution of PS is essential for the performance of a Li/S cell. Without dissolution of PS, the Li/S cell cannot operate progressively due to the non-conductive nature of elemental sulfur and its reduction products.

Mesoporous Carbon-Based Particle—Formed to Address Polysulfide (PS)-Related Challenges Seeking to address at least some of the challenges associated with such polysulfide (PS) systems, mesoporous carbon-based particle 100A and cathodic active material form a meta-particle framework, where cathodic electroactive materials (such as elemental sulfur that may form PS compounds 100G as shown in FIG. 1G) are arranged within mesoporous carbon pores/channels, such as within any one or more of hierarchical pores 107F (as shown in FIG. 1F, including pores 104F, 105F, and/or pathways 106F and/or 109F). S can be, for example, substantially incorporated within pores 107F at a loading level that represents 35-100% of the total weight/volume of active material in mesoporous carbon-based particle 100A and/or 100E overall.

This type of organized particle framework can provide a low resistance electrical contact between the insulating cathodic electroactive materials (such as elemental sulfur) and the current collector while providing relatively high exposed surface area structures that are beneficial to overall specific capacity (and that may be at least assist lithium ion micro-confinement as enhanced by the formation of Li S compounds temporarily retained in hierarchical pores 107F, and the controlled release and migration of Li ions as related to electric current conduction) in a battery electrode and/or system. Implementations of mesoporous carbon-based particle 100A can also benefit cathode stability by trapping at least some portion of any created polysulfides by using tailored structures, such as that shown by hierarchical pores 107F, to actively prevent them from unwantedly migrating through electrolyte to the anode resulting in unwanted parasitic chemical reactions associated with battery self-discharge.

Unwanted Migration of Polysulfides During Li S Battery System Usage—Generally

With reference to polysulfide shuttle mechanisms observed in Li S battery electrodes and/or systems, polysulfides dissolve very well in electrolytes. This causes another lithium-sulfur cell characteristic, the so-called shuttle mechanism. The polysulfides $S_{n2}$—that form and dissolve at the cathode, diffuse to the lithium anode and are reduced to $Li_2S_2$ and $Li_2S$. (The polysulfide species $S_n2$—that form at the cathode during discharging dissolve in the electrolyte there. A concentration gradient versus the anode develops, which causes the polysulfides to diffuse toward the anode. Step by step, the polysulfides are distributed in the electrolyte.) Subsequent high-order polysulfide species react with these compounds and form low-order polysulfides $S_{(n-x)}$. This means that the desired chemical reaction of sulfur at the cathode partly also takes place at the anode in an uncontrolled fashion (chemical or electrochemical reactions are conceivable), which negatively influences cell characteristics.

If low-order polysulfide species form near the anode, they diffuse to the cathode. When the cell is discharged, these diffused species are further reduced to $Li_2S_2$ or $Li_2S$. Simply put, the cathode reaction partly takes place at the anode during the discharging process or, rather, the cell self-discharges. Both are undesirable effects decreasing [specific] capacity. In contrast to that, the diffusion to the cathode during the charging process is followed by a re-oxidation of the polysulfide species from low order to high order. These polysulfides then diffuse to the anode again. This cycle is generally known as the shuttle mechanism. If the shuttle mechanism is very pronounced, it is possible that a cell can accept an unlimited charge, it is 'chemically short-circuited'.

In general, the shuttle mechanism causes a parasitic sulfur active matter loss. This is due to the uncontrolled separation of $Li_2S_2$ and $Li_2S$ outside of the cathode area and it eventually causes a considerable decrease in cell cycling capability and service life. Further aging mechanisms can be an inhomogeneous separation of $Li_2S_2$ and $Li_2S$ on the cathode or a mechanical cathode structure breakup due to volume changes during cell reaction.

Hierarchical Pores of Mesoporous Carbon-Based Particle Formed to Prevent Lithium Shuttle (Referring to Loss) to the Anode To address the unwanted phenomenon of PS shuttling as so described above, any one or more of the plurality of hierarchical pores 107F of mesoporous carbon-based particle 100A in a cathode can provide a suitable region, formed with an appropriate dimension, to drive the creation of lower order polysulfides (such as S and $Li_2S$) and therefore prevent the formation of the higher order soluble polysulfides ($Li_xS_y$ with y greater than 3) that facilitate lithium shuttle (i.e., loss) to the anode. As described herein, the structure of the particulate carbon and the cathode mixture of materials can be tuned during particulate carbon formation (within a microwave plasma or thermal reactor). In addition, cathodic electroactive materials (elemental sulfur) solubility and crystallinity in relation to lithium phase formation, can be confined/trapped within the micro/meso porous framework.

The present lithium ion batteries can incorporate particulate carbon as presented by mesoporous carbon-based particle 100A and/or any derivatives thereof into the cathode, anode, and/or one or both substrates with improved properties compared to conventional carbon materials. For example, the particulate carbon can have high compositional purity, high electrical conductivity, and a high surface area compared to conventional carbon materials. In some embodiments, the particulate carbon also has a structure that is beneficial for battery properties, such as small pore sizes and/or a mesoporous structure. In some cases, a mesoporous structure can be characterized by a structure with a wide distribution of pore sizes (with a multi-modal distribution of pore sizes). For example, a multimodal distribution of pore sizes can be indicative of structures with high surface areas and a large quantity of small pores that are efficiently connected to the substrate and/or current collector via material in the structure with larger feature sizes (i.e., that provide more conductive pathways through the structure). Some non-limiting examples of such structures are fractal structures, dendritic structures, branching structures, and aggregate structures with different sized interconnected channels (composed of pores and/or particles that are roughly cylindrical and/or spherical).

In some embodiments, the substrate, cathode, and/or anode contains one or more particulate carbon materials. In some embodiments, the particulate carbon materials used in the lithium ion batteries described herein are described in U.S. Pat. No. 9,997,334, entitled "Seedless Particles with Carbon Allotropes," which is assigned to the same assignee as the present application, and is incorporated herein by reference as if fully set forth herein for all purposes. In some embodiments, the particulate carbon materials contain graphene-based carbon materials that comprise a plurality of carbon aggregates, each carbon aggregate having a plurality of carbon nanoparticles, each carbon nanoparticle including graphene, optionally including multi-walled spherical fullerenes, and optionally with no seed particles (such as with no nucleation particle). In some cases, the particulate carbon materials are also produced without using a catalyst. The graphene in the graphene-based carbon material has up to 15 layers. A ratio (i.e., percentage) of carbon to other elements, except hydrogen, in the carbon aggregates is greater than 99%. A median size of the carbon aggregates is from 1 micron to 50 microns, or from 0.1 microns to 50 microns. A surface area of the carbon aggregates is at least 10 $m^2/g$, or is at least 50 $m^2/g$, or is from 10 $m^2/g$ to 300 $m^2/g$ or is from 50 $m^2/g$ to 300 $m^2/g$, when measured using a Brunauer-Emmett-Teller (BET) method with nitrogen as the adsorbate. The carbon aggregates, when compressed, have an electrical conductivity greater than 500 S/m, or greater than 5000 S/m, or from 500 S/m to 20,000 S/m.

Mesoporous Carbon-Based Particle—Departure from Conventional Technology to Yield Surprising Favorable Results Conventional composite-type Li-ion or Li S battery electrodes (shown in FIG. 2B) may be fabricated from a slurry cast mixture of active materials (shown as in FIG. 2A), including: conductive additives (such as fine carbon black and graphite for usage in a battery cathode at a specific aspect ratio), and polymer-based binders that are optimized to create a unique self-assembled morphology defined by an interconnected percolated conductive network. While, in conventional preparations or applications, additives and binders can be optimized to improve electrical conductivity there-through (by, for example, offering lower interfacial impedance) and therefore correspondingly yield improvements in power performance (delivery), they represent a parasitic mass that also necessarily reduces specific (also referred to as gravimetric) energy and density, an unwanted end result for today's demanding high-performance battery applications.

To minimize losses due to parasite mass (such as that caused by increased active and/or inactive ratio), and concurrently enable faster access of electrolyte to the complete surface of an electrode, orienting, re-orienting, and/or otherwise organizing or repositioning ion diffusion pathways 109F to effectively shorten Li ion diffusion path lengths for charge transfer, hierarchical pores 101A and/or open porous scaffold 102A may be created from reduced-size carbon particles and/or active materials (down to nanometer scales), since the external specific surface area (SSA, defined as the total surface area of a material per unit of mass, (with units of $m^2/kg$ or $m^2/g$) or solid or bulk volume (units of $m^2/m^3$ or $m^{-1}$); it is a physical value that can be used to determine the type and properties of a material (soil or snow)) of a sphere increases with decreasing diameter. However, as the particle size is decreased down into the nanometer size range there are associated attractive van der Waal forces that can impede dispersion, facilitate agglomeration, and thereby increase cell impedance and reduce power performance.

Another approach to shortening ion diffusional pathways, referring to ion diffusion pathways 109F shown in FIG. 1F, is to uniquely engineer the internal porosity of the constitutive carbon-based particles, such as those created by the electrically conductive interconnected agglomerations of graphene sheets 101B to create open porous scaffold 102A and/or define hierarchal pores 101A and/or 107F. As per commonly used definitions, and as referred to herein, a "surface curvature" is referred to as a "pore" if its cavity is deeper than it is wide. As a result, this definition necessarily excludes many nanostructured carbon materials where just the external surface area is modified, or in close packed particles where voids (intra-particular) are created between adjacent particles (as in the case of a conventional slurry cast electrode).

With respect to the engineering (referring to the synthesis, creation, formation, and/or growth of mesoporous carbon-based particle 100A either in-flight in a microwave-based reactor or via layer-by-layer deposition in a thermal reactor as substantially described earlier), reactor process parameters may be adjusted to tune the size, geometry, and distribution of hierarchical pores 101A and/or 107F within mesoporous carbon-based particle 100A. Hierarchical pores 101A and/or 107F within mesoporous carbon-based particle 100A may be tailored to achieve performance figures particularly well-suited for implementation in high-performance fast-current delivery devices, such as supercapacitors.

As generally described earlier, a supercapacitor (SC), also called an ultracapacitor, is a high-capacity capacitor with a capacitance value much higher than other capacitors, but with lower voltage limits, that bridges the gap between electrolytic capacitors and rechargeable batteries. It typically stores 10 to 100 times more energy per unit volume or mass than electrolytic capacitors, can accept and deliver charge much, much faster than batteries, and tolerates many more charge and discharge cycles than rechargeable batteries.

In many of the available off-the-shelf commercial carbons used in early supercapacitor development efforts, there were "worm"-like narrow pores which became a bottleneck or liability when operating at high current densities and fast charge- and discharge rates, as electrons may encounter difficulty in flow through, in or around such structures or pathways. Even though pore dimensions were fairly uniform but still adjustable to accommodate a wide range of length scales, real-life achievable performance was still self-limited (as based on the structural challenges inherent to the "worm"-like narrow pores).

Compared to conventional porous materials with uniform pore dimensions that are tuned to a wide range of length scales, the presently disclosed 3D hierarchical porous materials (such as that shown by hierarchical pores 101A and/or 107F within mesoporous carbon-based particle 100A) may be synthesized to have well-defined pore dimensions (such as hierarchical pores 107F including pores 104F, 105F, and/or pathways 106F and/or 109F) and topologies overcome the shortcomings of conventional 'mono-sized' porous carbon particles by creating, multi-modal (such as bi-modal) pores and/or channels having the following dimensions and/or widths:

(1) meso (2 nm<$d_{pore}$<50 nm) pores;
(2) macro ($d_{pore}$>50 nm) pores 301A (as shown in micrograph 300A of FIG. 3A) to minimize diffusive resistance to mass transport; and,
(3) micro ($d_{pore}$<2 nm) pores 302A to increase surface area for active site dispersion and/or ion storage (capacitance relating to density and number of ions that can be stored within a given pore size, such as that shown by pore 105F having dimension 103F in FIG. 1F).

Although no simple linear correlation has been experimentally established between: (1) surface area; and, (2) capacitance, mesoporous carbon-based particle 100A offers surprising favorable results in providing optimal micropore size distributions and/or configurations (such as when integrated into a Li ion or Li S battery electrode to achieve certain specific capacity and power values or ranges) that are different for each intended end-use application (such as an electrolyte system) and corresponding voltage window. To optimize capacitance performance, mesoporous carbon-based particle 100A may be synthesized with very narrow "pore size distributions" (PSD); and, as desired or required voltages are increased, larger pores are preferred. Regardless, current state-of-the-art supercapacitors have provided a pathway to engineering the presently disclosed 3D hierarchical structured materials for particular end-use applications.

In contrast to supercapacitors, where capacitance and power performance is primarily governed by, for example:
(1) surface area of the pore wall;
(2) size of pore; and (3) interconnectivity of the pore channels (which affect electric double layer performance)

Li-ion storage batteries undergo faradaic reduction/oxidation reactions within the active material and thereby may require not only all of the Li ion transport features of a supercapacitor (such as efficiently oriented and/or shortened Li ionic diffusion pathways). Regardless, in any application (including a supercapacitor as well as a traditional Li ion or Li S secondary battery) a 3D nanocarbon-based framework/architecture (such as that defined open porous scaffold 102A) can provide continuous electrical conducting pathways (such as across and along electrically conductive interconnected agglomerations of graphene sheets 101B) alongside, for example, highly-loaded active material having high areal and volumetric specific capacity.

Mesoporous Carbon-Based Particle—Used as a Formative Material for a Cathode

To address prevailing issues with relatively low electrical and ionic conductivities, volume expansion and polysulfide (PS) dissolution (referring to the PS "shuttle" effect, discussed earlier, leading to lithium loss and capacity fade) in current sulfur cathode electrode designs, mesoporous carbon-based particle 100A has hierarchical pores 101A and/or 107F formed therein to define open porous scaffold 102A, which includes pores 105F with microporous textures 103F having a dimension (such as 1-4 nm cavities) suitable to at least temporarily micro-confine elemental sulfur and/or Li S related compounds. Open porous scaffold 102A, at the same time as confining sulfur as so described, also provides a host scaffold-type structure to manage sulfur expansion to ensure surprising, unexpected, and highly desirable electron transport across the sulfur-carbon interface (such as at contact and/or interfacial regions of sulfur and carbon within pores 105F) by, for example, tailored in-situ nitrogen doping of the carbon within the reactor. Confining sulfur within a nanometer scale cavity (such as pores 105F with microporous textures 103F) favorably alters both:

(1) the equilibrium saturation (solubility product); and,
(2) crystalline behavior of sulfur, such that sulfur remains confined (as may be necessary for desirable electrical conduction upon dissociation of Li S compounds, etc.) within microporous textures having dimension 103F, with no external driving force required to migrate to the anode electrode.

As a result, unique dimension 103F (including diameter, height and/or width of about 1-4 nm in cavity form as described above) provided by pores 105F results in no need for separators that attempt to impede polysulfide diffusion while, at the same time, negatively impacting cell impedance (referring to the effective resistance of an electric circuit or component to alternating current, arising from the combined effects of ohmic resistance and reactance) and polarization. By using carbon with optimum (relative to elemental sulfur, lithium and/or Li S micro-confinement) and non-optimum multi-modal, referring to hierarchical pores 107F including pores 104F, 102F, and/or 103F, or (alternatively) bi-modal pore distributions, mesoporous carbon-based particle 100A demonstrates, unexpectedly and favorably, operation of the principle of micro-confinement in properly optimized (relative to final end-use application specific demands) structures.

Along with creating delicately engineered ornate, hierarchical multi-modal carbon-based particles, such as mesoporous carbon-based particle 100A and organized scaffolds generated therefrom, mesoporous carbon-based particle 100A further uniquely provides the ability to effectively load or infuse carbon scaffold 300B shown in FIG. 3B (that may be created in-reactor by either:
(1) layer-by-layer deposition of multiple mesoporous carbon-based particles 100A by a slurry-case method; or,
(2) by a continuous sequence of a group of plasma spray-torches, as shown by plasma spray-torch system 400B in FIG. 4B), with sulfur, such as elemental sulfur.

For lithium-sulfur battery performance to practically exceed conventional lithium ion batteries, industry-scalable techniques must achieve high sulfur loading (such as >70% sulfur per unit volume) relative to all additives and components of a given cathode template, while maintaining the native specific capacity of the sulfur active material. Attempts to incorporate sulfur into a cathode host, such as by any one or more of (performed independently or in any combination): electrolysis, wet chemical, simple mixing, ball milling, spray coating, and catholytes, have either not fully incorporated the sulfur as desirable, or are otherwise not economically scalable or manufacturable. Unlike melt infiltration where small pores are thermodynamically inaccessible, presently disclosed synthetic approaches use an isothermal vapor technique, introduced and reacted at substantially atmospheric pressure, where the high surface free energy of nanoscale pores or surfaces drives the spontaneous nucleation of sulfur containing liquids until a conformal coating of sulfur and/or lithium-containing condensate is reached on inner-facing surfaces of hierarchical pores 101A and/or 107F. In essence, unique vapor infusion process unexpectedly (and favorably) completely infuses sulfur into fine pores (such as any one or more of hierarchical pores 101A and/or 107F and/or pores 104F, 105F and/or pathways 106F and/or 109F) at the core of mesoporous carbon-based particle 100A, and therefore not just at its surface.

Mesoporous Carbon-Based Particle to Create an Electrically Conductive Scaffold

Mesoporous carbon-based particle 100A, may be fabricated any number of ways using both known and novel techniques disclosed herein, including:
(1) slurry-casting, referring to conventional metalworking, manufacturing and/or fabrication techniques in which a liquid material is usually poured into a mold, which contains a hollow cavity of the desired shape, and then allowed to solidify; or
(2) plasma spray-torch system 400B (shown in FIG. 4B), which may be used to perform layer-by-layer deposition to grow mesoporous carbon-based particle 100A incrementally.

Either (1) or (2) as described above, or any other known or novel fabrication techniques, may be used to create carbon scaffold 300B in a "graded" manner, referring to under specifically controlled conditions resulting in corresponding control of:
(1) electrical gradients (referring to interconnected 3D agglomerations of multiple layers of graphene sheets 101B that are sintered together, as discussed earlier, to form open porous scaffold 102A that facilitates electrical conduction along and across contact points of graphene sheets 101B); and,
(2) ionic conductive gradients (referring Li ion transport through hierarchical pores 101A and/or 107F, which are defined by electrically conductive interconnected agglomerations of graphene sheets 101B, and cause rapid lithium (Li) ion diffusion effectively shortening Li ion diffusion pathways 109F) throughout thickness of carbon scaffold 300B, in the vertical height direction A as shown in FIG. 3B, of mesoporous carbon-based particle 100.

Reference is made herein to various forms of carbon and/or graphene synthesized in-flight within a reactor (or reaction chamber) substantially as described earlier to create electrically conductive interconnected agglomerations of graphene sheets 101B, which may vary in shape, size, position, orientation, and/or structure. Such variances are influenced in differences in crystallinity and the particular type of carbon allotrope(s) used for creation of electrically conductive interconnected agglomerations of graphene sheets 101B. "Crystallinity", as generally understood and as referred to herein, implies the degree of structural order in a solid. In a crystal, atoms or molecules are arranged in a regular, periodic manner. The degree of crystallinity therefore has a significant influence on hardness, density, transparency and diffusion.

Mesoporous carbon-based particle 100 can be produced in the form of an organized scaffold, such as a carbon-based scaffold, out of a reactor (including thermal or microwave-based reactor) or be created (at least partially) during post-processing activities taking place outside of primary synthesis within a reactor.

Plasma processing and/or plasma-based processing, may be conducted within a reactor as disclosed by Stowell, et al., "Microwave Chemical Processing Reactor", U.S. Pat. No. 9,767,992, (Sep. 19, 2017), where supply gas is used to generate a plasma in the plasma zone to convert a process input material (such as methane and/or other suitable hydrocarbons in a gaseous phase) into separated components in a reaction zone (such as a reaction chamber) to facilitate in-flight synthesis of carbon-based materials, including mesoporous carbon-based particle 100A grown to create carbon scaffold 300B at approximately 1 atmosphere.

Alternative to synthesis by or within a microwave reactor as described above, thermal energy may be directed toward or near carbon-containing feedstock materials supplied in a gaseous phase onto sacrificial substrate 306B to sequentially deposit multiple layers of mesoporous carbon-based particles 100A by, for example, plasma spray-torch system 400B shown in FIG. 4B. Such particles may be either fused together in-flight (in a microwave reactor) or deposited (in a thermal reactor) in a controlled manner to achieve varying concentration levels of carbon-based particles 100A to therefore, in turn, achieve "graded" electrical conductivity proportionate to concentration levels of mesoporous carbon-based particles 100A. Such procedures may be used to formulate porous carbon-based electrode structure (such as carbon scaffold 300B) that has a high degree of tunability (regarding electrical conductivity and ionic transport) while also eliminating many production steps and otherwise retaining a conventional outward appearance.

An objective of producing mesoporous carbon-based particle 100A out of, for example, a microwave reactor, includes producing open porous scaffold 102A with an open cellular structure such that a liquid-phase electrolyte can easily infiltrate into the pores of mesoporous carbon-based particle 100A via (at least) open porous scaffold 102A. As generally understood and as referred to herein, a "porous medium" or a "porous material" refers to a material containing pores, also referred to herein as "voids". Skeletal portions of open porous scaffold 102A may be referred to as a "matrix" or a "frame", and pores (such as hierarchical pores 101A and/or 107F) can be infiltrated with a fluid (liquid or gas), whereas, skeletal material is usually formed as a solid material.

Porosity of the Mesoporous Carbon-Based Particle—in Detail

A porous medium, such as mesoporous carbon-based particle 100A, can be characterized by its porosity. Other properties of the medium (such as permeability, tensile strength, electrical conductivity, and tortuosity) may be derived from the respective properties of its constituents (of solid matrix and fluid interspersed therein), as well as media porosity and pore structure. Mesoporous carbon-based particle 100A can be created out of a reactor (and possibly also subsequently post-processed, to be discussed in detail herein) to achieve desirable porosity levels that are unexpectedly conducive for ion diffusion (such as Li ion), whereas contacting electrically conductive interconnected agglomerations of graphene sheets 101B facilitate electron conduction while also allowing for electrons to reunite with positive ions at reaction sites.

Regarding, porosity and tortuosity of open porous scaffold 102A of mesoporous carbon-based particle 100A, an analogy may be made to marbles in a glass jar. Porosity, in this example, refers to spacing between the marbles that allows liquid-phase electrolyte to penetrate into void spaces between the marbles, similar to hierarchical pores 107F that define ion diffusion pathways 109F. The marbles themselves may be like swiss cheese, by allowing electrolyte not only to penetrate in cracks between agglomerations of graphene sheets 101B, but also into agglomerations of graphene sheets 101B_themselves. In this example as well as others, the relative "shortening" of ion diffusion pathways 109F refers to how long it takes Li ions infiltrated therein by, for example, capillary action to contact active material (such as S confined within pores 105F). Ion diffusion pathways 109F accommodate convenient and rapid infiltration and diffusion of electrolyte, that may contain Li ions, into mesoporous carbon-based particle 100A, synthesized further to create carbon scaffold 300B with graded electric conductivity.

The "shortening" of ion diffusion pathways 109F refers toward the shortening of diffusion lengths through which Li ions move within open porous scaffold 102A in carbon scaffold 300B and not active material itself (as it is commonly understood that the diffusion length of the active material may be shortened only by making the thickness of the active material lesser or smaller). Ion diffusion pathways 109F can act as ion buffer reservoirs by controlling flow and/or transport of ions therein to provide a surprisingly favorable freer flowing structure for ion transport therein, as may be beneficial for ion confinement and transport during electrochemical cell charge-discharge cycles. Transport of Li ions throughout ion diffusion pathways 109F in the general directions shown in FIG. 1F can take place in a liquid electrolyte initially infused and captured within open porous scaffold 102A, where such infusion of electrolyte occurs prior to cyclic carbon scaffold 300B usage. Alternatively, examples exist permitting for the initial diffusion and distribution of liquid-phase electrolyte in open porous scaffold 102A of mesoporous carbon-based particle 100A to fill up and occupy hierarchical pores 101A and/or 107F prior to usage of carbon scaffold 300B, synthesized or otherwise created by layer-on-layer deposition of mesoporous carbon-based particles 100A. In alternative or addition to substantially complete filling of open porous scaffold 102A with electrolyte as described, vacuum or air may also be used to at least partially fill hierarchical pores 101A and/or 107F, which may allow or assist with wetting of electrolyte with carbon-containing exposed surfaces within open porous scaffold 102A (to be described further herein).

Once an electrode is formed using carbon scaffold 300B, through additional exposure and electrochemical reactions, Li ions actually bounce from one location to another by a chain reaction, similar to the striking of "newton" balls, where one hits to result in force transference resulting in the movement of other balls. Similarly, each Li ion moves a relatively short distance, yet remains able to move great numbers of Li ions in the collective through this type of chain reaction as described. The extent of individual Li ion movement may be influenced by the quantity of Li ions supplied altogether to carbon scaffold 300B via capillary infusion into open porous scaffold 102A, as may be the crystallographic arrangement of Li ions and/or particles in, around, or within agglomerations of graphene sheets 101B.

Electrochemical Cell Electrode (Anode or Cathode) Created from Carbon Scaffold

Carbon scaffold 300B can be functionally integrated in a variety of battery or supercapacitor applications, battery types including Li ion batteries and Li S batteries, as well as Li air cathodes, upon suitable development. Such an example battery system may include an electrochemical cell configured to supply electric power to a system. The electrochemical cell may have an anode containing an anode active material, a cathode containing a cathode active material, a porous separator disposed between the anode and the cathode, and an electrolyte in ionic contact with the anode active material and the cathode active material.

The anode and cathode may include sacrificial substrate 306B (that is electrically conductive), with a first layer deposited there-upon as a first contiguous film having a first concentration of mesoporous carbon-based particles 100A and/or 302B, each mesoporous carbon-based particle 100A and/or 302B contacting another and being composed of electrically conductive interconnected 3D aggregates of graphene sheets 101B. Aggregates of graphene sheets 101B are sintered together to form open porous scaffold 102A (shown in FIG. 1A) that facilitates electrical conduction along and across contact points of the graphene sheets 101B. Open porous scaffold 102A has a 3D hierarchical structure with mesoscale structuring in combination with micronscale fractal structuring, any one or more further featuring minute carbon-based particles 304B interspersed in and/or between adjacent carbon-based particles 100A and/or 302B.

A porous arrangement is formed in open porous scaffold 102A. The porous arrangement is conducive to receive electrolyte dispersed therein for ion (such as Li ion) transport through interconnected hierarchical pores 101A and/or 107F that define one or more channels including:
(1) microporous frameworks defined by a dimension 101F of >50 nm that provide tunable Li ion conduits;
(2) mesoporous channels defined by a dimension 101F of about 20 nm to about 50 nm (generally defined under IUPAC nomenclature and referred to as "mesopores" or "mesoporous") that act as Li ion-highways for rapid Li ion transport therein; and
(3) microporous textures defined by a dimension 103F of <4 nm for charge accommodation and/or active material confinement.

The first layer including a first electrical conductivity ranging from 500 S/m to 20,000 S/m. A second layer is deposited on the first layer. The second layer has a second contiguous film with a second concentration of mesoporous carbon-based particles 100A in contact with each other to yield a second electrical conductivity ranging from 0 S/m to 500 S/m (lower than the first electrical conductivity).

Carbon scaffold 300B may be pre-lithiated and later infused with Li ion liquid solution via capillary action to create lithiated carbon scaffold 400A (to be further explained herein) as shown in FIG. 4A. In one implementation, the lithiated carbon scaffold 400A may be incorporated as an electrode, such as an anode or a cathode, within an electrochemical ceil and/or a battery. In some aspects, the lithiated carbon scaffold 400A may be an example of a cathode and may include an electrically conductive substrate 418A, a first contiguous film 408A, and a second contiguous film 410, as shown in FIG. 4A. The first contiguous film 408A may be deposited on the electrically conductive substrate 418A. In addition, the contiguous film 418A may consist of a first concentration of three-dimensional (3D) self-assembled binder-less multimodal mesoporous carbon-based particles (referred to herein as "conductive carbon particles 404A") in contact with each other, that collectively define a first electrical conductivity for the first contiguous film 408A. Each of the 3D self-assembled binder-less multimodal mesoporous carbon-based particles may include electrically conductive 3D aggregates (not shown in FIG. 4A for simplicity) formed of graphene sheets (not shown in FIG. 4A for simplicity) randomly sintered together to form a 3D hierarchical open porous structure 420A, which may include mesoscale structuring in combination with micron scale fractal structuring. The electrically conductive 3D aggregates may provide electrical conduction between contact points of the graphene sheets. A porous arrangement 416A may define several interconnected porous channels 422A formed in the 3D hierarchical open porous structure 420A. The porous arrangement 416A may contain a liquid electrolyte (e.g., any of the electrolytes disclosed herein) to thereby facilitate ion transport through at least some of the interconnected porous channels 422A. A second contiguous film 410A may be deposited on the first contiguous film 408A. The second contiguous film 410A may consist of a second concentration of 3D self-assembled binder-less multi-modal mesoporous carbon-based particles in contact with each other that collectively define a second electrical conductivity for the second contiguous film 410A. In some aspects, the second electrical conductivity for the second contiguous film 410A may be lower than the first electrical conductivity for the first contiguous film 412A. In one or more alternative implementations, the lithiated carbon scaffold 400A may include one or more additional films, any one of which may be an example of the first contiguous film 408A and/or the second contiguous film 410. In some aspect, the first contiguous film 408A and/or the second contiguous film 410 and any additional filmy may be referred to as "interim layers". For example, in one implementation, the lithiated carbon scaffold 400A may include interim layers 406A, 408A, 410A, and 412A (each interim layer having defined thicknesses in the vertical direction extending from the electrically conductive substrate 418A, which may be a sacrificial and/or electrically conductive substrate, toward electrolyte layer 414A). One or more of the interim layers 406A, 408A, 410A, and 412A may be synthesized in-flight in a microwave reactor, or deposited layer-by-layer in or out of a thermal reactor. Interim layers 406A, 408A, 410A, and 412A may each have varying electrical conductivity ranging from high (such as at interim layer 406A) to low (such as at layer 412A) in a direction orthogonal and away from the electrically conductive substrate 418A, which may also be a sacrificial and/or electrically conductive substrate. Varying electrical conductivity may be at least partially proportionate to interfacial surface tension of a Li ion solution infiltrated into the porous arrangement of the open porous scaffold, where infiltration of the Li ion solution is done via capillary infusion engineered to promote wetting (to be further explained herein) of surfaces of open porous scaffold 102A exposed to Li ion solution, as well as the prevalence of conductive carbon particles 404A interspersed within mesoporous carbon-based particles 402A (that may be one example of mesoporous carbon-based particles 100A and/or 100E).

Li ion diffusion pathways 109F (as shown in FIG. 1F) ensure that deposition and stripping operations associated with one or more oxidation-reduction ("redox") reactions occurring within mesoporous carbon-based particles 100A and/or 302B are uniform. Also, anode active material and/or cathode active material resides in pores of the anode and the cathode, respectively, and may contain single-layer graphene (SLG) and/or few-layer graphene (FLG) including from 1 to 10 graphene planes, respectively, the graphene planes being positioned in a substantially aligned orientation along a vertical axis. Anode active material or cathode active material may have a specific surface area from approximately 500 $m^2/g$ to 2,675 $m^2/g$ when measured in a dried state, and may contain a graphene material comprising any one or more of pre-lithiated graphene sheets, pristine graphene, graphene oxide, reduced graphene oxide, graphene fluoride, graphene chloride, graphene bromide, graphene iodide, hydrogenated graphene, nitrogenated graphene, boron-doped graphene, nitrogen doped graphene, chemically functionalized graphene, physically or chemically activated or etched versions thereof, conductive polymer coated or grafted versions thereof, and/or combinations thereof.

In any one or more of the discussed examples in relation to lithiated carbon scaffold 400A, electrically conductive interconnected agglomerations of graphene sheets 101B are sintered together to form open porous scaffold independent of a binder, however alternative examples do exist where a binder is used. Configurations with or without a binder may each involve open porous scaffold 102A acting or serving as an active lithium intercalating structure with a specific capacity of approximately 744-1,116 mAh/g, or more. Also, examples include the preparation of electrically conductive interconnected agglomerations of graphene sheets 101B using chemically functionalized graphene, involving the surface functionalization thereof, comprising imparting to open porous scaffold 102A a functional group selected from quinone, hydroquinone, quaternized aromatic amines, mercaptan, disulfide, sulfonate (—$SO_3$), transition metal oxide, transition metal sulfide, other like compounds or a combination thereof.

The current collector shown in FIG. 4A, is, for example, at least partially foam-based or foam-derived and is can be selected from any one or more of metal foam, metal web, metal screen, perforated metal, sheet-based 3D structure, metal fiber mat, metal nanowire mat, conductive polymer nanofiber mat, conductive polymer foam, conductive polymer-coated fiber foam, carbon foam, graphite foam, carbon aerogel, carbon xerogel, graphene foam, graphene oxide foam, reduced graphene oxide foam, carbon fiber foam, graphite fiber foam, exfoliated graphite foam, and combinations thereof.

Anode or cathode electrically conductive or insulative material, referred to herein as "active material" can include any one or more of nanodiscs, nanoplatelets, nano-fullerenes, carbon nano-onions (CNOs), nano-coating, or nanosheets of an inorganic material selected from: (i) bismuth selenide or bismuth telluride, (ii) transition metal dichalcogenide or trichalcogenide, (iii) sulfide, selenide, or telluride of a transition metal; (iv) boron nitride, or (v) a combination thereof. The nanodiscs, nanoplatelets, nano-coating, or nano sheets can have a thickness less than 100 nm. In similar or dissimilar examples, the nanoplatelets can have a thickness less than 10 nm and/or a length, width, or diameter less than 5 µm.

Processes for Producing an Electrochemical Cell Electrode (Anode or Cathode) Created from Carbon Scaffold—Generally Example processes for producing a three-dimensional (3D) mesoporous electrode, such as that created from lithiated carbon scaffold 400A, can include depositing (such as from one or more plasma-based thermal reactors or torches, in which thermal energy is propagated through a plasma and/or feedstock material supplied in a gaseous state) mesoporous carbon-based particles 100A or 400A to form a first contiguous film layer (such as layer 406A shown in FIG. 4A) on a substrate, where the first contiguous film layer is characterized by a first electrical conductivity. Each of the mesoporous carbon-based particles comprises electrically conductive three-dimensional (3D) aggregates or agglomerations of graphene sheets 101B. The aggregates are sintered together to form open porous scaffold 102A that facilitates electrical conduction along and across contact points of the graphene sheets. A porous arrangement formed in open porous scaffold 102A, where the porous arrangement is conducive to receive electrolyte dispersed therein for Li ion transport through interconnected pores (such as hierarchical pores 101A and/or 107F) that define one or more Li ion diffusion pathways 109F. The first contiguous film layer has an average thickness no greater than approximately 100-200 µm. In an example, a binder material is combined with graphene sheets 101B to retain graphene sheets 101B in a desired position to impart structure to open porous scaffold 102A. The binder may be or comprise a thermosetting resin or a polymerizable monomer, wherein curing the resin or polymerizing the polymerizable monomer forms a solid resin or polymer with assistance of heat, radiation, an initiator, a catalyst, or a combination thereof. The binder may be initially a polymer, coal tar pitch, petroleum pitch, mesa-phase pitch, or organic precursor material and is later thermally converted into a carbon material.

Additional quantities of mesoporous carbon-based particles 101A and/or 400A are deposited on the first contiguous film layer to form a second contiguous film layer there-upon, the second contiguous film layer having a second electrical conductivity lower than the first electrical conductivity, and being positioned closer to electrolyte 414A and away from the current collector (which may be a sacrificial substrate).

Li ion solution can be infiltrated into (such as by capillary infusion action) open porous scaffold 102A react with exposed carbon on surfaces thereof to facilitate Li ion dissociation and electric current supply, where the exposed carbon on the open porous scaffold including a surface area greater than approximately 100 m$^2$/gm.

Processes for Producing an Electrochemical Cell Electrode (Anode or Cathode) Created from the Carbon Scaffold—In Detail Mesoporous carbon-based particles 100A and/or lithiated carbon scaffold 400A can be synthesized 'in-flight' in a microwave reactor, or deposited in a bottom-up manner, referring to a layer-by-layer deposition or "growth" within a thermal reactor, and may then be cast, via a liquid slurry to be subsequently dried to form a carbon-based electrode that may be suitable for implementation or incorporation within a Li ion battery. Such a slurry may, in some examples, comprise chemical binders and conducting graphite, along with the electrochemically active innate carbon.

The term "hierarchical", as generally understood in an engineering context and as used herein, refers to an arrangement of items in which the items are represented as being above, below, or at the same level as one another. Here, mesoporous carbon-based particle 100A and/or lithiated carbon scaffold 400A may be grown by layer-by-layer deposition in a thermal reactor to create one or more "grades" (as indicated by layers 406A to 412A of mesoporous conductive particles 100A, 302B and/or 402A), referring to that created by specific control of electrical (referring to contact points of electrically conductive interconnected agglomerations of graphene sheets 101B) and ionic (referring to Li ion diffusion pathways 109F) conducting gradients throughout the thickness of lithiated carbon scaffold 400A. Tuning of each individually deposited layer 406A through 412A results in relatively higher electrical conductivity at the current collector interface, and progressive lower electrical conductivity moving outwardly therefrom.

Electrically conductive interconnected agglomerations of graphene sheets 101B within mesoporous carbon-based particle 100A serve as both electrical conductors, by conducting electric current through contact points and/or regions, and as "active" Li intercalating structures, and therefore may be configured to provide a source for the specific capacity of the anode electrode at 744-1,116 mAh/g, i.e., 2-3 times that otherwise available from conventional graphite anodes at 372 mAh/g. As a result, interconnected 3D bundles of graphene sheets 102 within mesoporous carbon-based particle 100 may be considered as 'nanoscale' electrodes that concurrently enable a relatively high-volume fraction of electrolytically active material along with efficient, 3D interpenetrating, ion and electron pathways.

This unique 3D structure of mesoporous carbon-based particle 100 enables both storage of electric charge at its exposed surfaces (via capacitive charge storage) for desirable high-power delivery, relative to conventional applications, and also provides faradaic redox ions within the bulk thereof for desirable high electric energy storage. "Redox", as generally understood and as referred to herein, refers to "reduction-oxidation" reactions in which the oxidation states of atoms are changed involving the transfer of electrons between chemical species, most often with one species undergoing oxidation while another species undergoes reduction.

"Faradaic", as generally understood and as referred to herein, refers to a heterogeneous charge-transfer reaction occurring at the surface of an electrode, prepared with and/or otherwise incorporating mesoporous carbon-based particle 100A. For instance, pseudocapacitors store electrical energy faradaically by electron charge transfer between electrode and electrolyte. This is accomplished through electrosorption, reduction-oxidation reactions (redox reactions), and intercalation processes, termed pseudo-capacitance.

Roll-to-Roll Processing for Producing an Electrochemical Cell Electrode (Anode or Cathode) Created from the Carbon Scaffold Regarding manufacturing, lithiated carbon scaffold 400A can be manufactured (to fabricate and/or build electrochemical cell electrodes, such as cathodes and/or anodes) in large-scale quantities by sequential, layer-by-layer (such as layers 406A through 412A shown in FIG. 4A) deposition of concentrations of mesoporous carbon-based particle 100A and/or 100E onto a moving substrate (such as a current collector) through a roll-to-roll ("R2R") production approach. By consolidating 3D carbon scaffold structures directly out microwave reactors (analogous to exiting plasma spray processes), electrode films can be continuously produced without the need for toxic solvents and binders that are otherwise used in slurry cast processes for battery electrodes. Therefore, battery electrodes employing lithiated carbon scaffold 400A may be more readily produced with controlled electrical, ionic, and chemical concentration gradients due to the "layer-by-layer", sequential particle deposition capabilities of a plasma-spray type processes; and, specific elements (such as dopants) can also be introduced at different stages within the plasma deposition process.

Also, due to the pores 101A and/or 107F interspersed throughout mesoporous carbon-based particle 100, lithiated carbon scaffold 400A may be manufactured in a manner such that it is gravimetrically, referring to a set of methods used in analytical chemistry for the quantitative determination of an analyte based on its mass, superior to known devices. That is, mesoporous carbon-based particle 100A, with pores and/or voids defined throughout 3D bundles of graphene sheets 102 and/or conductive carbon particles 104, may be lighter than comparable battery electrodes without a mesoporous structure including various pores and/or voids, etc.

Mesoporous carbon-based particle 100 may feature a ratio of active material to inactive material that is superior relative to conventional technologies, in that greater quantities of active material are available and prepared for electricity conduction there-through relative to inactive and/or structural reinforcement material. Such structural reinforcement material, although involved in defining a general structure of mesoporous carbon-based particle 100A, may not be involved or as involved in electrically conductive interconnected agglomerations of graphene sheets 101B. Accordingly, due to its high active material to inactive material ratio, mesoporous carbon-based particle 100A may demonstrate superior electrical conductivity properties relative to conventional batteries, as well as being significantly lighter than such conventional batteries given that carbon may be used to replace traditionally used heavier metals. Therefore, mesoporous carbon-based particle 100A may be particular well-suited for demanding end-use application areas that also may benefit from its relatively light weight, automobiles, light trucks, etc.

Mesoporous carbon-based particle 100A may be created to rely electrically conductive interconnected agglomerations of graphene sheets 101B to obtain a percolation threshold, referring to a mathematical concept in percolation theory that describes the formation of long-range connectivity in random systems. Below the threshold a giant connected component does not exist, while above it, there exists a giant component of the order of system size. Accordingly, 3D bundles of graphene electrically conductive interconnected agglomerations of graphene sheets 101B may conduct electricity from the current collector, as shown in FIG. 4A, toward electrolyte 414A.

Roll-to-Roll ("R2R") Plasma Spray Torch Deposition System

As a variation from the existing atmospheric MW plasma reactor with particle-based output, integrated, contiguous 3D hierarchical carbon scaffold films (composed of multiple mesoporous carbon-based particles 100A and/or the like agglomerated together and/or contacting to form contiguous layers, films, and/or sheets) can be constructed utilizing a spray torch configuration, such as that shown by roll-to-roll ("R2R") system 400b. Plasma torches (generally) permit for materials to be initially formulated, similar to waveguided reactor, then accelerated into an impact zone on a substrate surface (moving or stationary) wherein each zone can provide for unique control of dissimilar (mixed phase or composite) material synthesis, formulation (consolidation), and integration (densification).

The plasma torch in combination with a continuous, moving substrate enable a unique additive type process control (i.e., both within the hot plasma and beyond the plasma afterglow region up to the impact zone of the substrate) of properties, such as defect density, residual stress, through thickness chemical and thermal gradients, phase transformations, and anisotropy. For the case of battery electrode fabrication, not only can the atmospheric MW plasma torch create formulated and integrated continuous 3D hierarchical mesoporous graphene films without the need for toxic solvents such as NMP and or use of binders and conductive carbons (at the very least reduction) in accordance with the slurry casting process, but the plasma torch can be used to create integrated electrode/current collector film structures for enhanced performance at a reduced cost.

FIG. 4B shows in detail roll-to-roll ("R2R") system 400b employing an example arrangement of a group 444B of plasma spray torches 422B through 428B (such as 422B, 424B, 426B, and/or 428B) configured to perform layer-by-layer deposition to fabricate, otherwise referred to as "growing", carbon-based scaffold 300B, shown in FIG. 3B, and/or variants thereof, incrementally. Group 444B of plasma spray torches 414B through 420B are oriented in a continuous sequence above the R2R processing apparatus 440B, which, may include wheels and/or rollers 434B and 439B configured to rotate in the same direction, 430B and 432B, respectively, to result in translated forward motion 436B of sacrificial layer 402B upon which layers 442B of carbon scaffold 436B may be deposited in a layer-by-layer manner to achieve a "graded" electrical conduction gradient proportionate to the concentration level of mesoporous carbon-based particles 100A contained per unit volume area in each progressive deposited layer (such as interim layers 406A-412A).

Such deposition may involve the positioning of group 444B of plasma spray torches 414B through 420B as shown in FIG. 4B, with an initial, in direction of forward motion 436B, spray torch 414B extending the furthest in a downward direction, toward sacrificial layer 404B from feedstock supply line 412B, positioned to spray 422B carbon-based material to deposit initial layer 404B (also may be shown as interim layer 406A in FIG. 4A, and so on and so forth) of carbon scaffold 300B on sacrificial layer 402B. Initial layer 404B may be deposited to achieve the highest conductivity values, with each of the subsequent layers 406B through 410B featuring a proportionately less-dense dispersion of mesoporous carbon-based particle 100A composing carbon-based scaffold 300B to achieve a 'graded' electric gradient for layers 442B.

That is, plasma spray torches 414B through 420B may be oriented to have incrementally decreasing (or otherwise varying) heights as shown in FIG. 4B, such that each spray torch from group 444B may be tuned to spray, from spray 422B to 428B, respectively, sprays of carbon-based feedstock material supplied by feedstock supply line 412B. Accordingly, battery electrodes can be more readily produced with controlled electrical, ionic, and chemical concentration gradients due to the "layer-by-layer", sequential deposition described herein with connection to plasma spray-torch system 400B, which presents desirable features of plasma spray type processes; and, specific elements or additional ingredients can also be introduced at different stages within the plasma-based spray deposition process described by plasma spray-torch system 400B. Such control may, extend to tunability of plasma spray-torch system 400B to achieve target electric field and/or electromagnetic field properties of any one or more of layers 442B.

Group 444B of plasma spray torches 414B through 420B may employ plasma-based thermally enhanced carbon spraying techniques to provide carbon coating processes in which melted (or heated) materials are sprayed onto a surface. The "feedstock" (coating precursor) is heated by electrical (plasma or arc) or chemical means (combustion flame).

Thermal spraying by plasma spray torches 414B through 420B can provide thick coatings (approx. thickness range is 20 μm or more to several mm, depending on the process and feedstock), over a large area at high deposition rate as compared to other coating processes such as electroplating, physical and chemical vapor deposition. Coating materials available for thermal spraying include metals, alloys, ceramics, plastics and composites. They are fed in powder or wire form, heated to a molten or semi-molten state and accelerated towards substrates in the form of μm-size particles. Combustion or electrical arc discharge is usually used as the source of energy for thermal spraying. Resulting coatings are made by the accumulation of numerous sprayed particles. The surface may not heat up significantly, allowing the coating of flammable substances.

Coating quality is usually assessed by measuring its porosity, oxide content, macro and micro-hardness, bond strength and surface roughness. Generally, the coating quality increases with increasing particle velocities.

Carbon Scaffold Implemented in a Li S Secondary Battery

Group 444B of plasma spray torches 414B through 420B may be configured or tuned to spray carbon-based material in a controlled manner to achieve specific desired hierarchical and organized structures, such as open porous scaffold 102A of mesoporous carbon-based particle 100A and/or 100E with hierarchical pores 107F suitable to be used for Li ion infiltration via capillary action therein dependant on percentage porosity of mesoporous carbon-based particle 100A and/or 100E. Total quantities of S able to be infused into hierarchical pores 107F and/or deposited on exposed surface regions of mesoporous carbon-based particle 100A and/or 100E (and other such similar structures) may depend on the percentage porosity thereof as well, where 3D fractal-shaped structures providing larger pores, such as pores 105F, each having dimension 103F can efficiently accommodate and micro-confine S for desired time-frames during electrochemical cell operation. Examples exist permitting for the combination of S to prevent any resultant polysulfides (PS) migrating out of pores 105F purely by designing and growing structural S, with confinement of S being targeted at a defined percentage, such as: 0-5%, 0-10%, 0-30%, 0-40%, 0-50%, 0-60%, 0-70%, 0-80%, 0-90%, and/or 0-100%, any one or more of such ranges successfully showing of retardation of polysulfide migration out of the electrode structure.

Carbon Scaffold Implemented in a Li Air Secondary Battery

Existent Li air cathodes may last only 3-10 cycles, and thus have not yet been universally understood to provide very promising or reliable technologies. In such cathodes, air itself acts as the cathode, therefore the reliable and robust supply of air flowing through the cathode, such as through pores, orifices, or other openings, effectively currently precludes realistic applications in consumer grade portable electronic devices such as smartphones.

Devices can be made with some sort of air pump mechanism, but air purification remains an issue, given that any amount of impurity prevalent in the air can and will react with available Li in parasitic side-reactions ultimately degrading specific capacity of the overall electrochemical cell. Moreover, air only provides only about 20.9% $O_2$, and thus is not as efficient as other alternative current advanced battery technologies.

Nevertheless, even in view of the above-mentioned challenges, examples provided above relating to mesoporous carbon-based particle 100A, 100E and/or any variants thereof implemented in carbon scaffold 300B and/or lithiated carbon scaffold 400A can be configured to function in a 3D-printed battery. Notably, measures can be taken to guard against, such as by tuning to achieve desirable structural reinforcement in certain targeted areas of open porous scaffold 102A, to prevent against unwanted and/or sudden collapse of porous structures, such as to create 'clogging' of passageways defined therein. In example, carbon scaffold 300B can be decorated with a myriad of metal oxides to achieve such reinforcement, which may also control or otherwise positive contribute to mechanical tunnelling of the structure itself once lithium reacts with air to spontaneously form a solid from that state, etc. Traditional circumstances (such as absent special preparations undertaken regarding implementation of the disclosed mesoporous carbon-based particle 100A and/or the like with Li air cathodes) can otherwise involve Li ions reacting with carbon provided in a gaseous state, such that the Li ion and the carbon-containing gas react to form a solid that expands. And, depending on where this expansion occurs, can mechanically degrade the overall carbon-based mesoporous scaffold structure, such as of carbon scaffold 300B.

Pre-Lithiation of 3D Mesoporous Carbon-Based Particle as a "Host"

To enable alternative non-lithium or lithiated carbon-based scaffolded cathodes, such as those confining sulfur, oxygen, and vanadium oxide, over current lithium oxide compound cathodes, as well as to accommodate first charge lithium loss (resulting reduced coulombic efficiency) in current lithium-ion cells, a scalable pre-lithiation method for carbon-based structured intended for implementation in electrochemical cell electrodes may be required. As a result, various experimental attempts have been conducted with mesoporous carbon-based particle 100A, 100E and/or any derivative structures based therefrom, including carbon scaffold 300B such as ball milling, post thermal annealing, and electrochemical reduction from an additional electrode. Such efforts have been used to "pre-lithiate", referring to chemically preparing a carbon-based structure to physically and/or chemically react with and/or confine lithium, but have met with uniformity, lithium reactivity, costs, and scalability challenges.

Nevertheless, by fine-tuning reactor process parameters, 3D mesoporous carbon-based particle 100A, 100E, and/or carbon scaffold 300B may be synthesized and/or fabricated by layer-by-layer deposition process, as substantially discussed earlier, to serve as a carbon-based 'host' structure with engineered surface chemistry (such as including nitrogen and oxygen doping) to facilitate rapid decomposition (involving disproportionation of oxides).

Upon thermal (referred to herein as "spark") activation, Li metal can be spontaneously (such as without a pressure gradient) and non-reactively infiltrated (driven by capillary forces) to create a controlled, pre-lithiated carbon structure (or particle building blocks). Subsequently, such "pre-lithiated" particle building blocks can be synthesized into an integrated composite film with graded electrical conductivity from:

(1) a high conductivity at a back plane in contact with the current collector (such as shown by interim layer 406A, to
(2) an insulated ion conducting layer at the electrolyte/electrode plane.

Surface chemistry, as may be related to non-reactive infiltration of Li metal can be tuned by optimizing oxide thermal reduction degree (exotherm) by using thermogravimetric analysis (TGA) or differential scanning calorimetry DSC analytical techniques.

To address scalability concerns as may be related to transitioning from a low-volume laboratory testing and sample production environment, to a high-volume large-scale plant capable of fulfilling multiple customer orders simultaneously, the above described "pre-lithiation" process is readily adaptable to a continuous roll-to-roll (R2R) format, analogous to other liquid melt wetting processes such as brazing.

Thin film lithium clad foil (tantalum or copper), can be loaded onto a heated calendaring roll, to be brought into contact with 3D mesoporous carbon-based particle 100A and/or the like pre-form (or carbon film, in the case of the spray torch process) in a controlled thermal, dry environment. Thermal residence (soak) time, gradient, and applied pressure can adjusted and controlled to facilitate both: (1) "spark" activation; and, (2) infiltration process steps.

"Spark" Lithiation of the Carbon Scaffold

Historically, prior to the development of Li metal infusion methods into carbon-based structures and/or agglomerate particles, efforts were undertaken to assess the following two scenarios:

(1) growing microwave graphene sheets that have extended de-spacing that would allow intercalation to occur in-between individual graphene sheets at a much more efficient or a faster rate than what would occur in typical, commercially-available, graphene sheets; and, growing FLG in such a way to successfully and repeatably achieve such higher de-spacing; and (2) using a wet liquid Li metal front that propagates into hierarchical pores 101A and/or 107F defined by open porous scaffold 102A of 3D mesoporous carbon-based particle 100A and/or 100E. Attraction from Li metal to exposed carbon-based surfaces wet the same in an efficient way relative to otherwise performing functionalization on exposed carbon-based surfaces.

Presently disclosed examples relating to thermal reactors further provide for capabilities for post processing to create highly organized and structured carbons that have that particular functioning relating to the infiltration of metal and/or other species, such as infiltration of aluminum into a silicon carbide-sintered material, and hammering the surface of the particles to promote infiltration of a molten (Li) metal front without additional pressure from outside sources. Such efforts permit for continuous wetting instead of using pressure to push metal into open porous scaffold 102A of 3D mesoporous carbon-based particle 100A and/or 100E.

FIG. 4A shows a schematic representation of agglomerations or aggregations of 3D mesoporous carbon-based particles 402A, akin to 3D mesoporous carbon-based particles 100A and/or 100E, synthesized or deposited at varying concentration levels in layers 406A to 412A, from most concentrated to least concentrated. All layers 406A through 412A, subsequent to creation, can be infiltrated, via non-reactive capillary infusion methods, with Li metal and/or Li ion solution in liquid state or phase for intercalation of Li ions in-between individual graphene sheets of electrically conductive interconnected agglomerations of graphene sheets 101B of 3D mesoporous carbon-based particle 100A, which may be created with a spacing of 1 to 3 Å to accommodate more Li ions between alternating graphene sheets when compared to conventional commercially available graphene sheet stacks.

Voids (referring to vacant regions or spaces) between adjacent and/or contacting mesoporous carbon-based particles 100A and/or 100E composing any one or more of layers 406A-412A of lithiated carbon scaffold 400A may be encased or at least partially covered by, at a section of lithiated carbon scaffold 400A positioned away from the current collector and facing the electrolyte, a passivation layer. Such a passivation layer refers a material becoming "passive," that is, less affected or corroded by the environment of future use. In addition, or in the alternative, an ion conduction (insulating) or graded interphase layer can be deposited on layer 412A facing electrolyte 414A to minimize side reactions with free and/or unattached (physically and/or chemically) Li in ionic form. Prior to the deposition or placement of any such encasing layer, lithium, in the form of Li ions, may be flowed in liquid state into hierarchical pores 101A and/or 107F of open porous scaffold 102A of any one or more of mesoporous carbon-based particles 100A and/or 100E composing layers to form electrochemical gradients proportionate to the level of concentration of mesoporous carbon-based particles 100A and/or 100E composing each layer of layers 406A-412A, layer 406A having the highest concentration of mesoporous carbon-based particles 100A and/or 100E permitting for relatively high levels of electric current conduction between electrically conductive interconnected agglomerations of graphene sheets 101B. Layers 408A-412A (and additional such layers, if necessary or desirable) each have progressively lower (sparser) concentration levels of mesoporous carbon-based particles 100A and/or 100E, thus correspondingly having proportionately lower levels of electric conductance capabilities.

Repeated (cyclical) li ion electrode usage in secondary batteries can result in problems due to metal formation, such as volume expansion during re-depositing in electroplating operations (referring to a process that uses an electric current to reduce dissolved metal cations so that they form a thin coherent metal coating on an electrode). The term can also be used for electrical oxidation of anions on to a solid substrate, as in the formation of silver chloride on silver wire to make silver/silver-chloride electrodes. Electroplating is often used to change the surface properties of an object (such as abrasion and wear resistance, corrosion protection, lubricity, aesthetic qualities), but may also be used to build up thickness on undersized parts or to form objects by electroforming.

Processes used in electroplating with relation to infiltration of Li ion solution into lithiated carbon scaffold 400A may be referred to as electrodeposition (also known as electrophoretic deposition (EPD)) and is analogous to a concentration cell acting in reverse. Electrophoretic deposition (EPD), is a term for a broad range of industrial processes which includes electrocoating, cathodic electrodeposition, anodic electrodeposition, and electrophoretic coating, or electrophoretic painting. A characteristic feature of this process is that colloidal particles suspended in a liquid medium migrate under the influence of an electric field (electrophoresis) and are deposited onto an electrode. All colloidal particles that can be used to form stable suspensions and that can carry a charge can be used in electrophoretic deposition. This includes materials such as polymers, pigments, dyes, ceramics and metals.

Electroplating, as described above, with Li ions may result in a volume expansion on the order of approximately 400% or more of lithiated carbon scaffold 400A. Such an expansion is undesirable from a stability standpoint micro-mechanically and causes degradation with many "dead zones", referring to inactive or non-chemically and/or electrically activated regions, therefore ultimately preventing the derivation of longer lifespans out of so-equipped Li ion batteries. In any case, it is desirable to have a majority of the Li ion material plate, meaning reduce onto a smooth and uniform surface to therefore facilitate uniform deposition of Li ions. Removal will also be smooth in a smooth planar interface.

Layers 406A-412A, experimentally, have been found (in an example) to have interfacial surface tension, $\gamma_{sl}$, engineered to promote wetting of exposed carbon-based surfaces with Li ion. In an example, layer 406A may be defined as having low-ion transport, high electrical conductivity, low electrical resistance (<1,000Ω); whereas, layer 412 (facing electrolyte 414A) may be defined as having high-ion transport, low electrical conductivity, and high electrical resistance (>1,000-10,000Ω).

In practice, Li, (when infiltrated into lithiated carbon scaffold 400A) may tend to form unwanted dendrites, defined as crystals that develop with a typical multi-branching tree-like form. Dendritic crystal growth may be, in certain circumstances, illustrated (in example) by snowflake formation and frost patterns on a window. Dendritic crystallization forms a natural fractal pattern. Functionally, dendritic crystals can grow into a supercooled pure liquid or form from growth instabilities that occur when the growth rate is limited by the rate of diffusion of solute atoms to the interface. In the latter case, there must be a concentration gradient from the supersaturated value in the solution to the concentration in equilibrium with the crystal at the surface. Any protuberance that develops is accompanied by a steeper concentration gradient at its tip. This increases the diffusion rate to the tip. In opposition to this is the action of the surface tension tending to flatten the protuberance and setting up a flux of solute atoms from the protuberance out to the sides. However, overall, the protuberance becomes amplified. This process occurs again and again until a dendrite is produced.

Such Li ion dendrites (also in the form of acicular Li ion dendrites, "acicular" describing a crystal habit composed of slender, needle-like crystal deposits) grow away from surfaces upon which Li ions are infiltrated (such as upon and/or in-between individual graphene sheets 101B). In some circumstances, with enough battery charge-discharge cycling, a dendritic protrusion or protuberance will grow across all the way through the cathode and "short" it out, describing when there is a low resistance connection between two conductors that are supplying electrical power to a circuit. This may generate an excess of voltage streaming and cause excessive flow of current in the power source. The electricity will flow through a "short" route and cause a "short" circuit.

Employing any one or more of the advanced capillary Li ion infusion techniques (to be described in further detail herein) into lithiated carbon scaffold 400A addresses many of the described shortcomings, inclusive of traditional Li ion battery cathode specific capacity. An issue encountered in Li ion batteries is that the cathode provides only a limited quantity of specific capacity or energy capability; moreover, on the anode side, decreases have also been observed in specific capacity and energy density as well. Thus, even in view of how relatively desirable (in terms of electric energy storage capacity and current delivery) a Li ion battery may be compared to Li metal hydride or lead-acid, or Ni Cad batteries (providing energy storage density figures a factor of 2-3 greater than any one of those traditional battery chemistries), even greater advancements in electric power storage and delivery are possible, regarding the protection against or prevention of unwanted Li-based dendritic formations, upon the incorporation of carbon-based materials, such as that disclosed by the present examples, and approaches theoretic capacities (not attained in practice), of pure Li metal, which has a specific capacity of around 3,800 mAh/g.

Other approaches have been undertaken including the development of solid-state batteries, describing no liquid phases at all. However, attention has returned to Li metal, due to oxide electrolyte being used to achieve and stabilize contact with Li. And, alternatives to Li metal have also been explored including Si, Sn and various other alloys. However, even upon elimination of Li metal, a Li ion source may still be required (as originated from an opposing side of the battery device.)

Alternative-to-lithium materials in a Li ion battery electrode structure may yield the following energy density values: oxides provide 260 mAh/g; and, sulfur provides 650 mAh/g. Due to its relatively high energy density capabilities, it is desirable in battery electrode applications to confine sulfur (S), so it is not solubilized or dissolved into surrounding electrolyte. To that effect, sulfur micro-confinement is needed (as described earlier in relation to pores 105F of open porous scaffold 102A), describing that a "confined" (or "micro-confined") liquid is a liquid that is subject to geometric constraints on a nanoscopic scale so that most molecules are close enough to an interface to sense some difference from standard bulk conditions. Typical examples are liquids in porous media or liquids in solvation shells.

Confinement (and/or micro-confinement, referring to confinement within microscopic-sized regions) regularly prevents crystallization, which enables liquids to be supercooled below their homogenous nucleation temperature (even if this is impossible in the bulk state). This holds in particular for water, which is by far the most studied confined liquid.

Thus, in view of the various challenges presented above, and others not discussed here, various improvements to traditional graphite-based anodes may be achieved by instead employing few layer graphene (FLG) materials and/or structures, defined as having less than 15 layers of graphene grown, deposited or otherwise organized in a stacked architecture with Li ions intercalated there-between at defined interval and/or concentration levels. Any one or more of mesoporous carbon-based particle 100A, 100E and/or the like may be so prepared.

Doing so (going from graphite to FLG) may improve specific capacity from approximately 380 to over a 1,000 mAh/g for Li-intercalated carbon-based structures. Disclosed materials can replace graphite with FLG to permit for a higher active surface area and can increase spacing in-between individual graphene layers for infiltration of up to 2-3 Li ions, as opposed to just 1 Li ion as commonly may be found elsewhere.

In graphene, hexagonal carbon structures in each graphene sheet may stay positioned on top of each other—this is referred to as an "A-A" packing sequence instead of an "A-B" packing sequence. Particularly, configurations are envisioned for graphene sheets and/or FLG where individual layers of graphene may be stacked directly on top of each other, to obtain incommensurate, disproportionate and/or otherwise irregular, stacking, which in turn permits for the intercalation of addition Li ions in-between each graphene layer of FLG structures.

Under traditional conditions and circumstances, the insertion of Li ions from, the top-down or bottom-up in layered graphene structures may prove exceedingly difficult in practice. Comparably, Li ions more easily insert in-between individual graphene layers (separated by a definable distance). Thus, the key is to manage and tune exactly how much edge area is available. In that regard, any of the carbon-based structured disclosed herein are so tunable. And, carbon in graphene is also conductive—therefore, this feature provides for dual-roles by: (1) providing structural definition to FLG scaffold electrode structures (such as carbon scaffold 300B and/or lithiated carbon scaffold 400A); (2) and, conductive pathways therein.

Production techniques employed to fabricate any one or more of the carbon-based structures disclosed herein may indicate a desirability of adjustment of individual graphene-layer edge lengths relative to planar surfaces thereof; also, the adjustment of the spacing in between individual graphene stacks may be possible. Graphene, given its two-dimensional structure, necessarily provides significantly more surface area in which Li ions can be inserted. Thus, applying graphene sheets in accordance with various aspects of the subject matter disclosed herein may provide a natural evolution in the direction of enhanced energy storage density.

Individual graphene sheets are held in position as a part of the plasma growth process. Carbon based "gumball-like" structures are self-assembled in-flight (as described earlier) from FLG and/or combinations of to form particles (such as mesoporous carbon-based particle 100A and/or the like) somewhat but with a defined long-range order defined generally and herein as where solid is crystalline if it has long-range order—once the positions of an atom and its neighbors are known at one point, the place of each atom is known precisely throughout the crystal, to it—smaller structures agglomerate to form essentially what resembles a gumball.

Size dimensions of such "gumball-like" structures (describing individual mesoporous carbon-based particles 100A and/or the like) may be on the order of 100 nm across (at its widest point). Larger agglomerated particles made up from multiple "gumball-like" structures may be an order of magnitude larger, about 20-30 microns in diameter.

These "gumball-like" structures (individual mesoporous carbon-based particles 100A and/or the like) may comprise of multiple FLG structures (electrically conductive interconnected agglomerations of graphene sheets 101B) with Li ions interspersed there-within, at a level of 2-3 Li ions in-between each individual graphene layer (made possible by the tuning of the height or gap length between individual graphene layers) tied into a carbon scaffold gradient by joining the larger 3D graphene-based particles together to form a thin film.

In contrast, traditional battery electrode production methods typically employ known deposition techniques such as chemical vapor deposition (CVD) or other fabrication techniques, nanotubes, etc., to "grow" structures off of a defined fixed substrate or surface. Such known assembly processes and procedures can tend to be very labor intensive, and they may also permit for the growth of structures of limited thickness, 200-300 microns in thickness.

Graphene-on-graphene densification, of multiple FLG, on an original gumball-based carbon scaffold (individual mesoporous carbon-based particles 100A, carbon scaffold 300B, lithiated carbon scaffold 400A, and/or the like) may also result in increased energy density and capacity. Such densification in target regions of the carbon scaffold may also be performed or otherwise accomplished after creation of a larger agglomerated particle comprising multiple mesoporous carbon-based particles 100A. Generally, Li ions may be plated onto electrode prior to reduction, therefore Li ion may transition from an ion to a metal state dependent on battery chemistry. Moreover, in an implementation, similar to electroplating, graphene may be grown in a stacked manner on other materials, such as plastic, and tuned to obtain a desirable bright and/or smooth finish. Such electroplating processes are reversible and may include separate but interrelated plating process and a stripping processes, intended to place the Li ions and/or atoms down (and for the subsequent removal thereof).

In continual cyclical use of secondary Li ion batteries, involving multiple charge-discharge-recharge cycles, surfaces upon which carbon-based structures are grown and/or built may eventually roughened and therefore susceptible to or accommodative of unwanted dendrite growth. In contrast, techniques employed to produce mesoporous carbon-based particles 100A and/or the like, as discussed above, substantially prevent such dendrites from growing, enabled by the usage of Li metal substantially free of impurities along with carbon-based graphene structures to enable high specific capacity values.

Usage of graphene sheets permits for relatively greater exposed surface area available for plating or intercalating operations for the infiltration (referring to non-reactive capillary infusion) of Li ions. Thus, any tendency to go to a certain point anymore is removed; and, fundamentally the way plating and stripping occurs may be changed (due to the graphene having a higher surface-area to volume ratio than other conventional carbon-based materials such as graphite). Li ions may be introduced at least partially relying upon liquid Li; however, given Li's predisposition for chemical reactivity with surrounding and/or ambient elements, water-based moisture and oxygen must be kept away. Similarly, the introduction of impurities results in deleterious effects. Metal-matrix composites have been studied, in relation to the disclosed carbon-based structures, regarding usage of Li metallically bonding or otherwise forming a metal-matrix composite with C, therefore offering additional options regarding the fine-tunability and management of reactivity at exposed surfaces.

Li in contact with C may result in circumstances where the free energy of carbide of Li at contact surfaces must be suppressed and/or controlled to avoid unwanted reactivity related to spontaneous Li infiltration in mesoporous carbon-based particle 100A and/or the like. Traditionally, Li, in a liquid phase, typically forms carbonates and other formations due to the chemistry of the electrolyte. However, what is proposed by the present examples relates to the creation of a relatively stable solid electrolyte interface (SEI) prior to the introduction of the liquid electrolyte, this is a central concept supportive of the surprising performance success of the disclosed examples and implementations.

Moreover, multiple methods and/or processes to affect Li ion interface areas may be available. For instance, preparing the surface of liquid Li by alloying with Si and other elements will reduce the reactivity and promote overall Li ion wetting of larger agglomerated particles, each comprising multiple "gumball" structures (mesoporous carbon-based particles 100A). In an example, approximately less than 1.5% of Li was observed to have preferentially moved to exposed surfaces, exposed to the electrolyte.

3D Hierarchical Graphene with Increased Specific Capacity (~3×) Over Conventional Graphite Anodes Commercial use of graphitic carbon materials for anode active materials as well as fine carbon black materials for electrical conduction is justified by their relatively low cost, excellent structural integrity for the insertion and extraction of Li+ ions, safety (free from Li dendrite formation), and formation of a protective passivation layer against many electrolytes (such as that associated with the formation or build-up of the solid electrolyte interphase (SEI)).

The low specific capacity of graphite (at 372 mAh/g, having stoichiometric formula—$LiC_6$), however, is a critical limitation and as a result, can potentially hinder the advance of large-scale energy storage systems that demand high energy and power densities. By designing and applying a three-dimensional (3D) graphene (with intercalated Li and/or S compounds) electrode approach, a larger loading amount of active anode materials can be accommodated while facilitating Li ion diffusion. Further, 3D nanocarbon frameworks (such as that defined by open porous scaffold 102A and/or the like) can impart:

(1) an electrically conducting pathway; and
(2) structural buffer to high-capacity non-carbon nanomaterials, which results in enhanced Li ion storage capacity.

Both (1) and (2) enhance Li ion storage capacity (>1,000 mAh/g) and enhanced cycling (stability) performance can be achieved with these 3D structures.

Integration with Li Ion (and Li S) Battery Electrode

Figure 5:
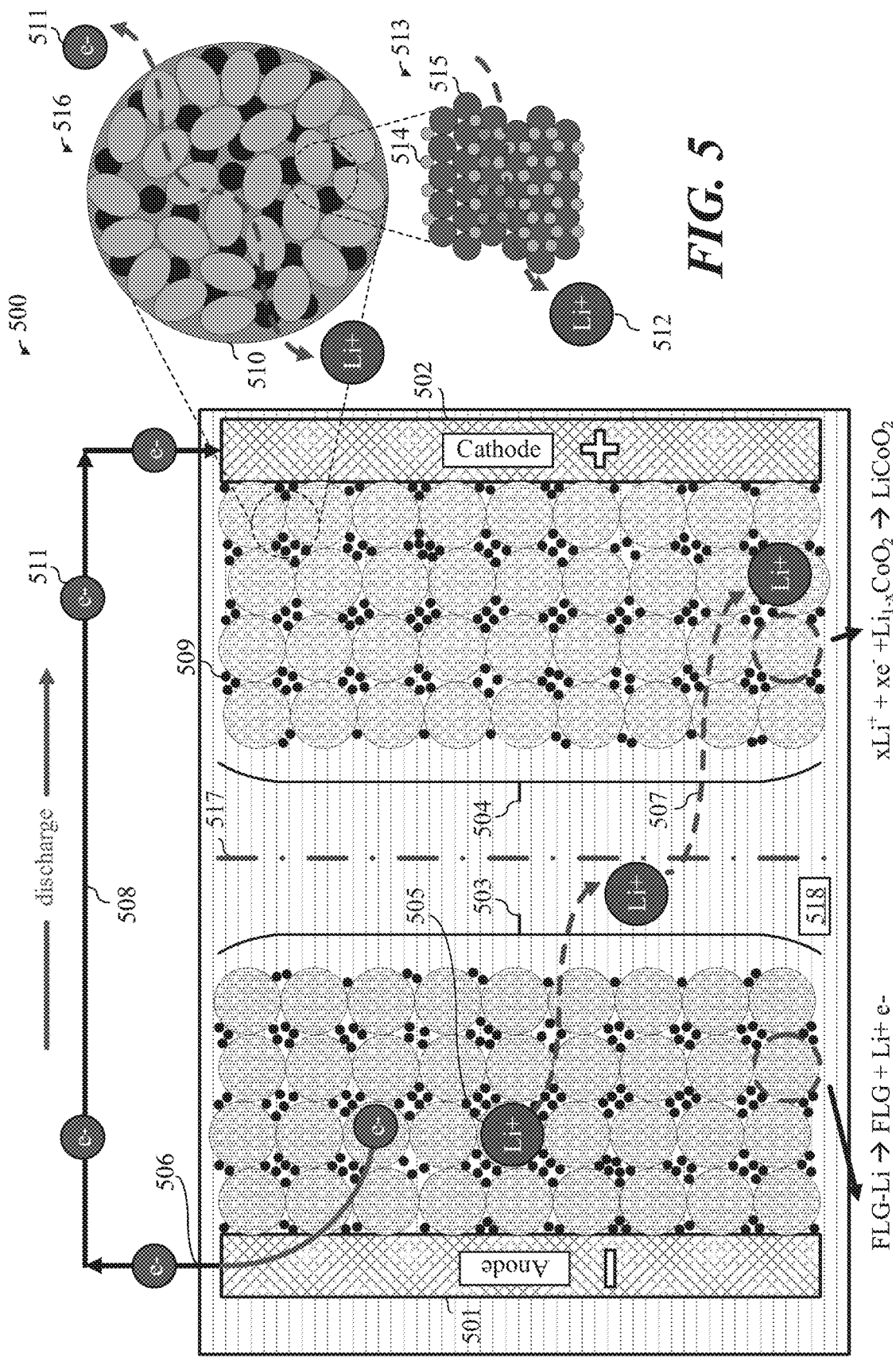
FIG. 5 shows an example schematic for a traditional Li ion battery in which the 3D self-assembled binder-less mesoporous carbon-based particle shown in FIGS. 1A-1J may be incorporated, according to some implementations.
Figure 6:
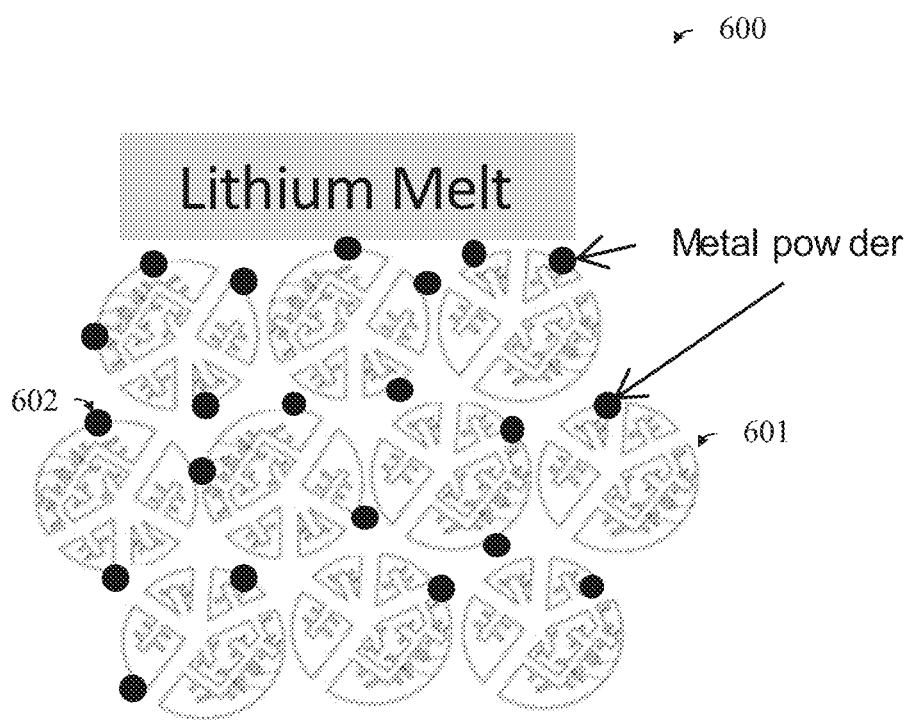
FIG. 6 shows an example schematic of an artificial solid-electrolyte film enhanced by doping (with metal powder), according to some implementations.

An example Li ion secondary electrochemical cell (battery) system 500 is shown in FIG. 5, having an anode 501 and cathode 502 separated by a separator 517, all at least partially contained and/or exposed to (Li) ion-conducting electrolyte solution 518 (containing dissociated lithium ion conducting salt 505) as shown. The separator, a porous membrane to electrically isolate the two electrodes from each other, is also in the position showed. Single lithium ions migrate through pathway 507 back and forth between the electrodes of the lithium ion-battery during charging and discharging and are intercalated into the active materials.

During discharging, when lithium is deintercalated from the negative electrode (anode 501 and/or hierarchical mesoporous carbon-based anode 503, where copper functions as the current collector), electrons 506 are released, for example. The active materials of the positive electrode (cathode 502 and/or hierarchical mesoporous carbon-based cathode 504) are, for example, mixed oxides. Those of the negative electrode mainly are graphite and amorphous carbon compounds. The positive electrode (cathode 502 and/or hierarchical mesoporous carbon-based cathode 504) contains active materials such as mixed oxides. The active materials of the negative electrode (anode 501 and/or hierarchical mesoporous carbon-based anode 503) mainly are graphite and amorphous carbon compounds. These are the materials into which the lithium is intercalated.

Notably, lithium ion conducting salt 505 (also referring to Li ions generally) can intercalate into any one or more of the unique carbon-based structures (referring the mesoporous carbon-based particle 100A, 100E, carbon-scaffold 300B, and lithiated carbon-scaffold 400A and/or the like employed as an anode 503, replacing traditional anode 501, and/or a cathode 504, replacing traditional cathode 502) all of which are proprietary to LytEn, Inc., of Sunnyvale, Calif., to achieve surprising and wholly unexpected specific capacity retention capability far in excess of the 372 mAh/g values commonly cited in traditional Li ion battery related technologies, inclusive of performance at a level 3× or greater (referring to specific capacity retention capabilities exceeding 1,100 mAh/g or more), all made possible through the unique, multi-modal, hierarchical pores 101A and/or 107F defined by open porous scaffold 102A of mesoporous carbon-based particle 100A and/or 100E. Li ions form complexes and/or compounds with S, for example, and are temporarily retained during charge-discharge cycles at levels not otherwise achievable through conventional unorganized carbon structures requiring adhesive definition and combination via a binder, which can (as discussed earlier) also inhibit overall battery performance and longevity.

Lithium ions migrate from the negative electrode (anode 501 and/or hierarchical mesoporous carbon-based anode 503, any one or more of which further include and/or are defined by mesoporous carbon based particles 100A and/or 100E with minute carbon particles 509 interspersed therein) through the electrolyte 518 and the separator 517 to the positive electrode (cathode 502 and/or hierarchical mesoporous carbon-based cathode 504, any one or more of which further include and/or are defined by mesoporous carbon based particles 100A and/or 100E with minute carbon particles 509 interspersed therein) ([using] aluminum as a current collector). Here, lithium metal 514 micro-confined (as shown in enlarged areas 516 and 513) within hierarchical mesoporous carbon-based anode 503 (and in between graphene sheets 515 associated therewith as shown in area 513) may dissociate pursuant to the following equation (1):

$$\text{FLG-Li} \rightarrow \text{FLG} + \text{Li} + e- \quad (1)$$

Eq. (1) shows electrons 511 discharging 508 to power an external load and lithium ions 512 migrating to cathode 502 and/or hierarchical mesoporous carbon-based cathode 504 to return to a thermodynamically favored position within a cobalt oxide-based lattice pursuant to the following equation (2):

$$x\text{Li}^+ + xe^- + \text{Li}_{1-x}\text{CoO}_2 \rightarrow \text{LiCoO}_2. \quad (2)$$

During charging, this process is reversed, where lithium ions 505 migrate from the positive electrode through the electrolyte and the separator to the negative electrode.

Disclosed carbon-based structures (referring to the surprising favorable specific capacity values made possible by the unique multi-modal hierarchical structures of mesoporous carbon-based particle 100A, 100E and/or derivatives thereof, including carbon scaffold 300B and lithiated carbon scaffold 400A) build upon traditional advantages offered by lithium ion technology. Compared to sodium or potassium ions, the small lithium ion exhibits a significantly quicker kinetics in the different oxidic cathode materials. Another difference: as opposed to other alkaline metals, lithium ions can intercalate and deintercalate reversibly in graphite and silicon. Furthermore, a lithiated graphite electrode enables very high cell voltages. Disclosed carbon-based structures uniquely and unexpectedly enhance the ease through which lithium ions can intercalate and deintercalate reversibly between graphene sheets, due to the unique lay-out of few-layer graphene (FLG) (5-15 layers of graphene in a generally horizontally stacked configuration) 101C as employed in mesoporous carbon-based particle 100A and/or the like, and are suitable for application in traditional cylindrical (hardcase), pouch cell (softpack), and prismatic (hardcase) applications.

Stabilization of Artificial Solid-Electrolyte Interface (SEI) Films by Doping

At present, current Li ion batteries (as shown by electrode 600 in FIG. 6) form a protective passivation layer, or solid electrolyte interface (SEI), at the electrode surface exposed to electrolyte (generally facing away from the current collector) during the pre-conditioning step when the electrolyte is first introduced followed by initial discharge and charge steps. Although electrolyte chemistry and pre-conditioning protocols (charge/discharge rate and overvoltage) may be adjusted to optimize film passivation (referring to SEI formation), films may still be chemically and mechanically unstable.

By introducing (through doping) specific elements 602 (silicon, sulfur, nitrogen, phosphorous) at electrode surface 601 (such as including or otherwise referring to electrodes at least partially created by or incorporating mesoporous carbon-based particle 100A, 100E, carbon scaffold 300B and/or lithiated carbon scaffold 400A, as well as derivates thereof) at specified levels of conformal coverage (such as ranging from sparse decoration to complete conformal coverage) during the initial electrode fabrication processes (either in the MW plasma during innate carbon formation or during pre-lithiation and/or infiltration, as shown with addition of element 602 additions to the carbon preform in figure), an artificial solid state electrolyte interface can be created initially or further stabilized in-situ (referring to on-site or in-position, such as within a reaction chamber or reactor) during pre-conditioning steps of a given battery.

Precedence for formation of stable solid-state ion conducting layers have been reported in literature; referring to sulfide-based thioLISCONs (such as that defined Lithium Sulfur CONductors by the chemical formula $Li_{3.25}Ge_{0.25}P_{0.75}S_4$) and phosphate-based NASCIONs (referring to sodium (Na) Super Ionic CONductor, which usually refers to a family of solids with the chemical formula $Na_{1+x}Zr_2Si_xP_{3-x}O_{12}$, 0<x<3; also, in a broader sense, the acronym is also used for similar compounds where Na, Zr and/or Si are replaced by isovalent elements). In this manner, the formation of a stabilizing solid state passivation layer (as elucidated by this example of doping specific elements 602 including silicon, sulfur, nitrogen, phosphorous at electrode surface 601) can be engineered prior to battery assembly and thereby decouple the formation process of a stable solid state ion conducting layer from the reduction/oxidation events that occur when in contact with electrolyte (as encountered in current Li-ion battery fabrication which still often suffers from long term stable operation).

Direct "Drop-In" 3D Hierarchical Graphene Particles into Conventional Slurry Cast Electrode (Manufacturing the Above Using Slurry Cast Techniques)

In combination with conductive particles, such as carbon black, and optionally polymer binders and solvent, such as NMP, tuned 3D hierarchical graphene particles (referring mesoporous carbon-based particles 100A, 100E and/or the like with open porous scaffold 102A defining hierarchical pores 107F with uniquely sized pores 105F for S microconfinement) can be directly incorporated into conventional slurry cast electrode fabrication processes as follows:
  (1) an active graphene based (FLG) substitute for graphite particles, in the case of the anode; and/or
  (2) infused with active sulfur (S) in the case of the cathode.

The 3D graphene particles provide high specific capacity graphene building blocks with interconnected mesoporous ionic conducting channels for rapid transport along with carbon black and binder to ensure electrical conducting pathways (referring to hierarchical pores 107F) and mechanical integrity between adjacent and/or touching mesoporous carbon-based particles 100A, 100E and/or the like (that may collectively form larger agglomerations and/or organized structures, such as carbon scaffold 300B).

Alternatively (or in addition to the above), 3D hierarchical scaffold particles (referring to mesoporous carbon-based particles 100A, 100E, carbon scaffold 300B and/or the like) can be pre-lithiated (referring to ball milling and/or post thermal annealing and electrochemical reduction from a third electrode as discussed earlier), at:
  (1) a relatively low concentration to offset first charge lithium loss in conventional oxide cathode cell
  (2) or at a relatively higher concentration to increase overall specific capacity for both oxide and alternative cathode configurations, and then slurry cast into electrodes.

For these electrodes, both the electrical conduction and the concentration of 'free' metallic Li can be graded from the electrolyte-to-electrode to the electrode-to-current collector interfaces, as shown in the figure, with highest electrical conductivity and lithium concentration at the current collector back plane. In addition, an artificial SEI layer can be incorporated into each of the particles (referring to mesoporous carbon-based particles 100A, 100E, carbon scaffold 300B and/or the like) along with Li to facilitate reversible Li ion conduction and/or transport.

Figure 7A:
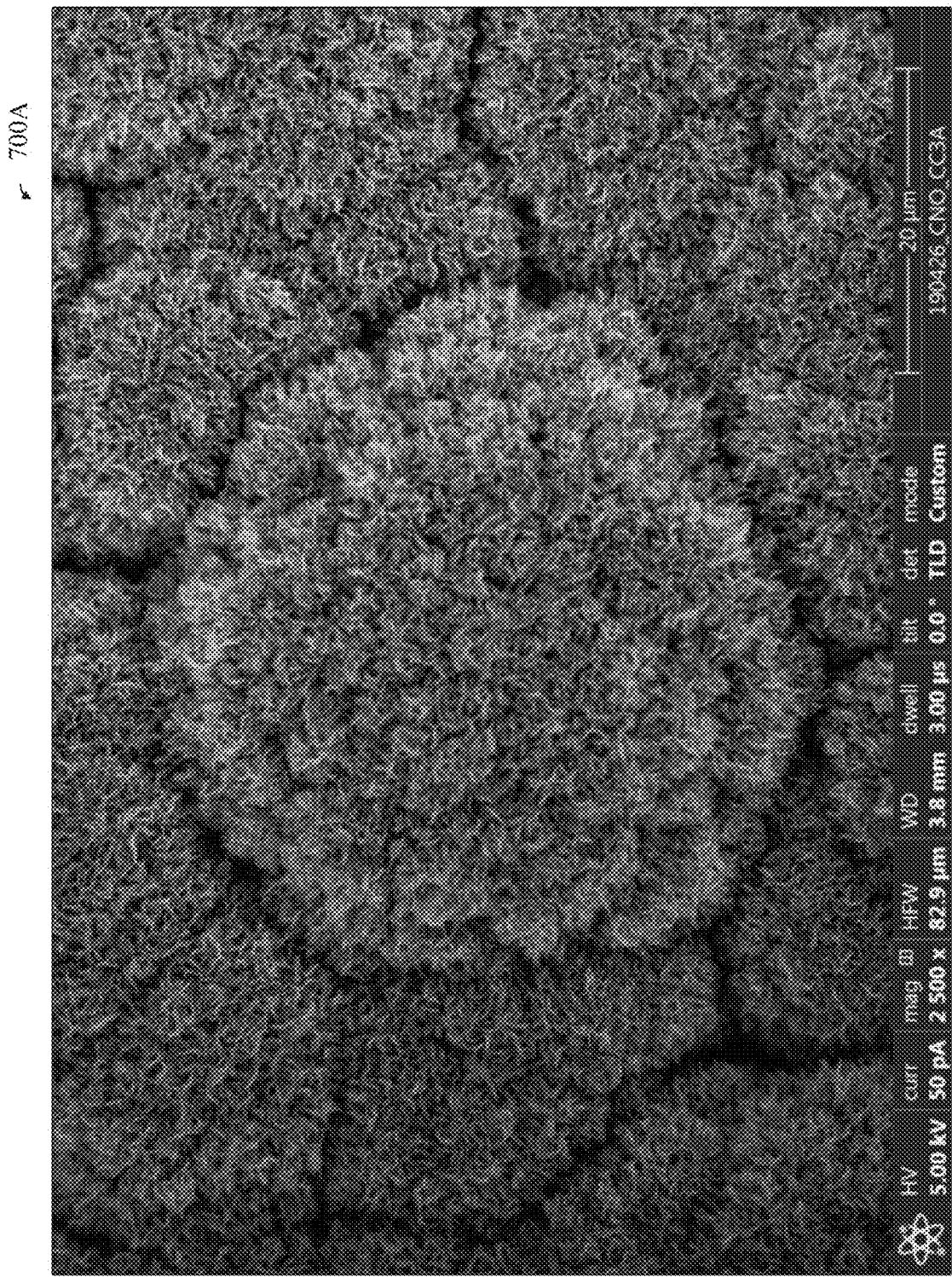
FIGS. 7A-7B show various photographs and/or micrographs related of example variants of the 3D mesoporous carbon-based particles shown in FIGS. 1A-1J, according to some implementations.
Figure 7B:
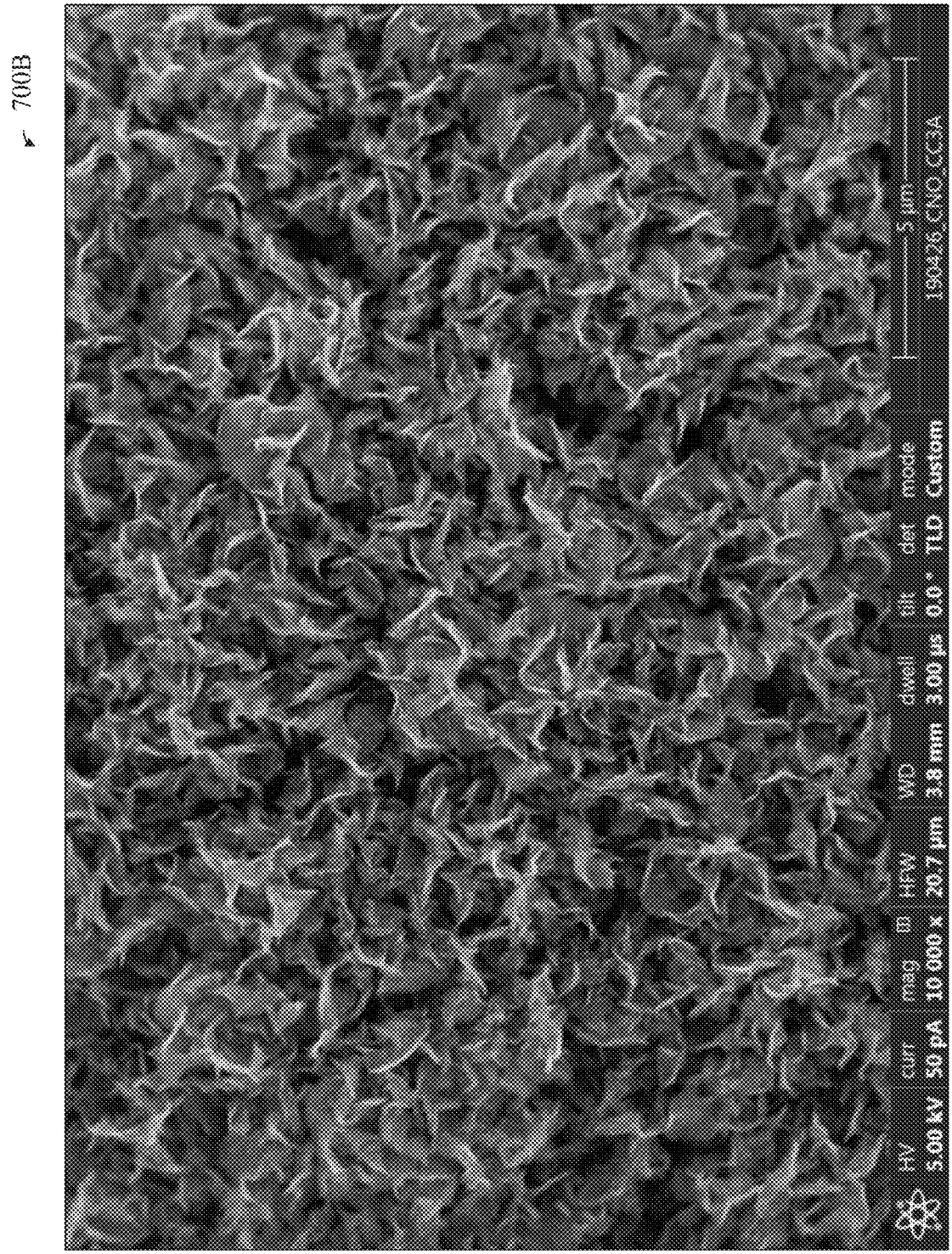

FIGS. 7A-7B show various photographs and/or micrographs related of example variants (variant 700A and variant 700B) of the 3D mesoporous carbon-based particles shown in FIGS. 1A-1J at various magnification levels illustrating internal porosity and microstructure. As can be seen from variant 700A, mesoporous carbon-based particle 100A, 100E and/or the like self-assembles upon an initial nucleation, such as in-flight in a microwave plasma-based reactor (as discussed earlier) to form ornate scaffolded agglomerations such as carbon scaffold 300B suitable for lithiation to become lithiated carbon scaffold 400A.

Figure 8A:
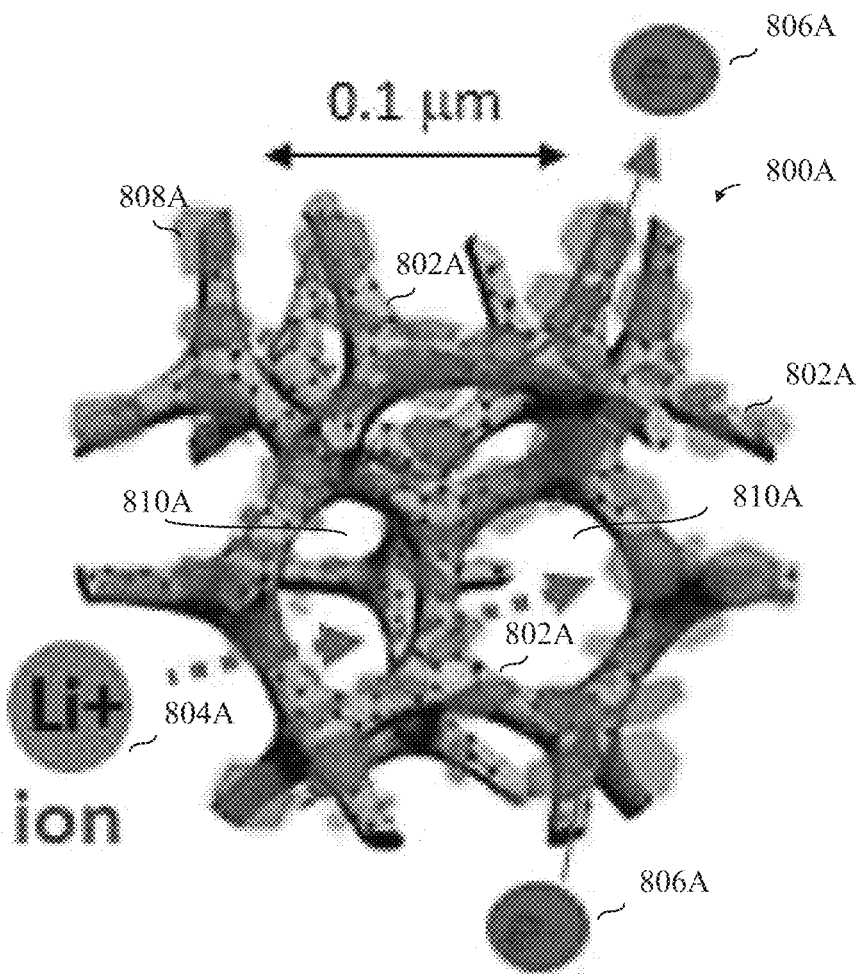
FIG. 8A shows an enlarged portion of the 3D mesoporous carbon-based particles shown in FIGS. 1A-1J, according to some implementations.

FIG. 8A shows an enlarged perspective cut-away view of mesoporous carbon-based particle 100A, 100E and/or the like. Individual ligaments 802A formed from as discussed in connection with mesoporous carbon-based particle 100A shown in FIG. 1A-F, contact surfaces and/or regions between electrically conductive interconnected agglomerations of graphene sheets 101B, may extend to form a lattice and/or tree-like branched structure of section 800A through which Li ions (Li+) 804A may be intercalated, inserted in between individual gradient layers of section 800A comprising, 3D bundles of graphene sheets 101B. Electric current may be conducted via flow of electrons through contact surfaces and/or regions between interconnected 3D bundles of graphene sheets 101B. Ions, e.g., Li ions (Li+), may flow through pores 810A, sized at a larger size of the bi-modal distribution of voids or pores as described in FIG. 1A-F on the order or 20 to 50 nanometers, or be confined, such as via chemical micro-confinement, in pores sized generally on the order of 1 to 3 nanometers.

Therefore, ion flow may be finely controlled or tuned in mesoporous carbon-based particle 100A to, for example, to be diametrically opposite to electron flow as needed to facilitate an electrochemical gradient that may be necessary for electricity conduction and/or electron flow through contact points and/or regions of 3D bundles of graphene sheets 101B. Spacing between individual carbon-based ligaments may be set a 0.1 μm. Those skilled in the art will appreciate that the dimension of 0.1 μm is provided as an example only and that other suitable similar or dissimilar dimensions may exist in section 800A of mesoporous carbon-based particle 100A.

Section 800A may be formed of 3D bundles of graphene sheets 101B that are sintered together with each other to form a configuration where there are no completely open channels such that electricity is necessarily conducted through contact points and/or regions of interconnected 3D bundles of graphene sheets 101B. Thus, liquid passing through voids 804A and the conductive nature of carbon-to-carbon bonding facilitates a connection of carbon-based materials to other carbon-based materials without the necessity of a chemical binder and/or chemical binding material or agent, many of which resulting in undesirable chemistries or side effects regarding functionality of mesoporous carbon-based particle 100A.

Open porous scaffold 102A of mesoporous carbon-based particle 100A presents a departure from traditional industry-standard battery electrodes that may involve slurry-cast "boulders", relatively large particles, organized haphazardly on a substrate, such boulders typically requiring a binder to be held together to conduct electricity there-through. Open porous scaffold 102A defined by hierarchical pores 101A and/or 107F of mesoporous carbon-based particle 100A allows for improved electrical conduction therein.

Figure 8B:
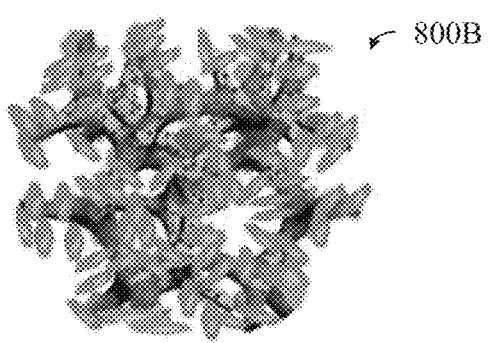
FIG. 8B shows the enlarged portion of the 3D mesoporous carbon-based particles shown in FIGS. 1A-1J with graphene-on-graphene densification, according to some implementations.

FIG. 8B shows the mesoporous carbon-based particle of FIG. 8A with graphene-on-graphene densification. For the example of FIG. 8B, surfaces 800B shown in FIG. 8B and/or surfaces 808A shown in FIG. 8A at edge regions, at least partially planar surfaces of the branched, tree-like structure of section 800A of mesoporous carbon-based particle 100A, may be densified upon the application, deposition, or otherwise growth of multiple additional graphene layers. Such densification processes, methods and/or procedures permit for the creation of intricate, multi-layer, and potentially nearly infinitely tunable 3D carbon structures comprising combinations of 3D bundles of graphene sheets 101B. Accordingly, such fine tunability accomplished by graphene-on-graphene densification may facilitate the attainment of particular electrical conductivity values when mesoporous carbon-based particle 100 is integrated into an electrode of a battery.

Figure 9A:
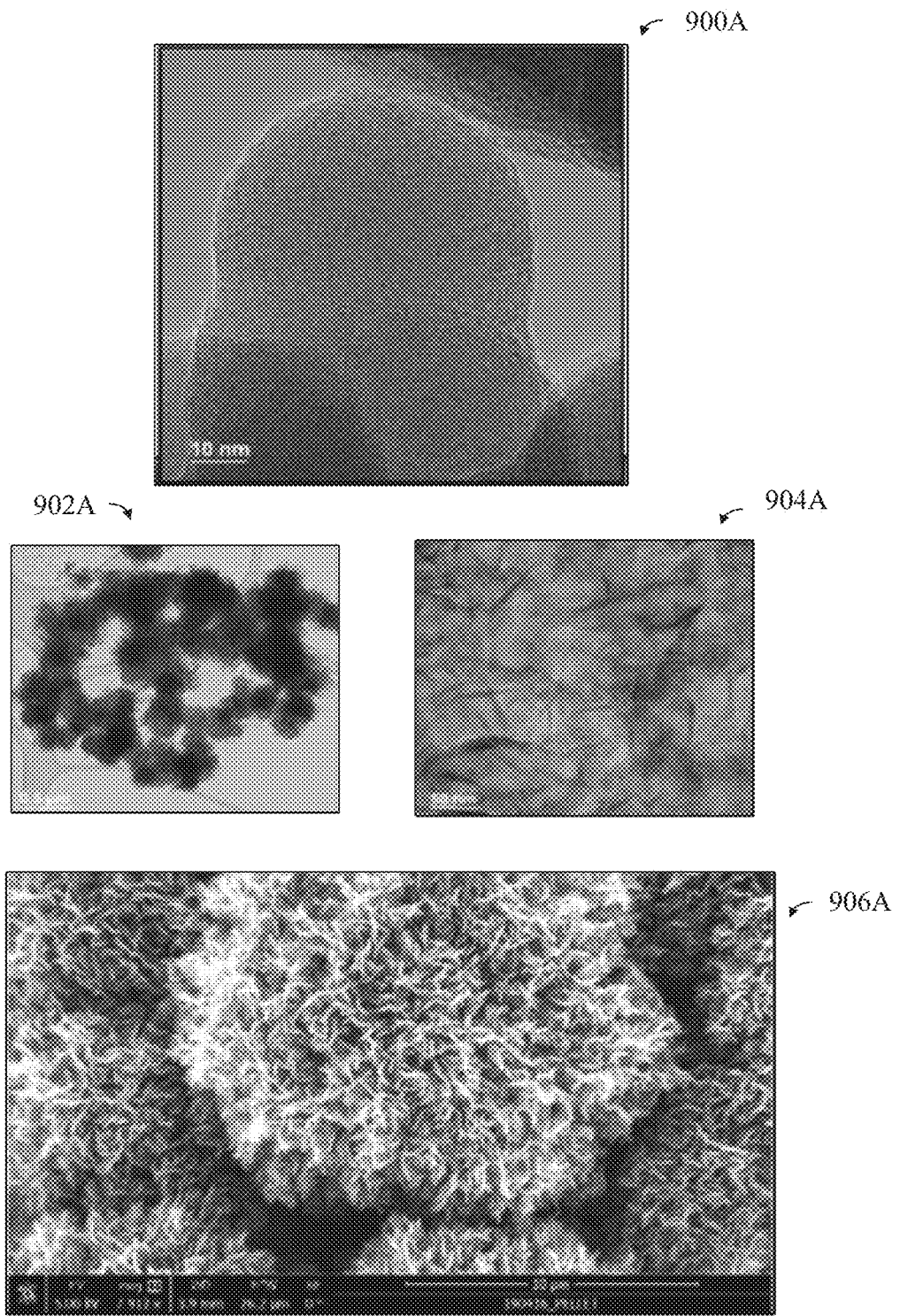
FIGS. 9A-9E shows various images of carbon and/or graphene and carbon particle-based 3D structures, including real-life representations of that shown by the 3D mesoporous carbon-based particles shown in FIGS. 1A-1J, with high degrees of purity and tunability, according to some implementations.
Figure 9B:
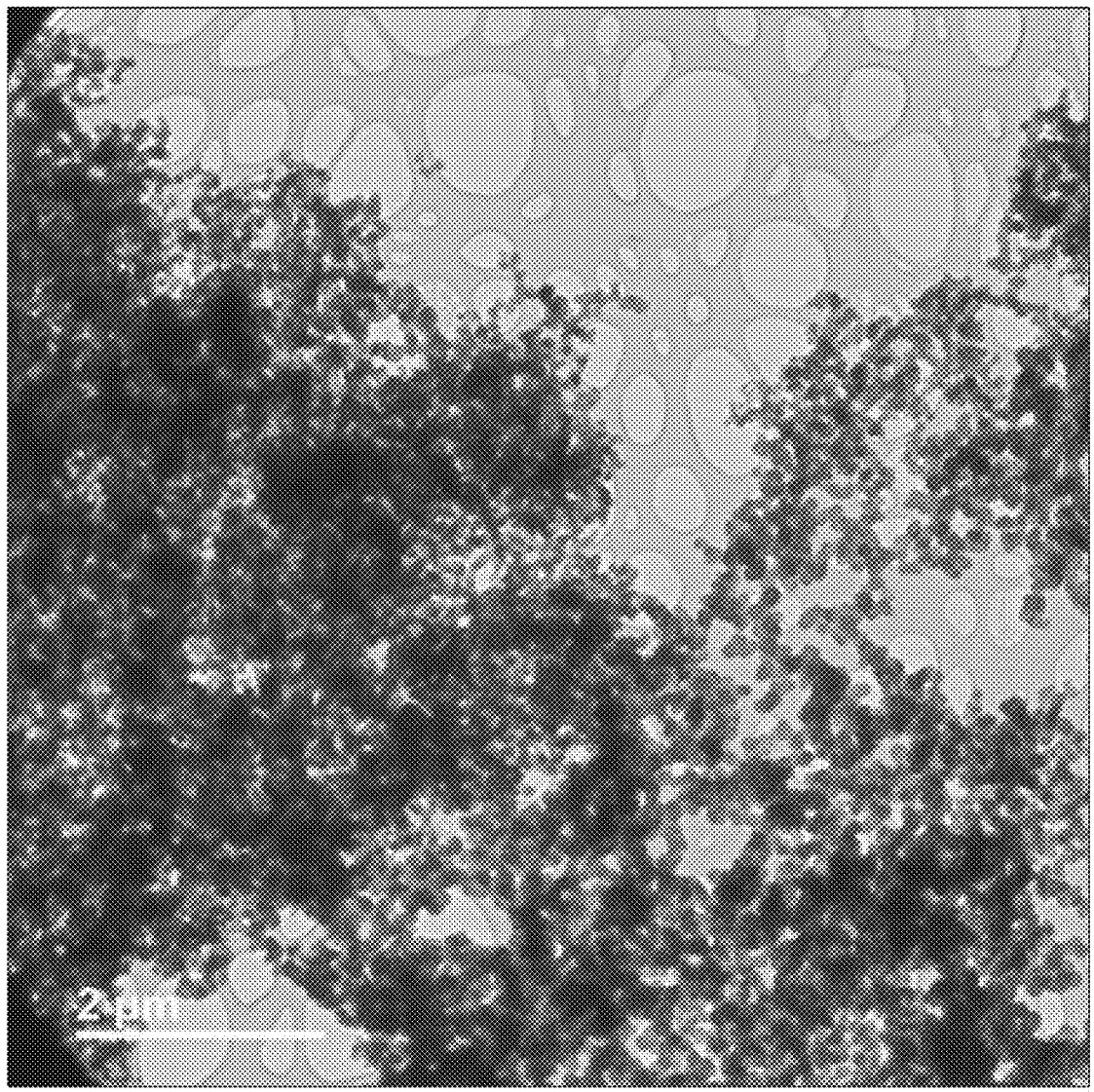
Figure 9C:
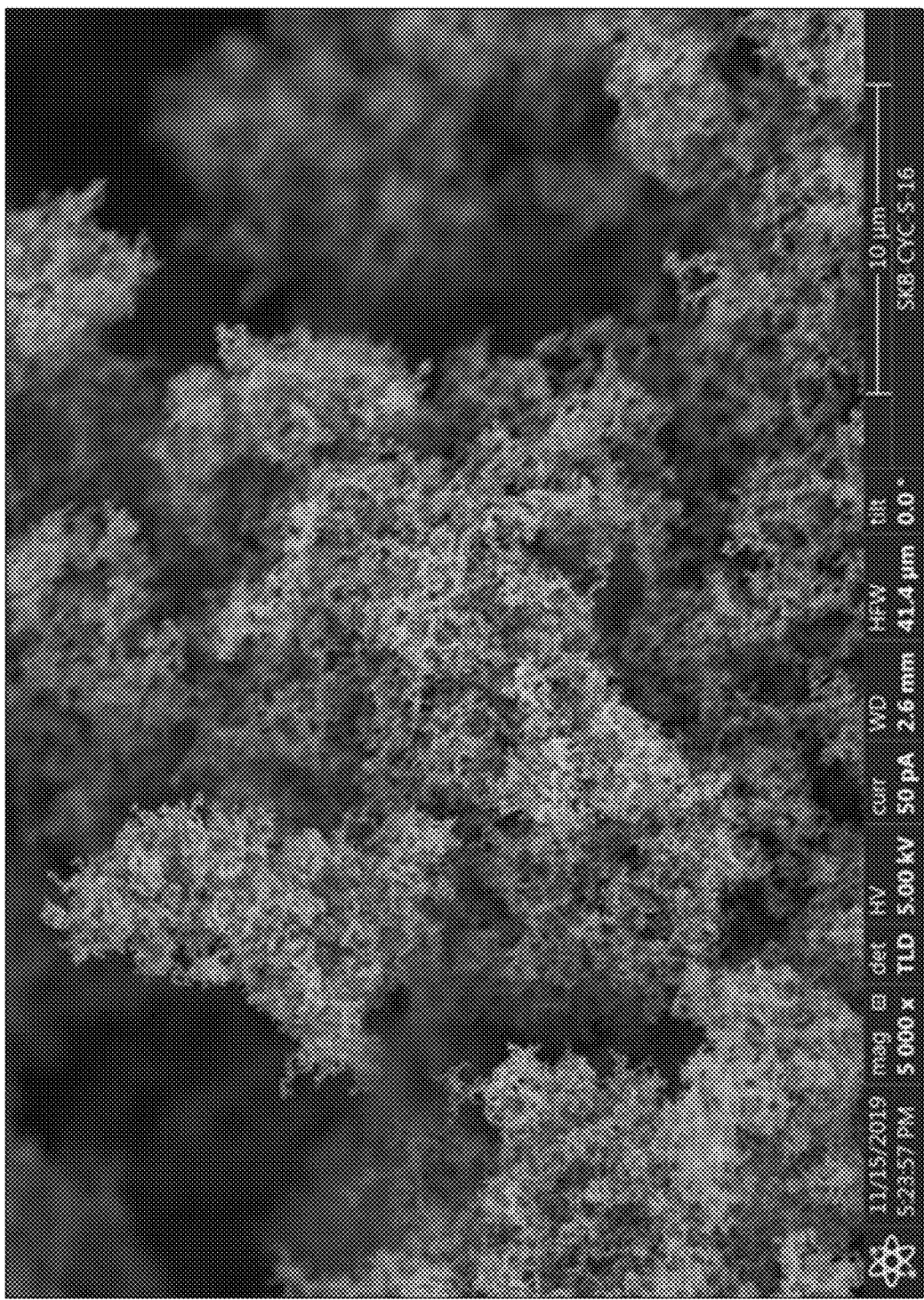
Figure 9D:
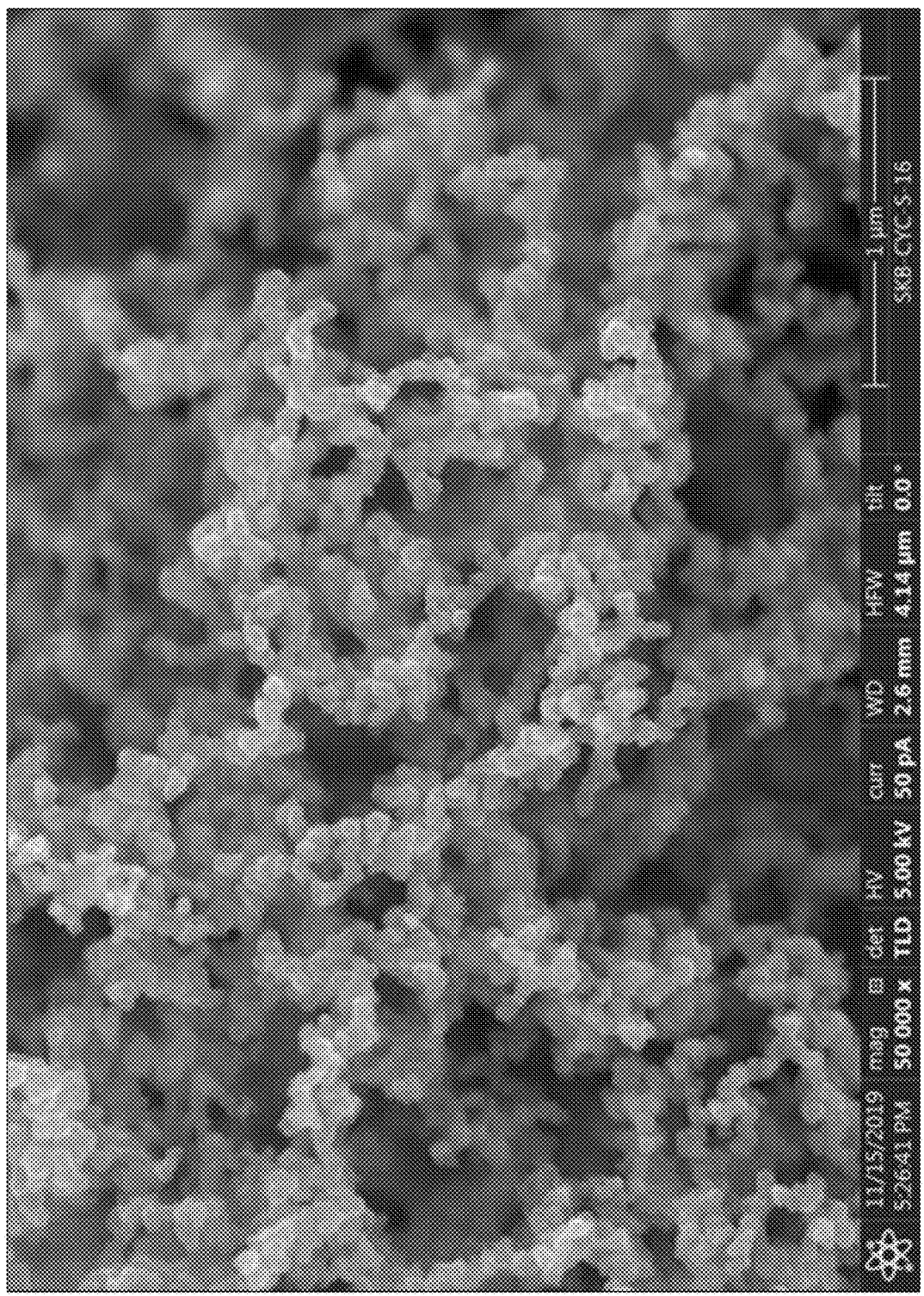
Figure 9E:
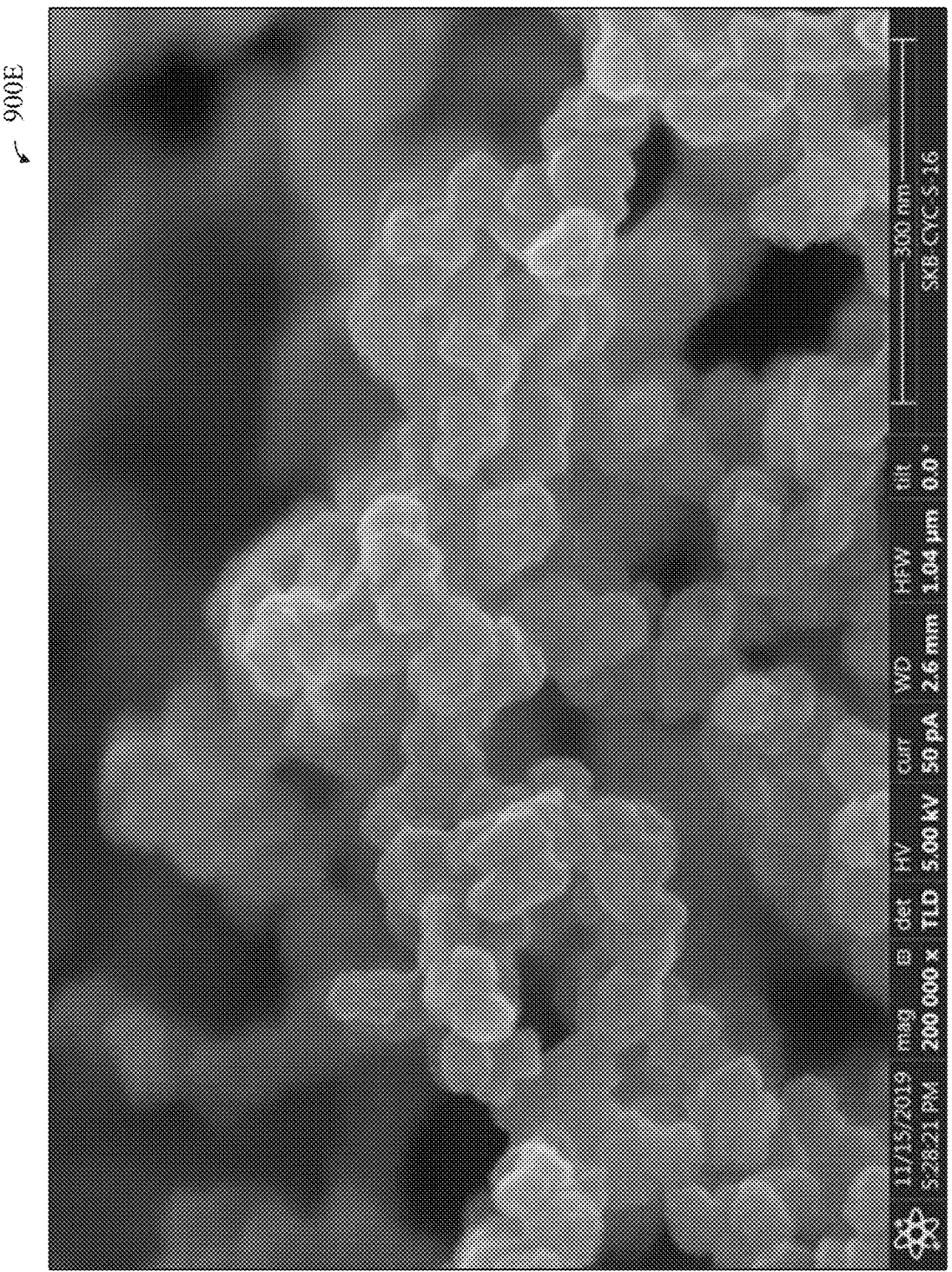

FIG. 9A shows various images of carbon and/or graphene and carbon particle-based 3D structures with high degrees of purity and tunability. In the example of FIG. 9, a first example carbon-based 3D structure 900A is shown having a dimension on the scale of 10 nm. Such a dimension is provided as an example. Particular plasma-based processing conditions, as applied or performed in a reactor such as a thermal reactor, for example, may be adjusted to with a high degree of tunability to achieve structures 902A and/or 904A, (as well as carbon nano-onions, CNOs, as shown in micrograph 100H in FIG. 1H, which can be produced in a thermal reactor and be used in batteries, CNO structures often consuming up to approximately 30% of a given cell electrode by volume) and graphene-on-graphene densification processes may be employed to grow or otherwise create complex 3D structures such as structure 906A. FIGS. 9B-9E illustrate micrographs (900B, 900C, 900D and/or 900E) of various example carbon-based materials such as variants of mesoporous carbon-based particle 100A, 100E and/or the like at various magnification levels.

Figure 10A:
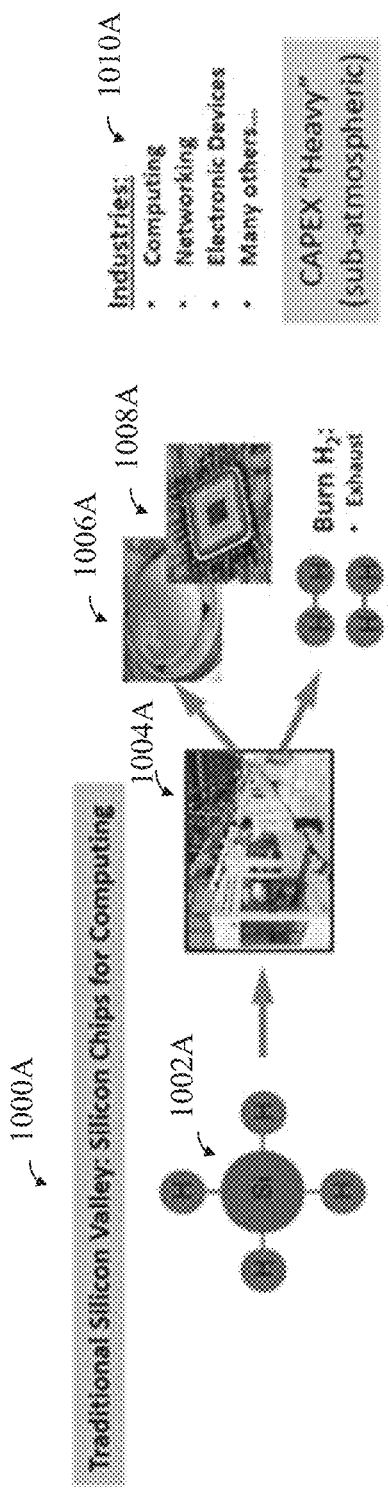
FIG. 10A shows a planning diagram representative of traditional silicon-chip based manufacturing techniques and related information, according to some implementations.

FIG. 10A shows a planning diagram representative of traditional silicon-chip based manufacturing techniques and related information. In the example of FIG. 10A, object 1000A describes various items associated with traditional silicon-based computer microchip manufacturing and processing, including usage of silane 1002A ($SiH_4$) as a precursor to elemental silicon, applied in clean room type facilities 1004A, where silicon wafers 1006A may be diced to produce individual silicon-based microchips 1008A requiring the burning and/or release of hydrogen gas ($H_2$) emitted as an exhaust. Such manufacturing techniques may be employed by various high-technology related industries 1010A such as computing, networking, electronic and/or power devices, and many others, any one or more of which being substantially capital expenditure ("CAPEX") heavy, being required to be performed at artificially controlled sub-atmospheric clean-room based conditions.

Figure 10B:
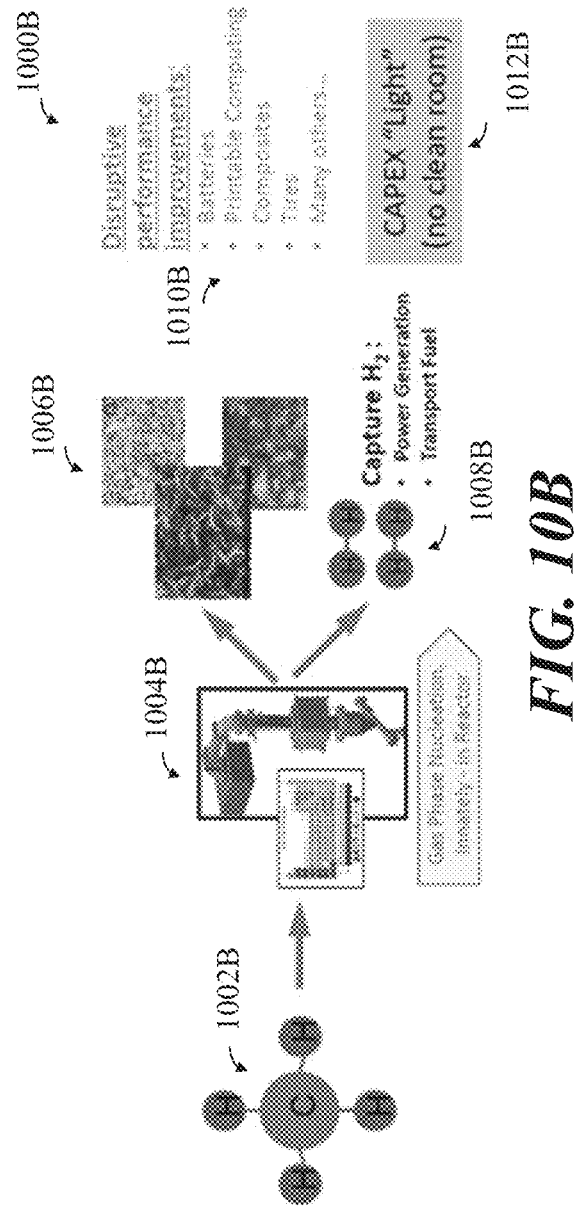
FIG. 10B shows a planning diagram representative of advanced 3D graphene and/or carbon-based industry-focused applications and/or solutions, according to some implementations.

FIG. 10B shows a planning diagram representative of advanced 3D graphene and/or carbon-based industry-focused applications and/or solutions. In the example of FIG. 10B, and in contrast to object 1000A depicting that associated with traditional silicon-based computing microchip manufacturing processes, object 1000B depicts advanced, carbon-based, sustainable manufacturing techniques for various end-use industrial applications, such as those relying upon supply of methane 1002B ($CH_4$) gas as a suitable precursor for single-layer graphene synthesis. Source gases, plasmas, and/or other feedstock materials may be supplied to facilitate gas phase nucleation innately in specially prepared and/or conventional reactors 1004B to create advanced carbon-based structures and/or materials, such as those described in mesoporous carbon-based particle 100A shown in FIGS. 1A-1F. Additionally, or alternatively, carbon-based materials may be fused, reacted and/or otherwise combined with metals and/or metallic materials to produce covetic materials and/or structures 1006B, where any emitted hydrogen gas ($H_2$) may be recaptured by processes 1008B so directed for subsequent usage in power generation and/or transport fuels. Such capabilities made possible by the manufacture and implementation of advanced carbon-based materials facilitate disruptive performance improvements 1010B in a variety of end-used applications and industries, including (but not limited to): batteries, printable computing, composites, tires, etc. Any one of more of such end use applications may not require the usage of dedicated clean-room type facilities, therefore ultimately reducing overall capital expenditure 1012B.

Figure 11:
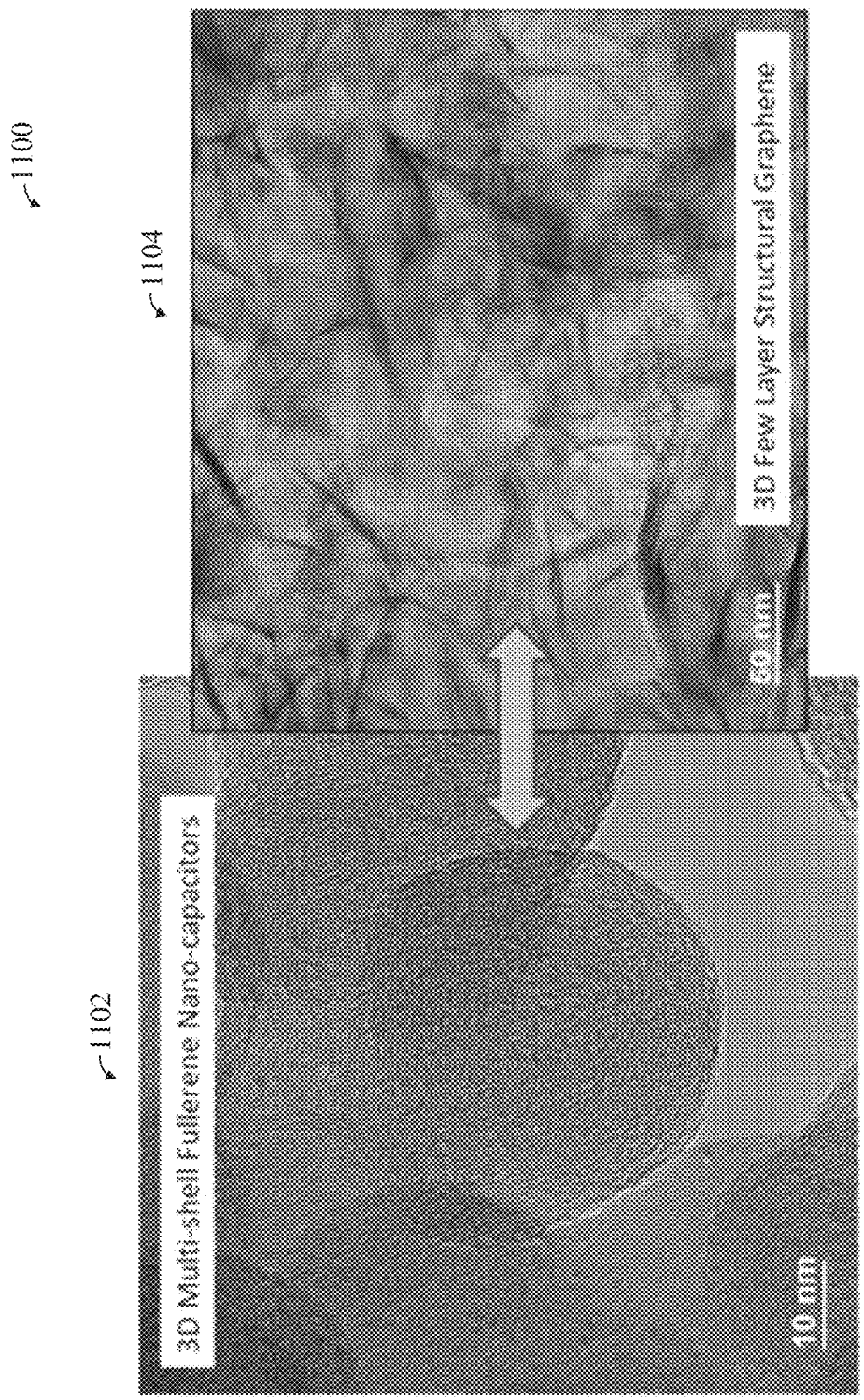
FIG. 11 shows graphene and/or 3D graphene-based particles and/or few-layer graphene (FLG) associated with the 3D mesoporous carbon-based particles shown in FIGS. 1A-1J, according to some implementations.

FIG. 11 shows micrographs 1100 of 3D multi-shell fullerene nano-capacitors (such as those in the form of carbon nano-onions, CNOs, which may be derived from similar or identical synthetic procedures as mesoporous carbon-based particle 100A and/or the like to yield similar surprising and beneficial properties useful in battery electrode end-use applications). In the examples of FIG. 11, innate graphene properties, that may be variable according to process conditions, etc., are shown as supporting electro-active to structurally demanding material applications in images 1102, 1104. Image 1102 depicts 3D multi-shell fullerene nano-capacitors, which may be prepared to store and/or supply electric charge and/or current at the 10 nm scale. Holes, openings and/or orifices can be created by penetrating CNOs and related structures to receive active material, such as lithium, cobalt, manganese (spinel), NCM (nickel-cobalt manganese), and phosphate, which may be inserted and retained in the holes. Image 1104 shows 3D few-layer graphene ("FLG"), structural FLG at the 50 nm scale.

FIG. 12 shows a listing of properties associated with example 3D graphene-based scaffolded particles (such as mesoporous particle 100A and carbon scaffold 300B). In the example of FIG. 12, listing 1200 describes various example parameters and/or physical properties of 3D scaffolded particles. Sample parameters and/or physical properties of 3D scaffolded particles disclosed herein, including mesoporous carbon-based particle 100A shown in FIGS. 1A-1F, including employing fabrication and/or construction techniques relating to tunable hierarchical pores, tuning regarding both size, and distribution thereof in the 1-2 nm micro scale to >40 nm meso scale sized pores.

Nanoscale sized tuning may be performed on 3D scaffolded particles to open 3D channels to create and/or form building blocks within a micron scale or at a larger, macroparticle, sized scale. Surface chemistries used to prepare and/or synthesize 3D scaffolded particles may be tunable, by using, as feedstock, materials including pristine to doped graphene. Other areas may be tuned as well including adjustment of parameters used to create 3D scaffolded particles to achieve particular enumerated mechanical integrity and/or strength goals by tuning of carbon-based connecting ligaments. Any one or more of the discussed tuning mechanisms may be accomplished, for example, to achieve particular enumerated mechanical integrity/strength objectives, by adjustment of ligaments. Any one or more of the discussed tuning capabilities, and others, may be accomplished at a relatively low cost, both in terms of capital investment and ongoing operations, to facilitate convenient high-volume carbon production.

FIG. 13 shows various charts, equipment, and particle products of carbon and/or 3D graphene. In the example of FIG. 13, plasma-based processes conducted within a reactor 1302, such as a thermal reactor, may be tuned between various plasma modes and/or conditions 1300 to achieve a final end-use and/or application particle product 1304, shown here in particle and/or particulate form.

FIG. 14 shows various depictions 1400 of porous innately graphene nano-platelets ("GNP") connected particle products (such as those derived from mesoporous particle 100A and carbon scaffold 300B) and/or FLG and related equipment. In the example of FIG. 14, a schematic of a mesoporous carbon-based particle and/or scaffolded structure 1402 is shown as representative of particle product 1404. Scaffolded structure 1402 is shown depicted in various images showing: nodules (particle product 1404), generally known regarding in chemistry and composites as an aggregation or lump of matter distinct from its surroundings; FLG 1406, defined herein and understood to refer to <10 layers of graphene generally configured in a stacked orientation; surface etching 1408 of carbon-based particles showing tunable spacing 1412, as well as doped surfaces 1414. Further, energy optimized non-equilibrium plasma processing 1410 may be used to fine tune carbon scaffold and/or scaffolded structure 1402 generate to achieve desirable end-use application physical parameter goals.

Figure 15:
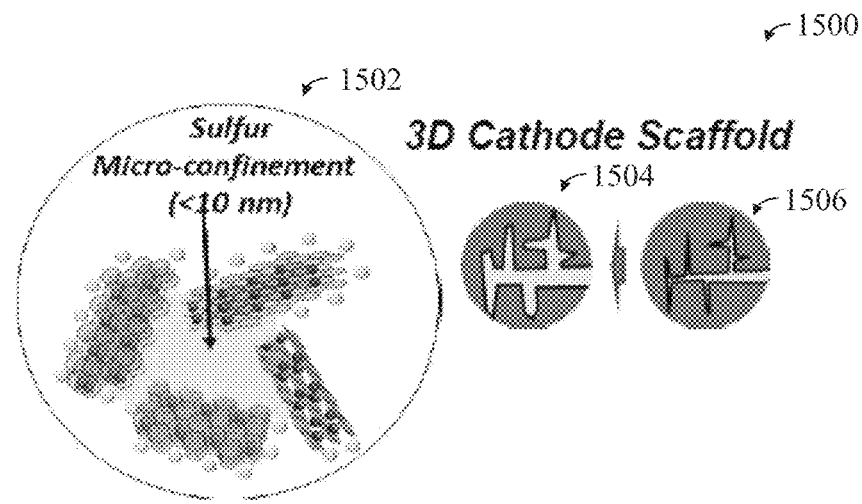
FIG. 15 shows a schematic example representation of the 3D mesoporous carbon-based particles shown in FIGS. 1A-1J featuring sulfur micro-confinement therein, according to some implementations.

FIG. 15 shows a schematic depiction 1500 of a 3D graphene-particle cathode scaffold (such as carbon scaffold 300B) featuring sulfur (S) micro-confinement therein. In the example of FIG. 15, graphene-based sheets and/or structures containing sulfur entrainment and/or confinement 1502 in various 3D cathode scaffolded structures or configurations, of various thicknesses 1504 and 1506, are shown. S inclusion in graphene-based battery chemistry provides desirable electric charge storage and retention (measured in milliamp hours), further described by the synthesis of a graphene-sulfur composite material by wrapping poly(ethylene glycol) (PEG) coated submicrometer sulfur particles with mildly oxidized graphene oxide sheets decorated by carbon black nanoparticles.

The PEG and graphene coating layers are important to accommodating volume expansion of the coated sulfur particles during discharge, trapping soluble polysulfide intermediates, and rendering the sulfur particles electrically conducting. The resulting graphene-sulfur composite showed high and stable specific capacities up to ~600 mAh/g over more than 100 cycles, representing a promising cathode material for rechargeable Li batteries with high energy density. Other studies have shown that activated graphene (AG) with various specific surface areas, pore volumes, and average pore sizes [have been] fabricated and applied as a matrix for sulfur. The impacts of the AG pore structure parameters and sulfur loadings on the electrochemical performance of Li-sulfur batteries are systematically investigated.

The results show that specific capacity, cycling performance, and Coulombic efficiency of the batteries are closely linked to the pore structure and sulfur loading. An AG3-sized (S) composite electrode with a high sulfur loading of 72 wt. % exhibited an excellent long-term cycling stability (50% capacity retention over 1,000 cycles) and extra-low capacity fade rate (0.05% per cycle). In addition, when $LiNO_3$ was used as an electrolyte additive, the AG3/S electrode exhibited a similar capacity retention and high Coulombic efficiency (~98%) over 1,000 cycles. The excellent electrochemical performance of the series of AG3/S electrodes is attributed to the mixed micro/mesoporous structure, high surface area, and good electrical conductivity of the AG matrices and the well-distributed sulfur within the micro/mesopores, which is beneficial for electrical and ionic transfer during cycling.

Figure 16:
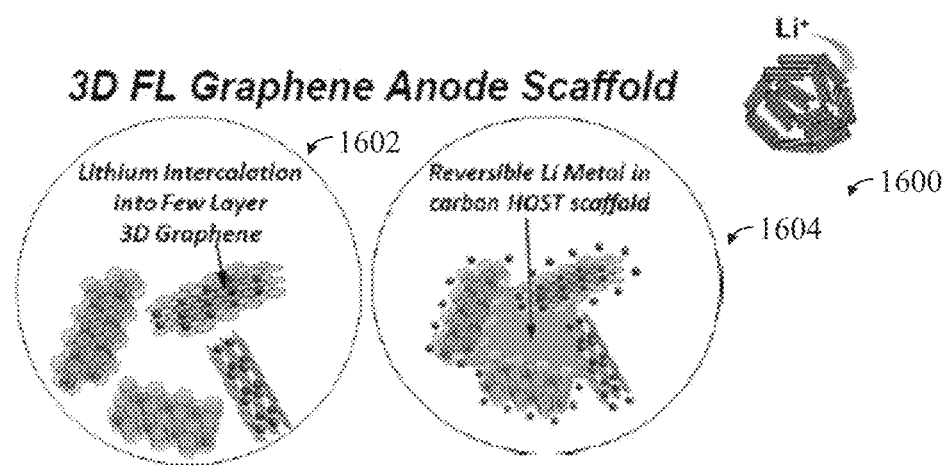
FIG. 16 shows the 3D mesoporous carbon-based particles shown in FIGS. 1A-1J with Li intercalation between graphene layers, according to some implementations.

FIG. 16 shows a 3D few-layer graphene anode scaffold (such as carbon scaffold 300 and/or lithiated carbon scaffold 400A) with Li intercalation between graphene layers. In the example of FIG. 16, Li ions (Li+) are shown in various configurations 1600 including as being intercalated into FLG 1602 and reversible inclusion of Li metal in a carbon-based host scaffold 1604. Lithium intercalation into bilayer graphene may relate to the real capacity of graphene and the lithium-storage process in graphite, which present problems in the field of lithium ion batteries.

Corroborated by theoretical calculations, various physiochemical characterizations of the staged lithium bilayer graphene products further reveal the regular lithium-intercalation phenomena and therefore fully illustrate this elementary lithium storage pattern of two-dimension. These findings not only make the commercial graphite the first electrode with clear lithium-storage process, but also guide the development of graphene materials in lithium ion batteries.

Li absorption and intercalation in single layer graphene and few layer graphene differs to that associated with bulk graphite. For single layer graphene, the cluster expansion method is used to systemically search for the lowest energy ionic configuration as a function of absorbed Li content. It is predicted that there exists no Li arrangement that stabilizes Li absorption on the surface of single layer graphene unless that surface includes defects. From this result follows that defect poor single layer graphene exhibits significantly inferior capacity compared to bulk graphite.

FIG. 17 shows a listing of properties and/or features associated with integrated 3D scaffolded films. In the example of FIG. 17, integrated mesoporous carbon-based particle films 1700 include at least the following particle-like properties, in addition to:
(1) sacrificial, as well as, supporting film substrate;
(2) tunable velocity to substrate;
(3) tunable impact energy from implantation to adsorption;
(4) tunable thickness; and,
(5) tunable porosity; any one or more of which can be integrated with additive type manufacturing capability.

FIG. 18 shows a listing of properties and/or features associated with a reactor to film processed carbons. In the example of FIG. 18, carbons may be processed from a reactor to a film state via at least the following processes 1800: roll to roll processing; covalently bonded carbon rich electrode interfacing; and, cathode and anodes deposition without the heavy use of inactive binders.

FIG. 19 shows a general progression 1900 of proprietary carbon deposition on film processes integrated with roll-to-roll processing. In the example of FIG. 19, proprietary covalently bonded carbon-rich electrode interfaces 1902 may be created through proprietary deposition processes, those provided by LytEn, Inc., of Sunnyvale, Calif., including roll-to-roll synthesized carbon to carbon processes to create tuned carbon coatings 1904 and coated materials 1906 in-line facilitating further functionalization and synthesis. Coated materials 1906 may be prepared to accommodate any one or more of functionalization, sulfidation, lithiation, and/or the like.

Efforts have been undertaken in the roll-to-roll processing or manufacturing areas, as further elucidated by the "Roll to Roll (R2R) Processing Technology Assessment", supported at least in part by the U.S. Dept. of Energy, which states that [r]oll-to-roll (R2R) is a family of manufacturing techniques involving continuous processing of a flexible substrate as it is transferred between two moving rolls of material.

R2R is an important class of substrate-based manufacturing processes in which additive and subtractive processes can be used to build structures in a continuous manner. Other methods include sheet to sheet, sheets on shuttle, and roll to sheet; much of the technology potential described in this R2R Technology Assessment conveys to these associated, substrate-based manufacturing methods.

R2R is a "process" comprising many technologies that, when combined, can produce rolls of finished material in an efficient and cost-effective manner with the benefits of high production rates and in mass quantities. High throughput and low cost are the factors that differentiate R2R manufacturing from conventional manufacturing which is slower and higher cost due to the multiple steps involved, for instance, in batch processing. Initial capital costs can be high to set up such a system; however, these costs can often be recovered through economy of scale. FIG. 1 illustrates an example of R2R processing of a state-of-the-art nanomaterial used in flexible touchscreen displays.

FIG. 20 shows a listing 2000 of proprietary engineered 3D carbons that enable significant battery performance advantages over currently available Li-ion batteries. In the example of FIG. 20, any one or more of mesoporous carbon-based particle 100, shown in FIG. 1, and/or 3D bundles of graphene sheets 102 and/or conductive carbon particles 104 may be organized within mesoporous carbon-based particle 100 during its construction and/or creation to achieve any one or more of the physical and/or electrical energy storage and/or conductivity values recited in FIG. 15, such as (but not limited to): 400 to 650 (W·h)/kg, with a maximum theoretical value of 850 (W·h)/kg, and also including aspects with a sulfur and/or sulfur-intercalated cathode of 650 (MAh)/g, and, aspects of 3D bundles of graphene sheets 102 and/or conductive carbon particles 104 interspersed therewith to define pores and/or voids, etc., as substantially discussed in connection with that shown in FIG. 1, with ionic Li (Li+) intercalated therewith, achieving energy density storage value of 900 to 2,000 (mAh)/g.

Figure 21:
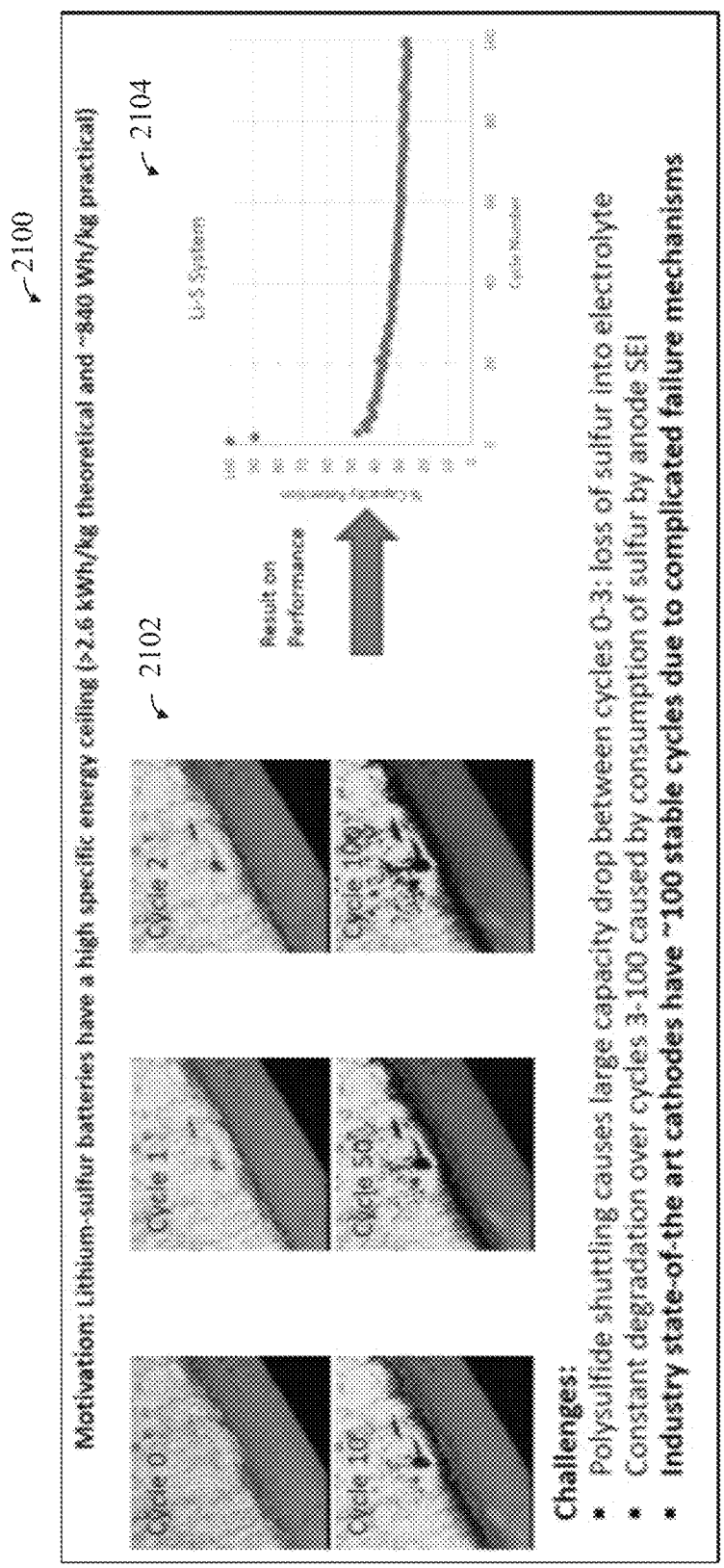
FIG. 21 shows various images of a sulfur cathode and a Li—S system performance chart over cycles, according to some implementations.

FIG. 21 shows various images 2100 of a sulfur cathode and a Li—S system performance chart over cycles. In the example of FIG. 21, example Li-sulfur batteries having electrodes created with graphene sheets 101B and/or mesoporous carbon-based particle 100A, both shown in FIGS. 1A-1F, are tested. Li-sulfur batteries have a high specific energy ceiling (>2.6 kWh/kg theoretical and ~840 W·h/kg practical) and are shown deteriorating over repeated usage cycles, in images 2102 showing Cycle 0-Cycle 100, such deterioration having a measurable impact on percentage capacity retention performance in Li—S systems, as shown by graph 2104. Common challenges associated with such Li—S batteries include that polysulfide shuttling causes a large capacity drop between cycles 0-3, and a loss of sulfur into the electrolyte; constant degradation over cycles 3-100 as caused by consumption of sulfur by anode materials; and, studies have shown that even industry state-of-the-art cathodes have averaged reliable performance metric figures over ~100 stable cycles due to complicated failure mechanisms.

Figure 22:
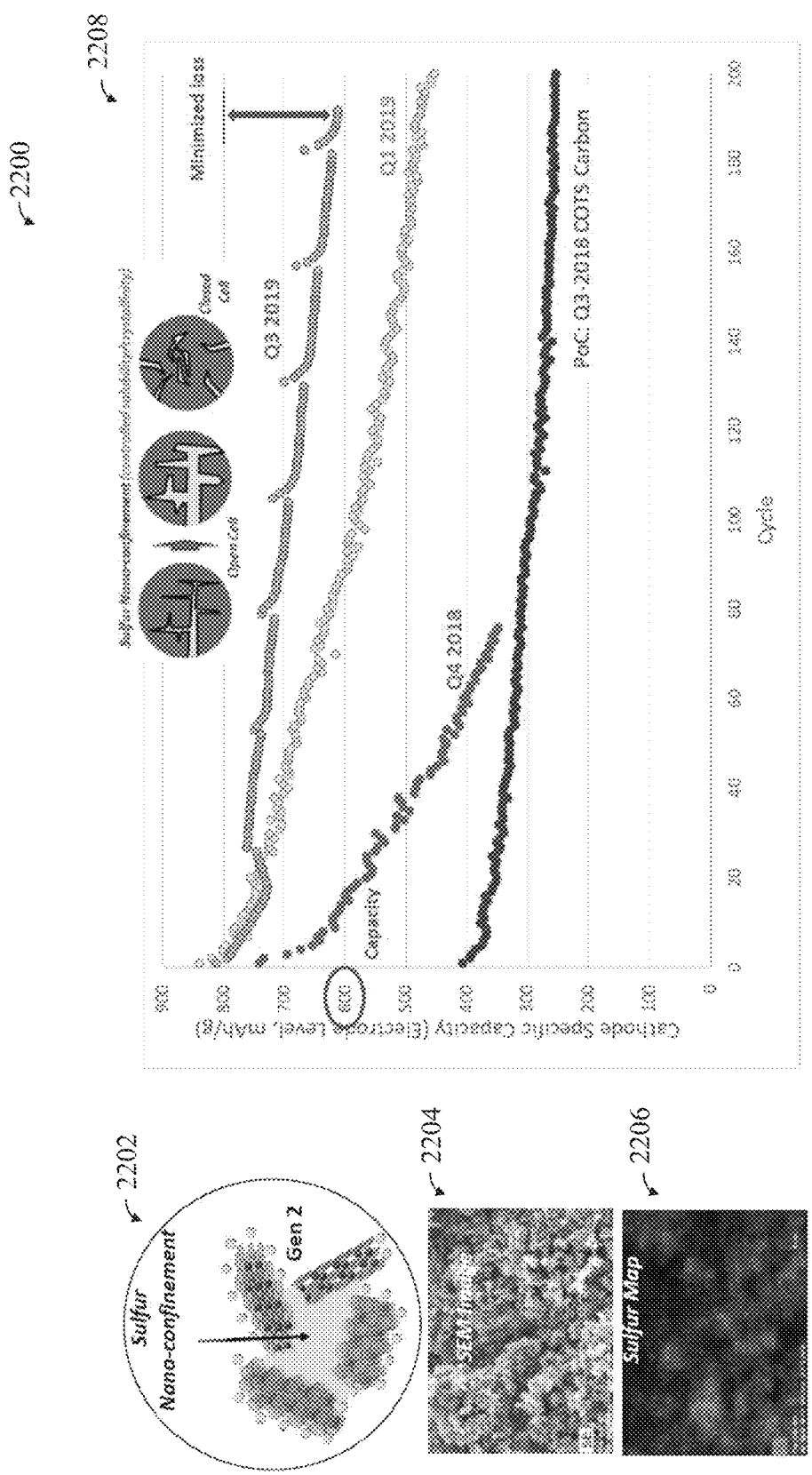
FIG. 22 shows cathode specific capacity levels over cycles and various representative sulfur-nano confinement diagrams and images, according to some implementations.

FIG. 22 shows cathode specific capacity levels over cycles and various representative sulfur-nano confinement (as representative of application and/or usage of systems based on or using mesoporous carbon-based particle 100A and derivatives thereof) diagrams and images. In the example of FIG. 22, various imagery 2200 is shown concerning depictions of sulfur nano-confinement in graphene layers 2202 as well as images thereof 2204 and with a sulfur map 2206. Improved cathode specific capacity, electrode level, as measured in mAh/g, is shown in graph 2208 for various compositions and/or compounds, any one or more of which at least partially include mesoporous carbon-based particle 100A formed with sulfur integrated therewith to enhance cathode specific capacity.

Figure 23:
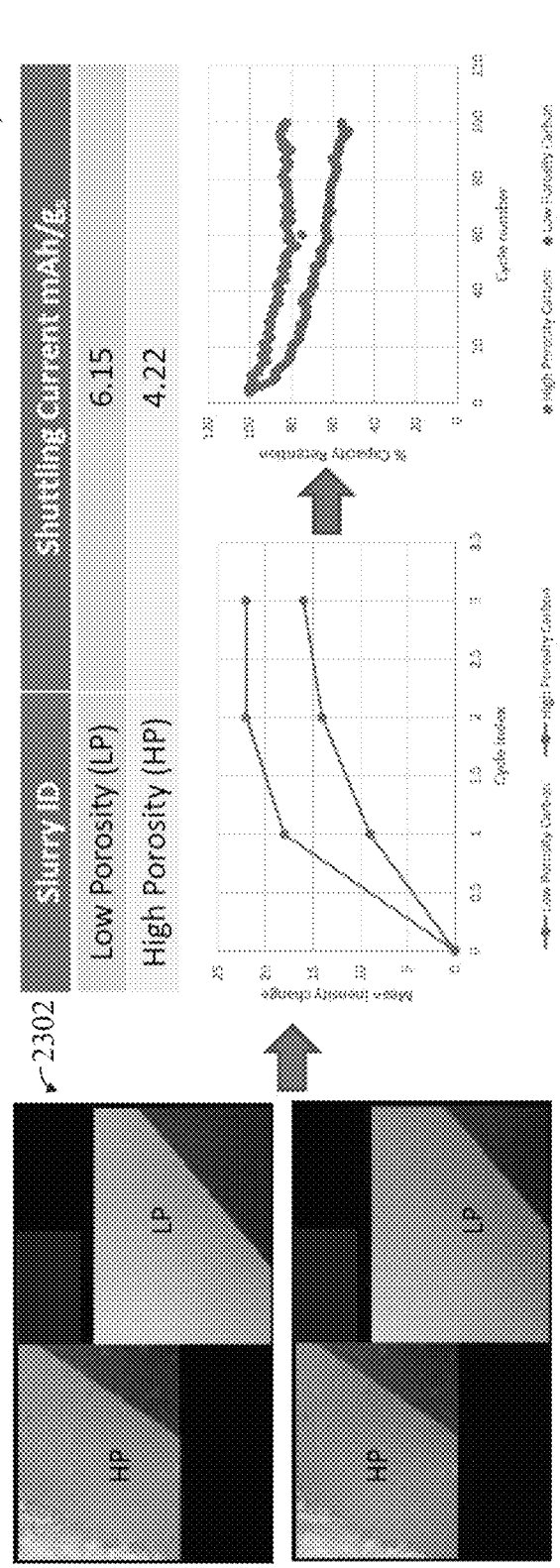
FIG. 23 shows various images, tables and charts regarding accelerated carbon tuning achieved by at least partially incorporating the 3D self-assembled binder-less mesoporous carbon-based particle shown in FIGS. 1A-1J into a battery electrode to mitigate polysulfide related issues, according to some implementations.

FIG. 23 shows various images, tables and charts (including optical cell analyses 2302 and 2304) regarding accelerated carbon tuning to mitigate polysulfide related issues. In the example of FIG. 23, imagery 2300 is shown regarding the effects observed of changing carbon properties on polysulfide shuttling, indicating overall that increasing the porosity of carbon-based materials, mesoporous carbon-based particle 100A and variations thereof, reduces polysulfide shuttling, defined as "where sulfur species reach the negative electrode surface and undergo chemical reduction", shown in optical cell analyses 2302 and 2304. Table 2306 indicates values of relatively low porosity mesoporous carbon-based particle materials having a shuttling current of 6.15 mAh/$g_s$, and of relatively high porosity mesoporous carbon-based particle ed materials having a shuttling current of 4.22 mAh/$g_s$. Chart 2308 shows a mean intensity change of low porosity carbon generally at higher levels than high porosity carbon. Chart 2310 shows high porosity carbon generally with higher levels of percentage capacity retention over repeated battery usage cycles relative to low porosity carbon.

Figure 24:
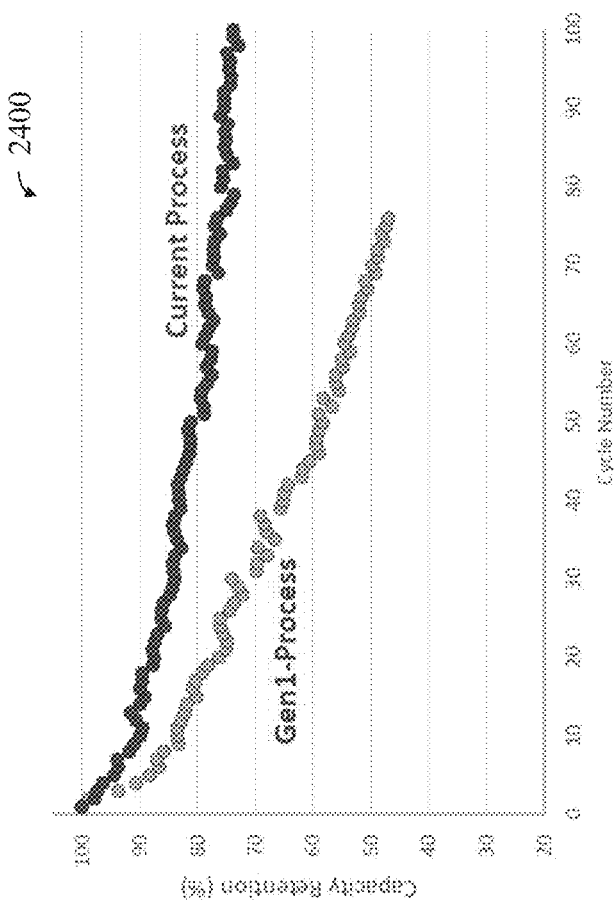
FIG. 24 shows a chart of example battery capacity retention values for infusion and/or incorporation of sulfur and/or lithium in the 3D self-assembled binder-less mesoporous carbon-based particle shown in FIGS. 1A-1J with relation to battery capacity and stability, according to some implementations.

FIG. 24 shows proprietary 3D graphene and 3D graphene-based particles in relation to sulfur infusion and its relation to battery capacity and stability. In the example of FIG. 24, chart 2400 shows current processes, referring to those substantially with implementation of mesoporous carbon-based particle 100A and/or the like, shown in FIGS. 1A-F, with the electrodes of a Li-ion battery to improve performance thereof, as showing better percentage capacity retention than earlier, "Gen1-Process", processes.

Figure 25:
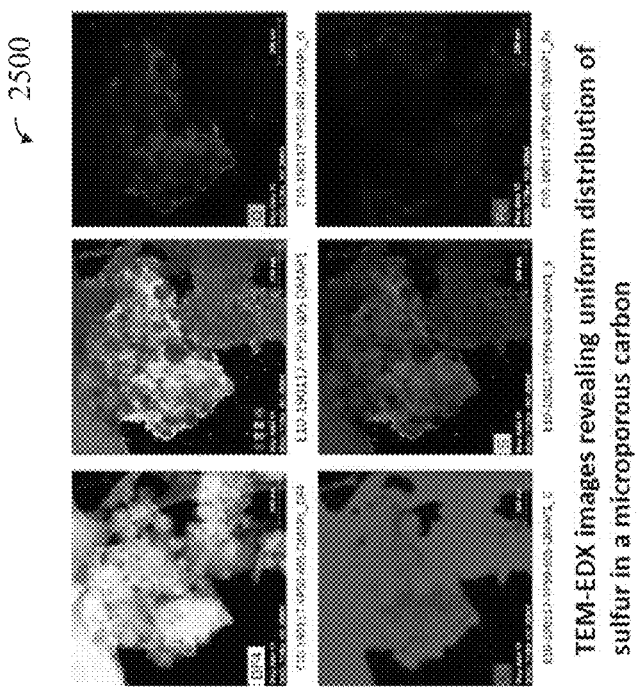
FIG. 25 shows spectroscopic images revealing uniform distribution of sulfur in the 3D self-assembled binder-less mesoporous carbon-based particle shown in FIGS. 1A-1J, according to some implementations.

FIG. 25 shows micrographs 2500 revealing uniform distribution of sulfur in a microporous carbon, such as through various images, including false-color images produces for the purposes of visual differentiation and clarity, revealing a relatively uniform distribution of sulfur in a microporous carbon.

Figure 26:
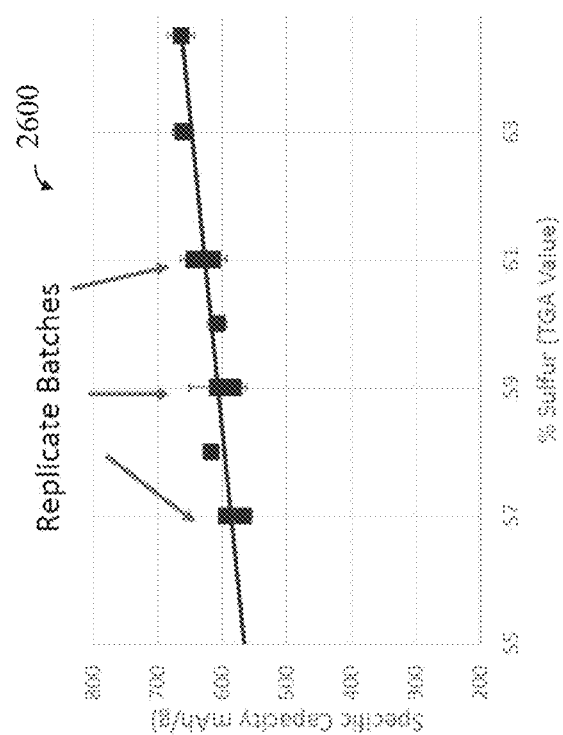
FIG. 26 shows a chart for specific capacity (mAh/g) vs. percentage of sulfur (thermo-gravimetric analysis value; TGA) for the 3D self-assembled binder-less mesoporous carbon-based particle shown in FIGS. 1A-1J, according to some implementations.

FIG. 26 shows a chart for specific capacity (mAh/g) vs. percentage of sulfur (thermo-gravimetric analysis value; TGA). In the example of FIG. 26, chart 2600 shows increasing values of specific capacity for replicate, substantially similar, batches of carbon-based materials, mesoporous carbon-based particle 100A as shown in FIGS. 1A-F, for increasing values of sulfur entrainment there-within. Chart 2600 shows a generally positive trend for specific capacity retention proportionate to increasing sulfur values.

Figure 27:
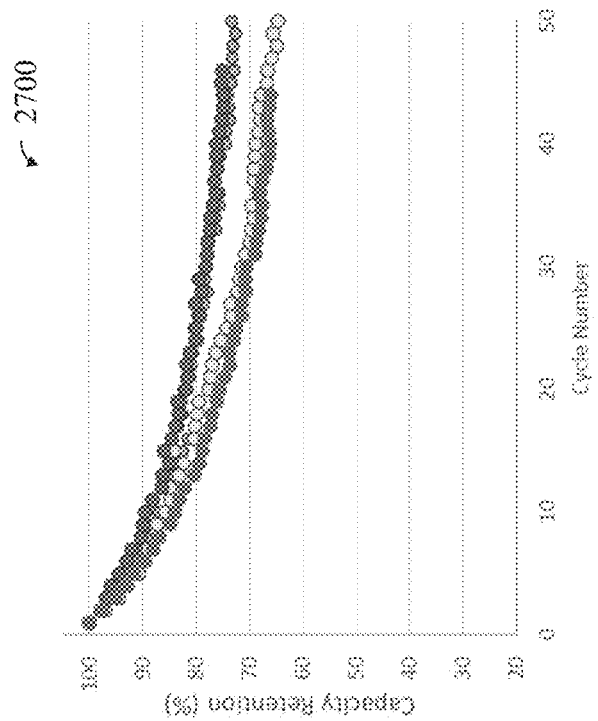
FIG. 27 shows a graph of percentage battery electric storage capacity retention over cycles for the 3D self-assembled binder-less mesoporous carbon-based particle shown in FIGS. 1A-1J, according to some implementations.

FIG. 27 shows a graph of percentage battery electric storage capacity retention over cycles. In the example of FIG. 27, chart 2700 shows capacity retention for various battery and/or battery electrodes at least partially equipped with mesoporous carbon-based particle 100A in various forms per cycle number, referring to charge-discharge cycles.

FIG. 28 shows a listing of various battery-related industry challenges. In the example of FIG. 28, listing 2800 indicates various battery industry related challenges, including (but not limited to): undesirable dendrite growth, describing a characteristic tree-like structure of crystals growing as molten metal solidifies, the shape produced by faster growth along energetically favorable crystallographic directions, and also having significant consequences in regard to material properties, due to the presence of Li-related compounds; control of first charge Li loss (balance of pre Li loading); and, continuous growth of solid-electrolyte interphase ("SEI") on fresh Li surfaces.

FIG. 29A shows a proprietary approach 2900A of a pre-lithiated carbon host structure. In the example of FIG. 29A, methods and/or processes conducted by LytEn, Inc., of Sunnyvale, Calif., may at least partially employ a "pre-lithiated" configuration, referring to carbon host structure surfaces, such as mesoporous carbon-based particle 100A shown in FIGS. 1A-1F, prepared for the acceptance of Li ions (Li+) intercalated therewith, such a configuration permitting for: tuning of graphene inter-layer spacing and pore distribution (size and volume) within a plasma-based thermal reactor; formulation of a carbon-based host structure; accommodation of Li intercalation into graphene (2-3× specific capacity over currently available materials); and, creation of artificial solid state SEI during Li infiltration processes.

FIG. 29B shows listing 2900B that includes plans for battery anode development concerning pre-lithiation preparation thereof; notably, Li metal and/or ions are identified as being desirable for inclusion within a battery, Li-ion battery anode, but undesirable and/or unpredictable dendrite growth and/or formation due to, for example, unstable SEI formation and infinite relative dimensional change limit potential application areas. A key challenge of a need to stabilize Li metal and/or liquid electrolyte at their interface areas and/or regions may be and/or need to be further identified.

Various mitigating approaches shown in listing 2900C, alternatives to an ideal, pure Li and/or Li ion intercalation with graphene-based sheets (such as those used to form or produce 3D bundles of graphene sheets 102 of mesoporous carbon-based particle 100) have been considered to add value to Li-ion battery electrodes. Traditional, state-of-the-art battery systems may, for example, replace Li metal with intercalating carbon (graphite) and/or use Li sourced from an oxide cathode to produce a battery. Further, include mesoporous carbon-based particle 100 may be created with alloys or alternative active materials to Li, silicon, tin aluminum, and/or the like.

Pre-lithiation procedures, defined as those including the intercalation of graphite to accommodate initial charge Li loss and/or to provide an active source for electric charge storage or current flow may include adjustments and/or optimizations to any one or more of the following properties and/or parameters: chemical, electrochemical, and/or employing deposition or fabrication techniques to ensure direct contact of carbon-based materials in mesoporous carbon-based particle 100A to Li metal, provided by FMC and/or Livent Corp., of Philadelphia, Pa., in foil, powder, or other forms.

Adjustments made to the percentage lithiation shown in listing 2900D, Li intercalation between graphene sheets of 3D bundles of graphene sheets 101B, may, for example: increase coulombic efficiency, decrease first charge loss, manage expansion effects, and engineer solid electrode interphase ("SEI") in conventional graphite electrodes; provide dual purpose, serve as a cranking battery and power a trolling motor in marine applications, in Li ion capacitors; guard against excessive freely-accessible ("free") Li, that can lead to high surface area Li formation; and, enable alternative non-Li cathodes such as sulfur, oxygen, vanadium oxide, etc.

Tuning of mesoporous carbon-based particle 100A may achieve, generally, at least the following shown in listing 2900E of FIG. 29E: more efficient fabrication (Li utilization and potential increase in active to inactive, binder reduction); improved uniformity; and, controlled reaction (battery electricity conductivity and/or activity). More particularly, parameters of mesoporous carbon-based particle 100A may be tuned to achieve specific performance features as a function of the percentage of Li loading per unit area or volume of mesoporous carbon-based particle 100A, including (but not limited to):

(1) at low loading levels (less than capacity), compensating for first charge losses/more effective SEI formation; at saturation/matched loading, Li rich regions, 'galvanically' coupled to carbon, (2) oxidizing materials when in contact with electrolyte and insertion of Li and/or Li-ions (via intercalation) between graphene layers;

(3) at excess loading levels, metallic Li is infiltrated into engineered "host" carbon; configuring the "host" to serves to accommodate/stabilize expansion of Li and suppress dendrite formation as a result of increased Li surface area (enables specific capacities commensurate with pure Li: >2,000 mAh/g); and, (4) preparing Li ion processes/methodology directly transferable to lithium ion hybrid capacitors.

Ongoing challenges, shown in FIG. 29F, related to the thermal and/or liquid infusion of Li and/or Li ion into carbon-based structures such as mesoporous carbon-based particle 100A as outlined in listing 2900E may include that set forth in listing 2900F, such as (but not limited to): management of Li reactivity regarding surface tension, wettability) at interface; management of capillary infiltration kinetics; engineering of electrical gradient through electrode thickness, gradation of Li infiltration such that it is highest at current collector and transitions to a more ionic conducting concentration and/or level at electrolyte interface; and, the carefully tuned engineering of surface chemistry (by facilitating stable SEI formation in contact with electrolyte and minimize reactivity with air).

Disclosed aspects may build upon traditional two-dimensional ("2D") plating, that may be similar to brightening agents in electroplating. Listing 2900G shown in FIG. 29G outlines that, in electroplating, the addition of chemical additives may often increase polarization, decrease current density; such as, redirect current density to low as opposed to high areas (protrusions); produce a relatively high nucleation rate, and result in a moderate charge transfer rate. In the context of plating or stripping for battery charge and discharge cycles, for batteries with electrodes equipped with mesoporous carbon-based particle 100A as shown in FIG. 1, carbon film may serve as a flexible support for SEI formation as well as, redirecting current density to low, as opposed to high, areas.

FIG. 29H shows a schematic depiction of interlayers of material involved in traditional electroplating processes, where surface curvature values for such processes may be too substantial for effective electroplating to occur.

FIG. 29I shows a schematic depiction of various carbon spheres formed on copper (Cu) with one or more layers of Li ions (Li+) deposited there-upon for the purposes of enhancement of electrical charge storage and current conductivity therefrom.

FIG. 29J shows listing 2900J setting forth various benefits associated with the integration of mesoporous carbon-based particle 100A with 3D electrodes of Li-ion batteries, including, for example: the development and implementation of 3D electrodes with increased electroactive surface area (such as 3D "host" structures prepared specifically for the intercalation of Li ions therewith, or other metallic materials, for the purposes of facilitating electric current conductance) that can also reduce local effective current density; formation of insulating (wettable polar surface) layer on electrolyte-facing surfaces of electrodes with electrical conductivity being graded higher to active carbon core and backplane current collectors.

FIG. 29L shows listing 2900L setting forth Li ion battery related technologies that may be equipped with mesoporous carbon-based particle 100A and variants thereof as disclosed herein. Galvanic corrosion or coupling, referring to an electrochemical process in which one metal corrodes preferentially when it is in electrical contact with another, in the presence of an electrolyte, may be prevalent upon direct electrical contact between carbon and Li metal in the presence of electrolyte. The potential difference between Li metal (−3.04 V vs. a standard hydrogen electrode "SHE"), and carbon electrode may lead to a flow of electrons (galvanic couple), formation of Li ions (oxidation), and deposition on carbon and/or carbon-based materials.

Employed herein in a context of producing mesoporous carbon-based particle 100 and integrating it with a Li ion battery, classic cementation, referring to a process of altering a metal by heating it in contact with a powdered solid, precipitation in copper production may refer to and/or involve a heterogeneous process. Such a process may imply conditions where reactants are components of two or more phases (solid and gas, solid and liquid, two immiscible liquids) or in which one or more reactants undergo chemical change at an interface, on the surface of a solid catalyst, in which ions are reduced to zero valence at a solid metal surface (i.e., Cu ions on Fe particle surface); and, where iron oxidizes and copper is reduced (copper being relatively higher on a galvanic series, similar to Li versus C).

FIG. 29M shows listing 2900M setting forth capabilities of mesoporous carbon-based particle 100A being prepared for the infiltration of Li ion into carbon-based materials followed by cementation therewith, as so described by listing 2900L in FIG. 29L, in the presence of an electrolyte.

FIG. 29N shows listing 2900N that discusses management of reactive metals from a welding perspective, and that any one or more of the mentioned techniques and/or processes may be functionally integrated with and/or used to produce mesoporous carbon-based particle 100A to enhance Li ion battery performance. Such ancillary processes and/or techniques include: management of reactive metals (via welding); classic metal inert gas (MIG), gas tungsten arc welding (GTAW) also referred to as tungsten inert gas (TIG) and submerged arc welding (SAW) to utilize inert shielding gas to join reactive metals (such as Ti and Al) through a liquid metal process (such as by welding). Examples include using inert shielding gas to form liquid pools of reactive metal without oxidation, where delta Gf of oxides ($TiO_2$, $Al_2O_3$) is on par with that of $Li_2O$. Through controlled use of inert shielding gas around reactive metals, oxygen and moisture may effectively be managed in the presence of reactive liquid metals. In such environments and conditions, liquid Li can be infiltrated into the carbon-based structures of mesoporous carbon-based particle 100 through controlled shielding gas configuration and operation.

Figure 30:
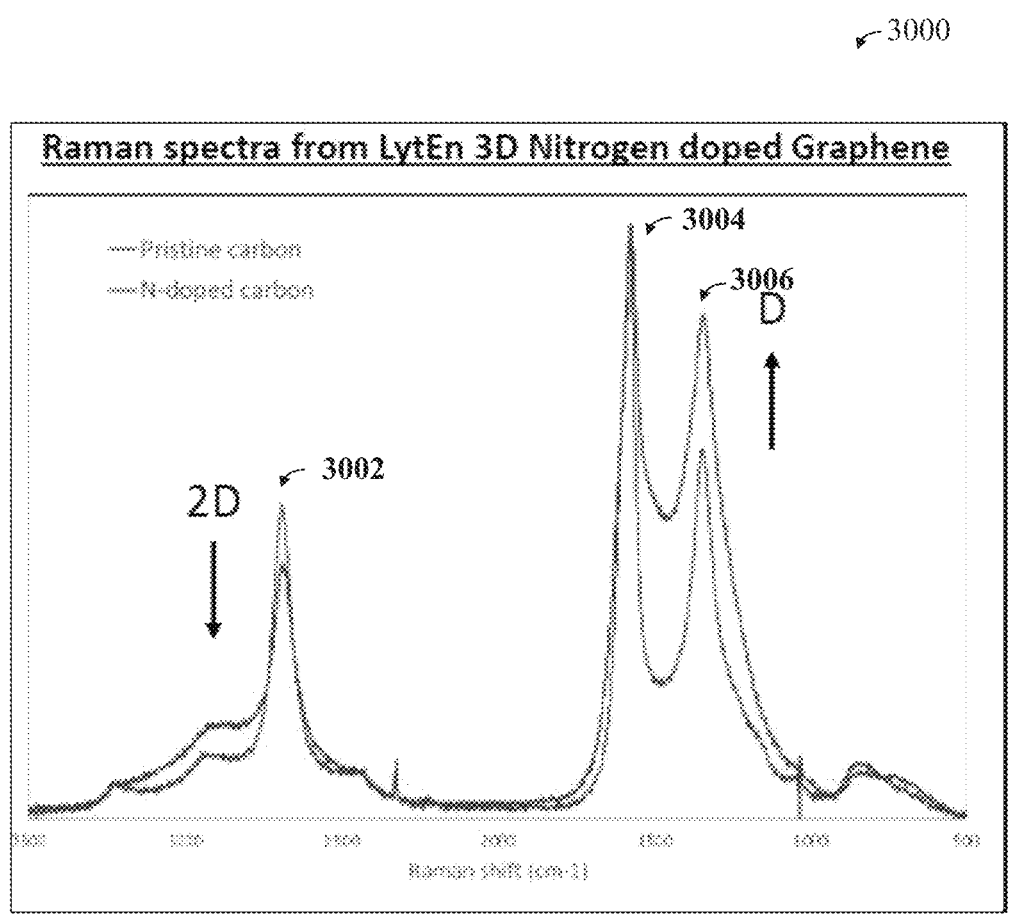
FIG. 30 shows Raman spectra for 3D N-doped FL graphene including charting for both pristine carbon and N-doped carbon, according to some implementations.

FIG. 30 shows Raman spectra for 3D N-doped FL graphene including charting for both pristine carbon and N-dope carbon. In the example of FIG. 30, Raman spectra for 3D N-doped FL graphene 3000 includes 2D peak 3002 at approximately 2730 cm-1 and D peaks 3004, 3006 at approximately 1600 $cm^{-1}$ and 1400 $cm^{-1}$, respectively.

FIG. 31 shows a listing of reactor tuning. In the example of FIG. 31, reactor tuning 3100 may be performed to, for example: increase FL graphene spacing, reduce Van der Waal forces; control doping; promote carbon vacancy formation; and, decreases Li adsorption energy and/or increase Li capacity. Li ion intercalation may, for example, shift graphene sheet stacks from an "AB" configuration to "AA" with intercalation (increased spacing), where, for example, in graphite, AA may shift back to AB with de-intercalation; and, in FL graphene, in FL graphene, AA stacking remains with de-intercalation (maintains increased spacing). Such stacking configurations may be associated with mesoporous carbon-based particle 100 shown in FIG. 1.

FIG. 32 shows various properties associated with bilayer graphene 3200. In the example of FIG. 32, a sample bilayer graphene infrastructure 4100 is shown with two layers of graphene oriented in the position shown, understood as devices "which contained just one, two, or three atomic layers". Schematic 3202 shows approximate spacing measurements of 1.42 Å, 1.94 Å and/or 3.35 Å between individual graphene sheets. Schematic 3204 shows various example defective sites 3206 and/or 3208 what may occur within a defined vicinity of an edge plane and/or assist with the creation of mesoporous carbon-based particle structures including one or more graphene sheets. Schematic 3210 shows various model diagrams 3212 of a top view of a hard-sphere carbon-particle model.

Figure 33:
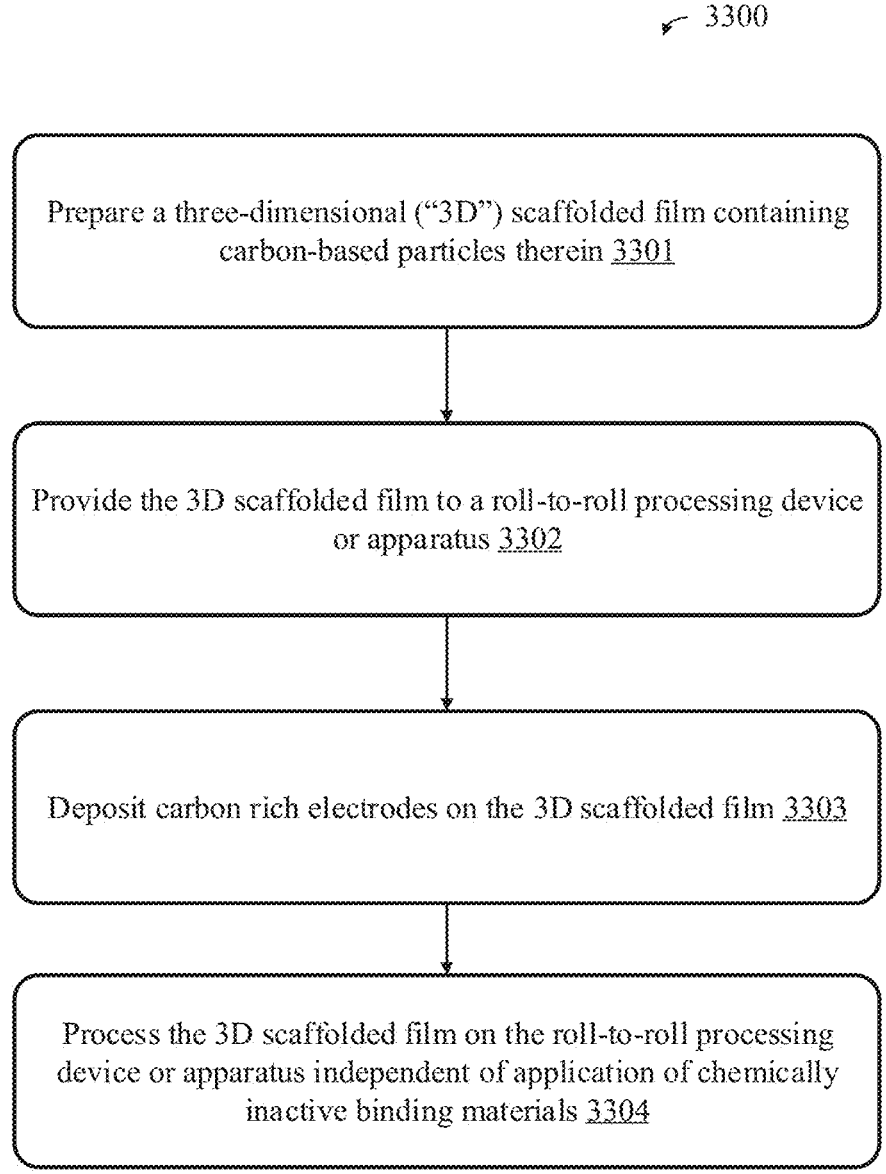
FIG. 33 shows a method for preparing a 3D scaffolded film containing carbon-based particles, according to some implementations.

FIG. 33 shows an illustrative flowchart for depicting an example operation 3300 for preparing a 3D scaffolded film containing carbon-based particles. In the example of FIG. 33, method 4400 includes preparing a three-dimensional ("3D") scaffolded film containing carbon-based particles therein at operation 3304 by providing the 3D scaffolded film to a roll-to-roll processing device or apparatus at operation 3306. Carbon rich electrodes may be deposited on the 3D scaffolded film at operation 3308; and, processing the 3D scaffolded film on the roll-to-roll processing device or apparatus independent of application of chemically inactive binding materials may occur at operation 3310 prior to conclusion of the method 3300 at operation 3312.

In the foregoing specification, the disclosure has been described with reference to specific examples. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. An electrochemical cell comprising:
an anode containing an anode active material,
a cathode containing a cathode active material,
a porous separator disposed between the anode and the cathode, and
a liquid electrolyte in contact with the anode active material and the cathode active material, at least one of the anode or the cathode comprising:
an electrically conductive substrate;
a first contiguous film deposited on the electrically conductive substrate, the first contiguous film consisting of a first concentration of three-dimensional (3D) self-assembled binder-less multi-modal mesoporous carbon-based particles in contact with each other that collectively define a first electrical conductivity for the first contiguous film, each 3D self-assembled binder-less multi-modal mesoporous carbon-based particle comprising:
a plurality of electrically conductive 3D aggregates formed of graphene sheets randomly sintered together to form a 3D hierarchical open porous structure including mesoscale structuring in combination with micron-scale fractal structuring, the plurality of electrically conductive 3D aggregates configured to provide electrical conduction between contact points of the graphene sheets; and
a porous arrangement defining a plurality of interconnected porous channels formed in the 3D hierarchical open porous structure, the porous arrangement containing the liquid electrolyte and configured to facilitate ion transport through at least some interconnected porous channels; and
a second contiguous film deposited on the first contiguous film, the second contiguous film consisting of a second concentration of 3D self-assembled binder-less multi-modal mesoporous carbon-based particles in contact with each other that collectively define a second electrical conductivity for the second contiguous film, wherein the second electrical conductivity of the second contiguous film is lower than the first electrical conductivity of the first contiguous film.

2. The electrochemical cell of claim 1, wherein the anode active material or the cathode active material resides in pores of the anode and the cathode.

3. The electrochemical cell of claim 1, wherein the anode active material or the cathode active material has a specific surface area between approximately 80 m²/g and approximately 2,675 m²/g.

4. The electrochemical cell of claim 1, wherein the anode active material or the cathode active material further comprises any one or more of pre-lithiated graphene sheets, pristine graphene, graphene oxide, reduced graphene oxide, graphene fluoride, graphene chloride, graphene bromide, graphene iodide, hydrogenated graphene, nitrogenated graphene, boron-doped graphene, nitrogen doped graphene, chemically functionalized graphene, physically or chemically activated or etched versions thereof, or conductive polymer coated or grafted versions thereof.

5. The electrochemical cell of claim 1, wherein at least some of the electrically conductive 3D aggregates are sintered together and form an open porous scaffold independent of a binder.

6. The electrochemical cell of claim 1, wherein the 3D hierarchical open porous structure comprises an active Li intercalating structure with a specific capacity of between approximately 744 and approximately 1,116 milliampere hours per gram (mAh/g).

7. The electrochemical cell of claim 4, wherein the chemically functionalized graphene includes a functional group imparted to the 3D hierarchical open porous structure, wherein the functional group is quinone, hydroquinone, quaternized aromatic amines, mercaptan, disulfide, sulfonate (—SO₃), transition metal oxide, transition metal sulfide, or any combination thereof.

8. The electrochemical cell of claim 1, wherein the electrically conductive substrate is a current collector.

9. The electrochemical cell of claim 8, wherein the current collector includes metal foam, metal web, metal screen, perforated metal, sheet-based 3D structure, metal fiber mat, metal nanowire mat, conductive polymer nanofiber mat, conductive polymer foam, conductive polymer-coated fiber foam, carbon foam, graphite foam, carbon aerogel, carbon xerogel, graphene foam, graphene oxide foam, reduced graphene oxide foam, carbon fiber foam, graphite fiber foam, exfoliated graphite foam, or any combination thereof.

10. The electrochemical cell of claim 1, wherein the anode active material or the cathode active material further comprises one or more of a plurality of nanoparticles, a plurality of nanodiscs, a plurality of nanoplatelets, a plurality of nano-coatings, or a plurality of nanosheets of an inorganic material.

11. The electrochemical cell of claim 10, wherein the plurality of nanoparticles, the plurality of nanodiscs, the plurality of nanoplatelets, the plurality of nano-coatings, or the plurality of nanosheets of an inorganic material include bismuth selenide or bismuth telluride, transition metal dichalcogenide or trichalcogenide, sulfide, selenide, telluride of a transition metal, boron nitride, or any combination thereof.

12. The electrochemical cell of claim 11, wherein the nanoplatelets each have a thickness less than between 5 nanometers (nm) and 10 nm and a width between 1 micrometer (µm) and 5 µm.

13. The electrochemical cell of claim 1, wherein the first electrical conductivity is between approximately 500 Siemens per meter (S/m) and approximately 20,000 S/m.

14. The electrochemical cell of claim 1, wherein the second electrical conductivity is between 100 Siemens per meter (S/m) and 500 S/m.

15. The electrochemical cell of claim 1, wherein the first contiguous film has an average thickness between approximately 10 micrometers (µm) and approximately 200 µm.

16. The electrochemical cell of claim 1, wherein the second contiguous film has an average thickness between approximately 10 micrometers (µm) and approximately 200 µm.

* * * * *